US012692825B2

(12) United States Patent (10) Patent No.: US 12,692,825 B2
Crews-Holloway et al. (45) Date of Patent: Jul. 28, 2026

(54) GEOMETRY OPTIMIZED LOW ASPECT RATIO VTOL VEHICLE SYSTEM WITH STRUCTURALLY INTEGRATED PROPULSION

(71) Applicant: MONOSTAGE SPACE INC., San Jose, CA (US)

(72) Inventors: Christopher William Crews-Holloway, Woodside, CA (US); Anton Petrovich Kulinich, San Jose, CA (US); Travis Thomas George, Sacramento, CA (US); Andreas Vlahinos, Castle Rock, CO (US)

(73) Assignee: MONOSTAGE SPACE INC., San Jose, CA (US)

( * ) Notice: Subject to any disclaimer, the term of this patent is extended or adjusted under 35 U.S.C. 154(b) by 162 days.

(21) Appl. No.: 18/784,504

(22) Filed: Jul. 25, 2024

(65) Prior Publication Data

US 2026/0063091 A1 Mar. 5, 2026

Related U.S. Application Data

(60) Provisional application No. 63/528,842, filed on Jul. 25, 2023.

(51) Int. Cl.
*F02K 9/78* (2006.01)
*B33Y 80/00* (2015.01)
(Continued)

(52) U.S. Cl.
CPC ................ *F02K 9/78* (2013.01); *B64G 1/006* (2023.08); *B64G 1/4026* (2023.08); *B33Y 80/00* (2014.12); *B64G 1/4005* (2023.08); *B64G 1/401* (2013.01)

(58) Field of Classification Search
CPC ......... F02K 9/78; B64G 1/4046; B64G 1/006; B64G 1/4005; B64G 1/401; B64G 1/4021;
(Continued)

(56) References Cited

U.S. PATENT DOCUMENTS 3,295,799 A * 1/1967 Stoppe .................. B64D 37/08
244/135 R
4,013,190 A * 3/1977 Wiggins ................. B64D 37/32
220/88.1
(Continued)

FOREIGN PATENT DOCUMENTS

GB 2610014 2/2023
WO 2021112934 6/2021
WO 2022251763 12/2022

OTHER PUBLICATIONS

F. B. Lary, Final Report Advanced Cryogenic Rocket Engine Program, Aerospike Nozzle Concept, vol. I, Jan. 1968, pp. 1-432.
(Continued)

*Primary Examiner* — Richard Green
*Assistant Examiner* — Katherine June Walter
(74) *Attorney, Agent, or Firm* — Wissing Miller LLP

(57) ABSTRACT
A self-contained vertical takeoff and landing vehicle (VTOL) with aspect ratio of height to width no greater than 5.3:1 and with both rocket and airbreathing propulsion systems that can selectively operate one at a time or both at the same time and fuel tanks that have internal lattice structures formed of groups of interconnected multiplicities of fuel cells such as gyroids that line and are integrated with a vehicle skin to form a structural skeleton strengthened with said lattice structures that also serve to reduce fuel slosh compared with fuel tanks lacking such lattice structures and provide other benefits such as fuel temperature profile control.

30 Claims, 42 Drawing Sheets

(51) Int. Cl.
  *B64G 1/00* (2006.01)
  *B64G 1/40* (2006.01)

(58) Field of Classification Search
  CPC .... B33Y 80/00; F17C 1/08; F17C 2270/0197;
         F17C 2270/0194; F17C 2270/0186; F17C
         2203/0682; F17C 2203/0621; F17C
         2203/0624; F17C 2203/0629; F17C
         2203/012; F17C 2203/011; B64C 3/34;
         B64D 37/08; B64D 37/06
  See application file for complete search history.

(56)            References Cited

U.S. PATENT DOCUMENTS

| | | | | |
|---|---|---|---|---|
| 6,422,514 | B1 * | 7/2002 | Clark | B64G 1/4022 |
| | | | | 244/172.3 |
| 7,784,267 | B2 | 8/2010 | Tobita | |
| 2015/0069184 | A1 * | 3/2015 | Barmichev | B64D 37/30 |
| | | | | 244/135 R |
| 2020/0049103 | A1 | 2/2020 | Craddock | |
| 2023/0211900 | A1 | 7/2023 | French | |
| 2024/0421331 | A1 * | 12/2024 | Hahn | H01M 8/04074 |

OTHER PUBLICATIONS

F. B. Lary, Final Report Advanced Cryogenic Rocket Engine Program, Aerospike Nozzle Concept vol. II, Technical Report AFRPL-TR-67-280, Jan. 1968, pp. 1-568.
9. J. Campbell, Jr., Nasa Aerospike Thrust Chamber Program Final Report, Nasa Lewis Research Center, Apr. 1977, pp. 1-154.
C. E. Tharratt, Chrysler Corporation Space Division, Project Serv, A Space Shuttle Feasibility Study, Nov. 19, 1969, pp. 1-200.
Richard D. Smith, Aerospace Research Center, Experimental Investigation of Continuous Detonation Rocket Engines for In-Space Propulsion, Jul. 22, 2016, pp. 1-4.
Thomas W. Teasley, Aerospace Research Center, Current State of NASA Continuously Rotating Detonation Cycle Engine Development, Jan. 19, 2023, pp. 1-3.
The Linear Aerospike Engine, May 14, 1998, pp. 1-5.
C.E. Tharratt, Project Serv Final Review: Phase a Space Shuttle Study, Chrysler Corporation Space Division, Jul. 1, 1971, pp. 1-254.

* cited by examiner

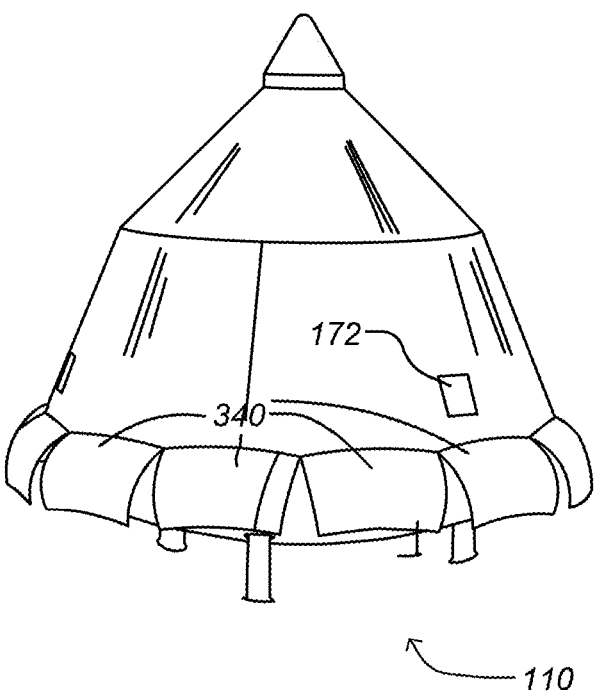
*FIG. 4C*
*FIG. 4D*
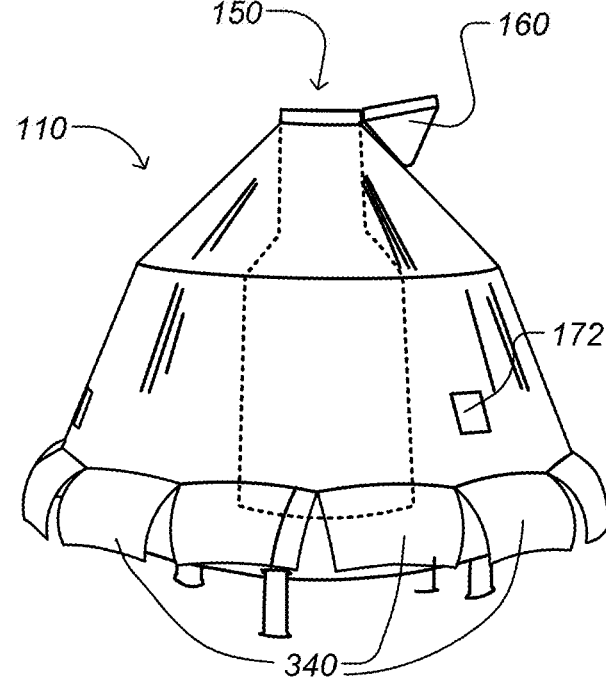

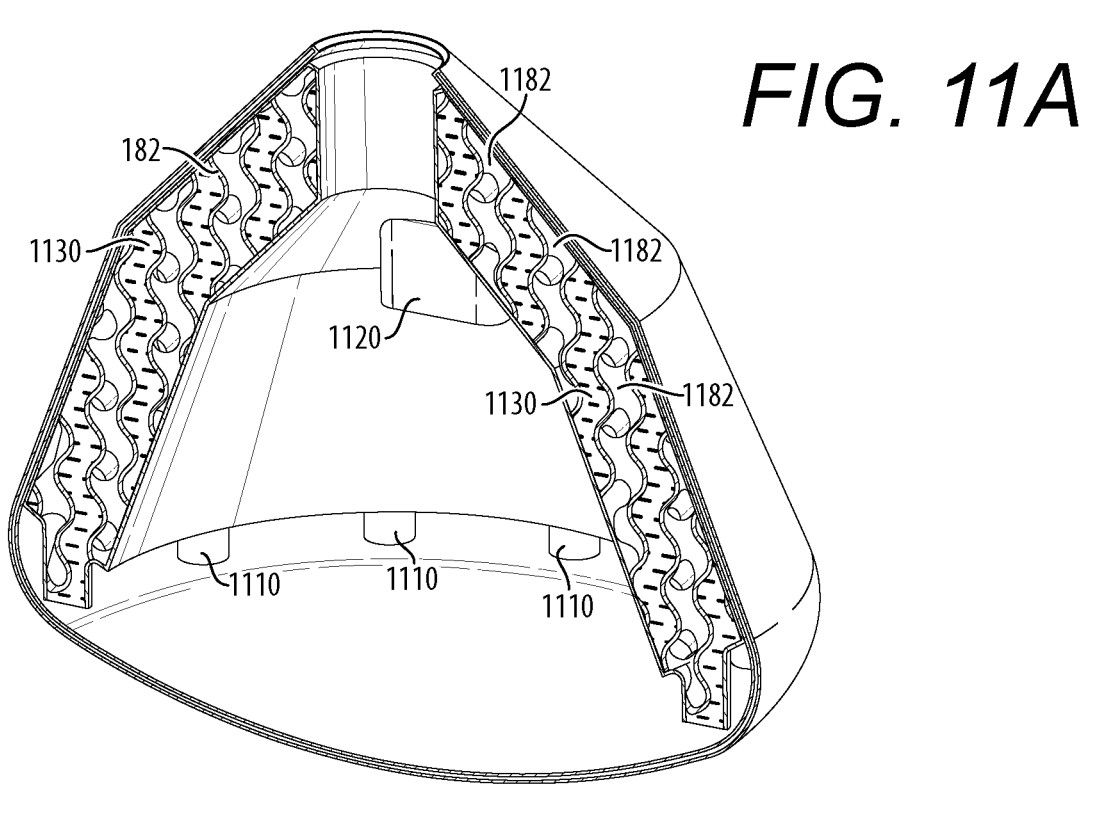
*FIG. 11A*
*FIG. 11B*
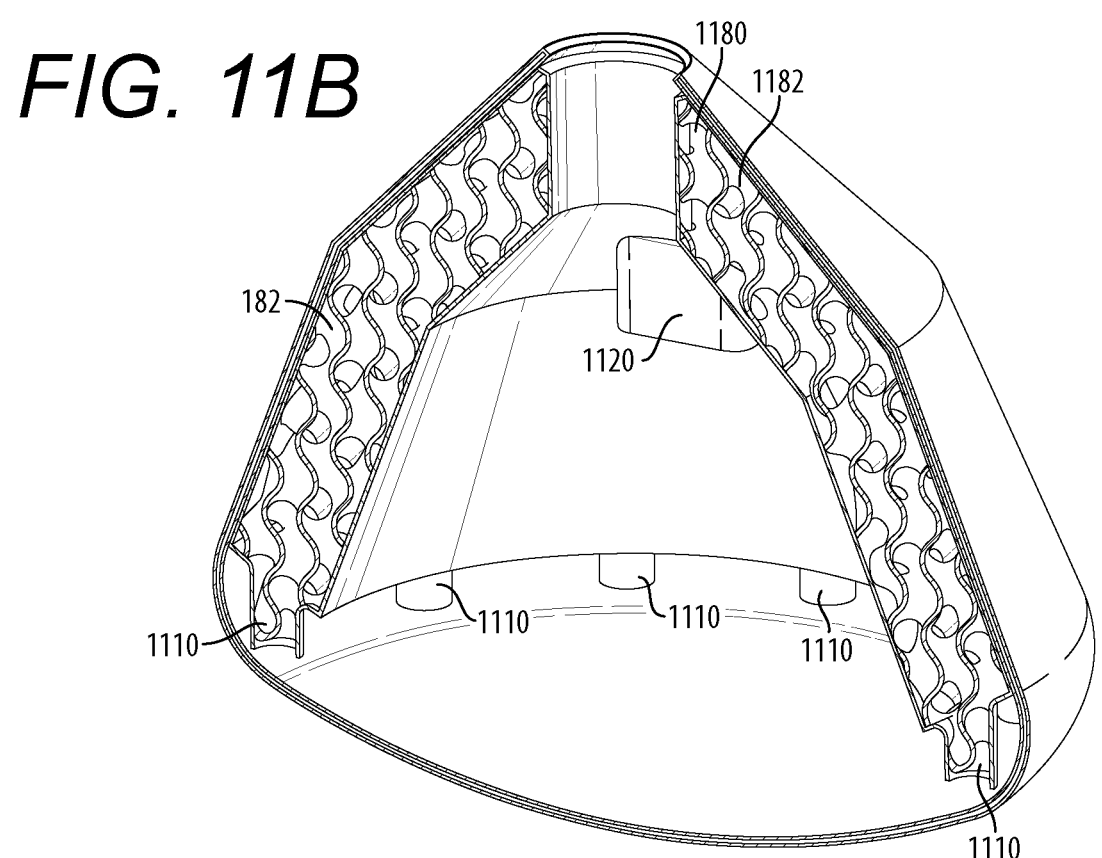

1132

1130

*FIG. 14A*
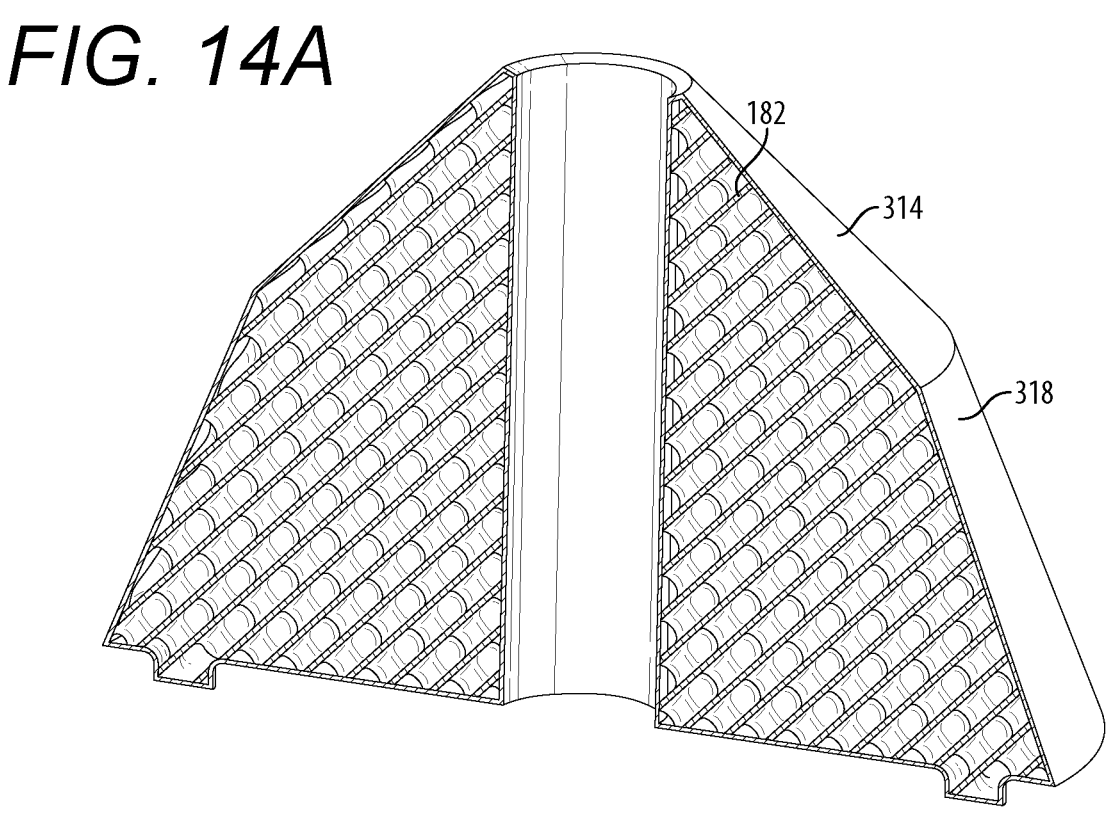
*FIG. 14B*
*FIG. 14C*
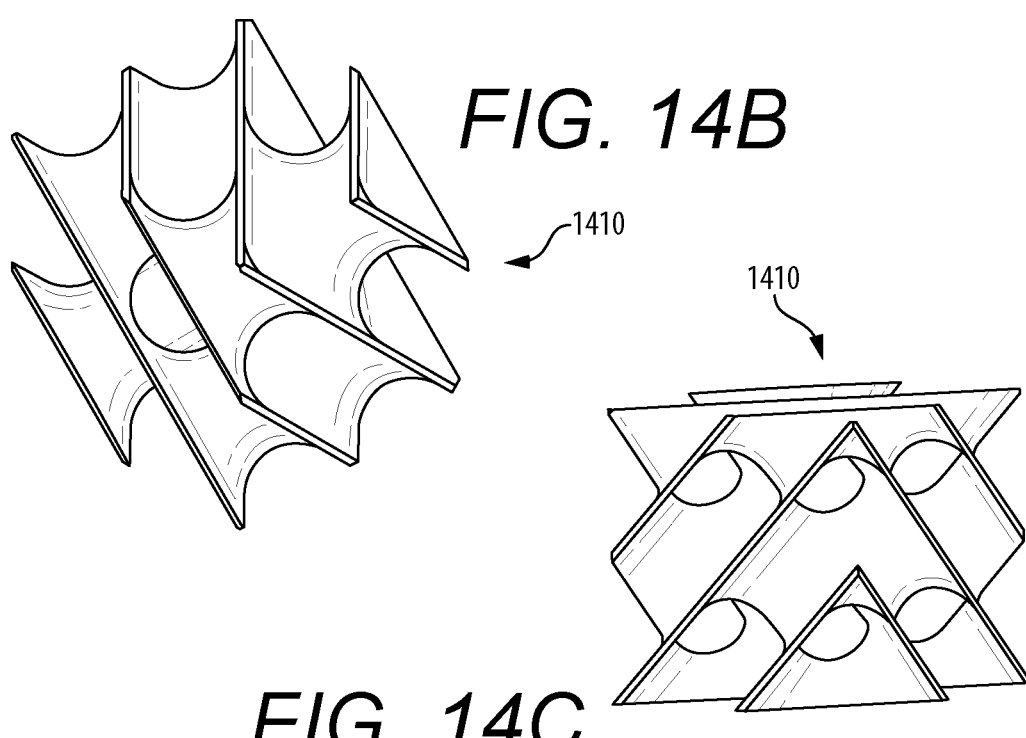

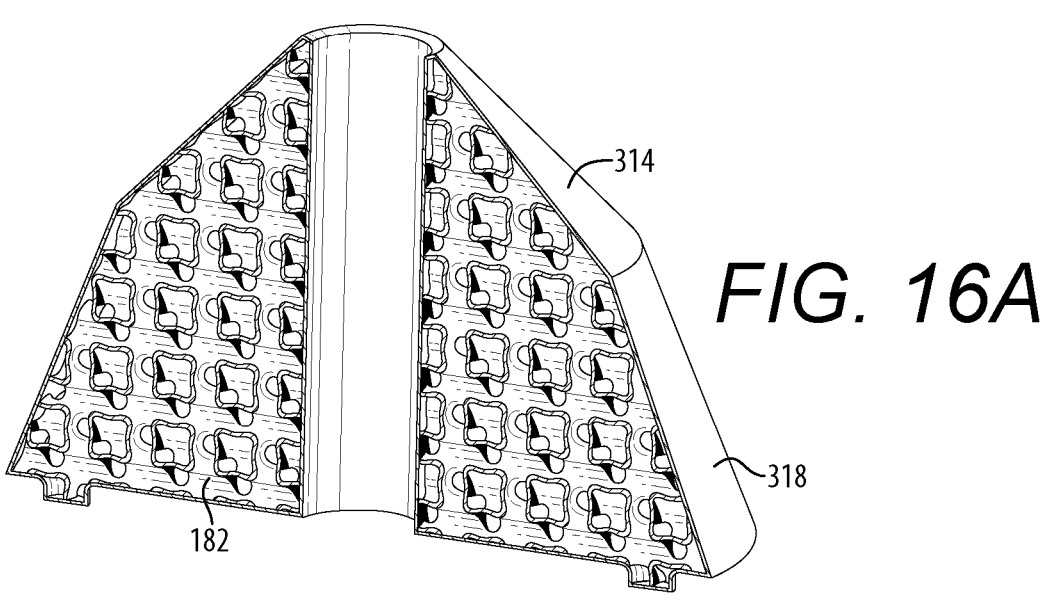
*FIG. 16A*
*FIG. 16B*
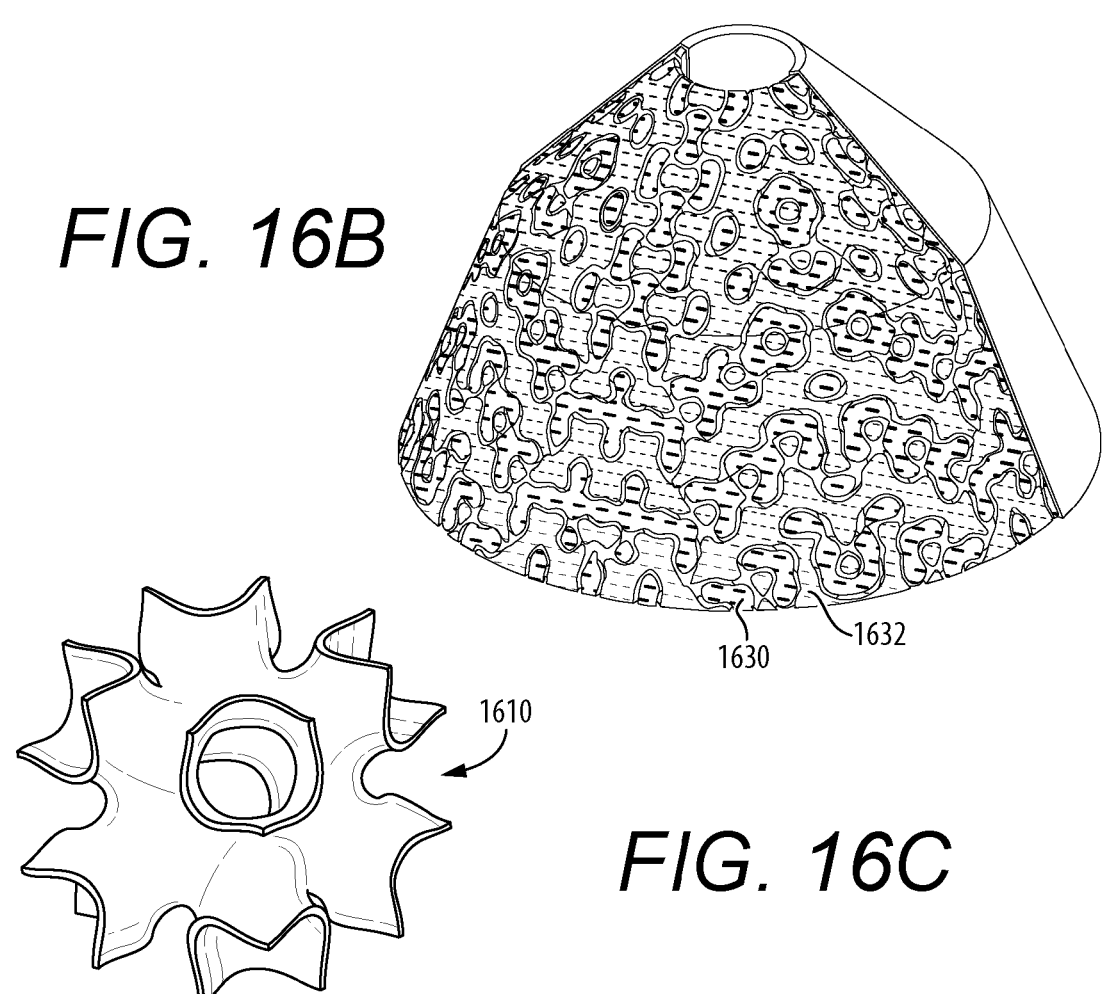
*FIG. 16C*

1710

1710

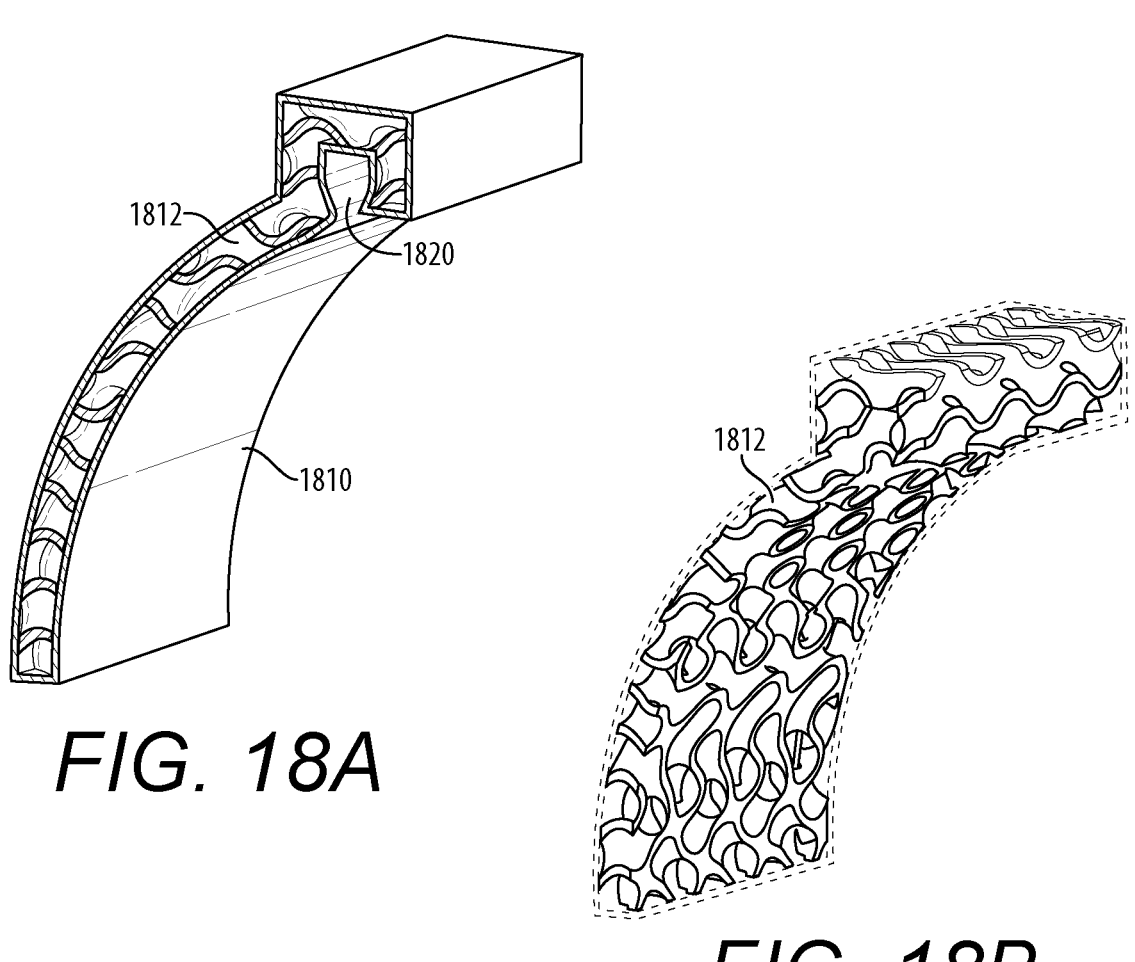
FIG. 18A
FIG. 18B
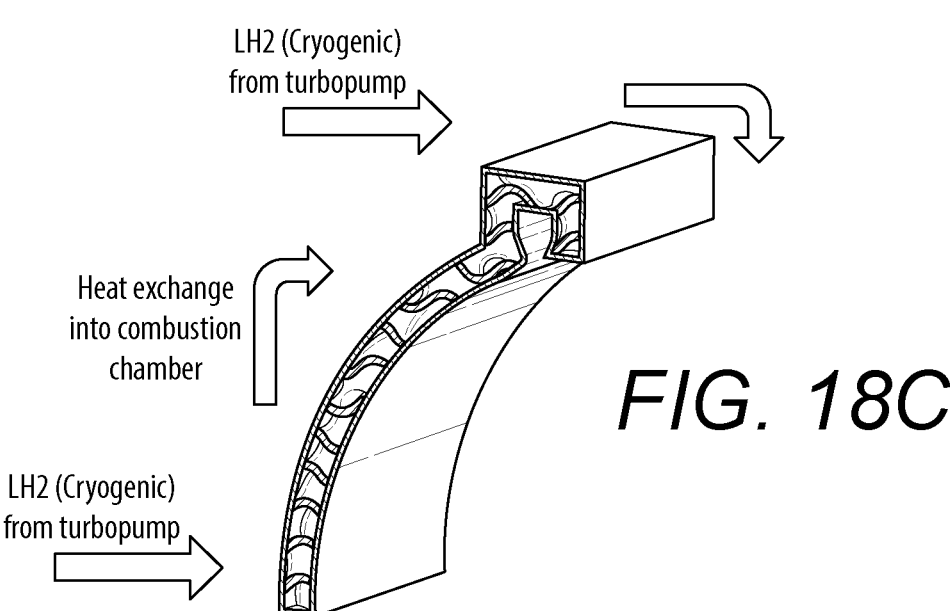
FIG. 18C

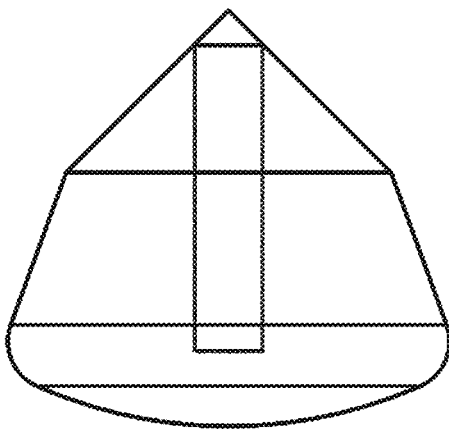
FIG. 20A
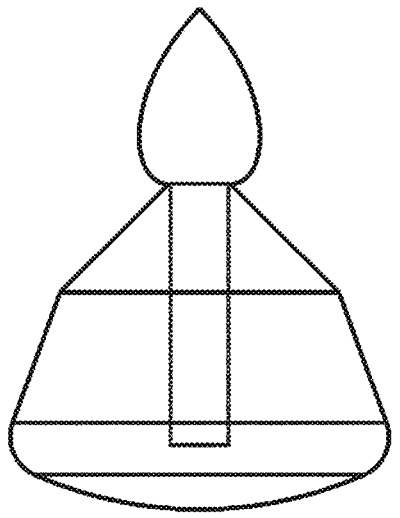
FIG. 20C
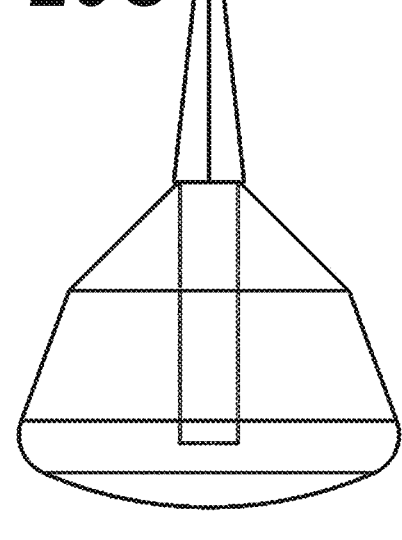
FIG. 20E
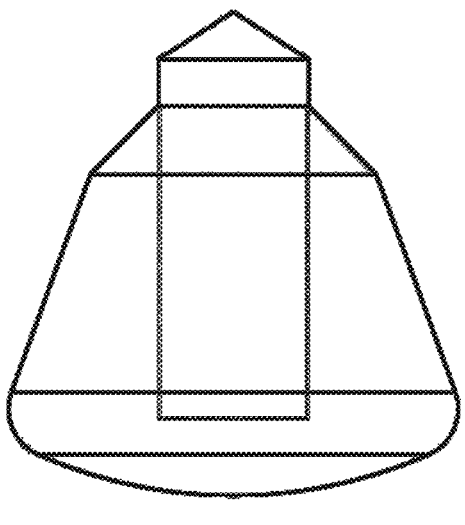
FIG. 20B
FIG. 20D

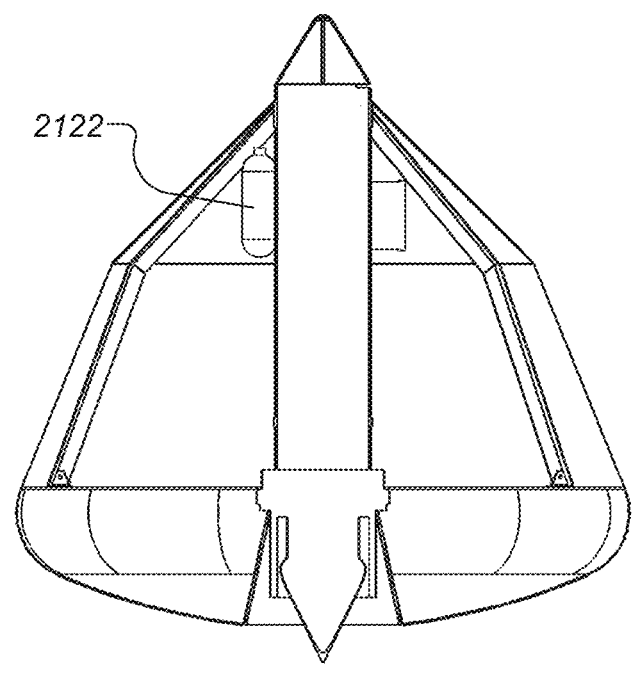
2122
*FIG. 21C*
*FIG. 21D*
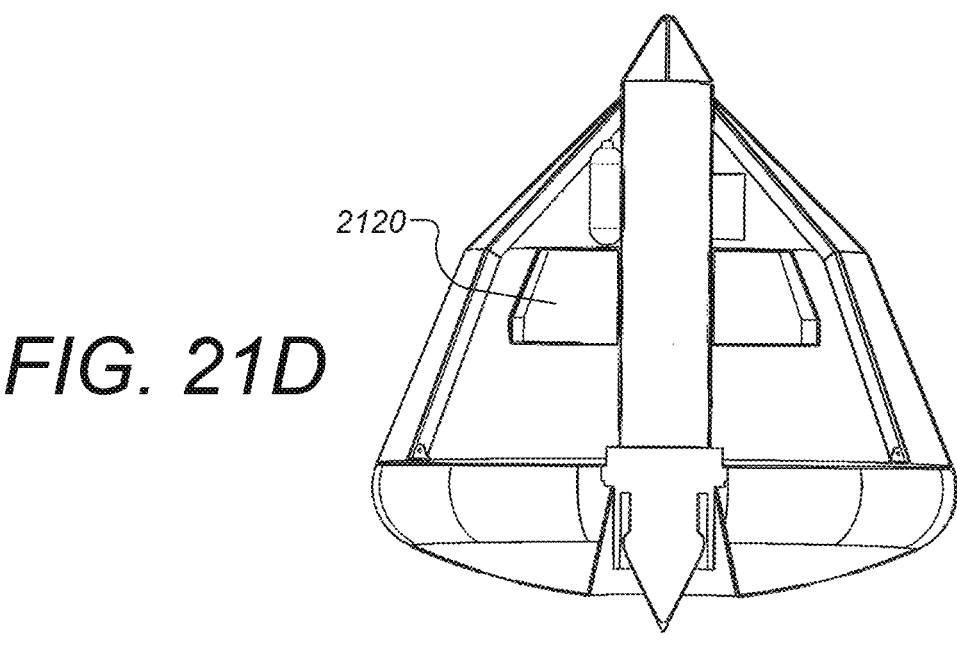
2120

GEOMETRY OPTIMIZED LOW ASPECT RATIO VTOL VEHICLE SYSTEM WITH STRUCTURALLY INTEGRATED PROPULSION

REFERENCE TO RELATED APPLICATIONS

This patent application claims the benefit of and incorporates by reference U.S. provisional application Ser. No. 63/528,842 filed Jul. 25, 2023.

FIELD

This patent specification relates mainly to the aerospace and defense industries. More particularly, this patent specification relates to vertical takeoff and landing (VTOL) flight vehicles.

BACKGROUND AND SUMMARY OF THE DISCLOSURE

Existing aircraft primarily take the form of lift generating winged-body structures that require horizontal runways or infrastructure for takeoff and landing, with the exception of vertical takeoff and landing (VTOL) military jets, drones, and helicopters. While these systems have proven effective within their operational range, they encounter significant limitations when attempting to operate in the upper atmosphere and suborbital regions at subsonic and hypersonic velocities.

In these high-altitude zones, such as above 80,000 feet, the air becomes so thin that traditional jet powered or other propulsion systems that utilize airbreathing technology (like those found in commercial airliners and conventional military aircraft) do not function efficiently, if at all. Rocket-based propulsion systems and thrusters are used in launch vehicles, spaceplanes, or spacecrafts which can operate in this environment, but their use has been limited primarily to the launch of vehicles intended to reach low Earth orbit (LEO) or beyond due to their high costs and, in many cases, expendable nature.

In order to get to and around in space, multiple complex systems are often employed, rather than a single integrated system capable of many or all of the applicable phases, such as: ascent, orbital insertion, orbit, reentry, descent and landing. Systems used after launch are often configured to be stored within the launch vehicle.

Existing launch vehicles tend to have tall, narrow diameter missile-like airframes, with aspect ratios in the range of 5.5:1 to 25:1, depending on engine and booster system integration to the vehicle body. As used herein, the term "aspect ratio" refers to the proportional relationship or ratio of the height of the vehicle body compared to the width of the maximum diameter of the vehicle body. For such launch vehicles, aspect ratio is defined as the height to maximum diameter ratio; therefore it is apparent that currently used launch systems are very tall in height compared to their width, resulting in higher aspect ratios for these vehicles. This design decision is primarily due to their reliance on staging, which uses a very large mass fraction of propellant required to reach orbital velocities when compared to the dry mass of the system architecture. Current architectures generally rely on liquid bi-propellant deflagration based combustion constrained to a missile like airframe. This totem pole-esk vehicle structure is constituted by different stages that propel the remaining portion of the system with a payload to space.

Embodiments of this disclosure have lower aspect ratio than current system architectures, and leverage the benefits of near pyramidal or triangular or conical like shape outline. The triangularity behind this structure enables more efficient structural load management compared to long slender rods as done in today's missile-like airframes for launch vehicles or other rocket based systems. The structural loads from the thrust ring in embodiments with an embedded annular thrust chamber of deflagration or detonation based combustion of liquid or gas or solid or combination of the kind are allowed to be distributed over a larger area reducing the overall loads directly on the sections transferring thrust force or other forces like aerodynamic loads to the overall vehicle structural system.

Significant infrastructure and ground operations are needed to support conventional launch vehicle staging and flight operations. For flight, such a launch vehicle ignites the rocket engines sequentially, initiating the launch sequence. As each stage completes its burn, it is jettisoned, and subsequent stages are ignited, propelling the vehicle and its payload into space. In some cases initial vehicle stages can be designed to be reused and payloads can be designed to return from space. However, such cases do not provide aircraft-like reusability for an entire launch vehicle system architecture.

Additionally, there is a notable gap in aircraft designs that are capable of operating effectively in the region between commercial airline flight altitudes and space. This gap represents a significant barrier to the advancement of several fields, especially in hypersonic research, development, and testing. Further fields include rapid point-to-point transportation, cargo services, suborbital flights, and certain military applications including tactical responsive launch and ISR (Intelligence, Surveillance, and Reconnaissance) or other application such as Target acquisition.

Current satellite and orbital spacecraft infrastructure hinders on orbit maneuverability due to limited fuel reserves; thus, entities are confined to prolonged static orbits or reliant on orbital transfer vehicles (OTV) for in-space mobility and orbital placement. While refueling and assembly processes are being developed for in space operations to support satellites and infrastructure, a purely dynamic reusable solution to satellites does not exist today to applicant's knowledge. Additionally, satellites are designed to be terminated via de-orbit or put into a graveyard orbit at the end of its lifecycle, hence one time use.

According to some embodiments a system architecture is designed to re-enter the atmosphere for recovery to fly again, be refurbished, or recycled for use once out of propellant or at the end of its mission, reducing waste and driving sustainable operations. The architecture may also have standardized subsystems that may be rapidly swapped analogous to the current automobile component supply chain where parts are mass producible and can be reused between various configurations of similar systems (i.e. fuel lines, pressure valves, engine blocks, drive shafts). These subsystems may be manufactured with traditional methods or additive manufacturing processes to create singular or low part count assemblies that can be rapidly replaced without delaying operability of the flight vehicle system.

Despite substantial advancements in hypersonic research, a reliable, high-frequency launch, flight, and landing platform suitable for operation in this intermediate zone is under-developed. This lack of development not only impedes the acquisition of real flight data, which is critical for further advancement in the field, but also limits the operational capabilities of high-speed traditional rocket platforms utilizing missile like airframe based transportation and military systems.

Embodiments described in this application seek to address these challenges by providing a fully reusable system architecture which provides flight capability in the domains of launch, flight, and landing. Further, embodiments have applications in data collection, satellite and spacecraft operations, manned missions, boost and deployment of other systems, technology testing, de-orbiting, and landing due to the scalable, modular nature of the platforms. The unique system design of such platforms allow for versatile subsystems and payload integration for operation in space, planetary, and atmospheric environments, fulfilling the needs of a range of applications and industries.

Embodiments described in this patent specification provide a geometry optimized low aspect ratio VTOL system configured to ascend, descend, and land without a need for a booster rocket or another supplemental vehicle. Such a VTOL system can be termed self-sufficient in that it does not need a supplemental vehicle although it can be coupled with one for a part of its operating envelope. Notably, embodiments of the VTOL system described in this patent specification include at least two of the following: (1) a low aspect ratio of height to maximum width, for example no more than 5.3:1, (2) fuel tanks that are integrated with the inside of the vehicle skin and comprise internal lattice structures formed of groups of multiplicities of interconnected cells that greatly enhance the strength of a structural skeleton and provide additional benefits such as reducing fuel slosh and insulating fuel from the ambient to provide a desired temperature profile of the stored fuel, and (3) built-in both rocket and airbreathing propulsion system that can be used as needed in endo-atmospheric and in exo-atmosperic environments and in outer space.

According to some embodiments, a geometry optimized low aspect ratio vertical takeoff and landing vehicle (VTOL) system with structurally integrated propulsion comprising both rocket and airbreathing propulsion systems and fuel tanks having internal lattice structures formed of groups of interconnected multiplicities of fuel cells that line and are integrated with a vehicle skin to form a structural skeleton strengthened with said lattice structures comprises: a skin 183 and fuel tanks 182 lining an inside of said skin and integrated therewith to form a unitary structural skeleton 120 that has a rounded outer surface and an aspect ratio of height to maximum width no greater than 5.3:1; wherein the fuel tanks comprise internal lattice structures formed of one or more groups of multiplicities of interconnected cells 1310 lining and integrated with an inside of said skin over a sufficient area thereof to enhance structural strength of said structural skeleton and to reduce fuel slosh compared with tanks lacking such lattice structures; a rocket propulsion system 180 that has aft-facing exhaust nozzles 350 at a periphery of an aft portion of said structural skeleton and is coupled with one or more of said fuel tanks for supply of rocket fuel; and an airbreathing propulsion system 170 that has aft facing exhaust nozzles 362 radially inwardly spaced from said rocket propulsion system exhaust nozzles and is coupled with one of more said fuel tanks for supply of fuel for airbreathing propulsion; wherein said rocket and airbreathing propulsion systems are configured to operate selectively to provide sufficient propulsion for ascent, descent, and landing of said VTOL system.

According to some embodiments, the VTOL system cam further include one or more of the following features: (a) the rocket propulsion system exhaust nozzles 350 are arranged in a circle and comprise more than 10 nozzles; (b) the airbreathing propulsion system nozzles 362 are arranged in a circle and comprise more than 10 nozzles; (c) said airbreathing propulsion system includes at least one of (i) forward facing air intakes 174 at a forward portion of the structural skeleton and (ii) side facing air intakes 172 at positions intermediate the forward and aft portions of the structural skeleton; (d) the system can include both said forward facing air intakes 174 and said side facing air intakes 172: (e) said side facing air intakes 172 can be provided with actuable doors selectively closing said side facing air intakes; (f) the rocket propulsion system and the airbreathing propulsion system are configured to operate concurrently at selected times; (g) the rocket propulsion system and the airbreathing propulsion system are configured such that only one operates at selected times; (h) said interconnected cells in at least some of the fuel tanks comprise gyroid-like compartments 1310; (i) said fuel tanks comprise a tank with interconnected cells for rocket fuel and a tank with interconnected cells for an oxidizer for the rocket fuel that are not in fluid flow communication with each other; (j) said fuel tanks comprise a tank with interconnected cells for an airbreathing propulsion system that are not in fluid flow communication with the tanks for rocket fuel and oxidizer; (k) the rocket propulsion system comprises a rotating detonation rocket engine configured with a continuous rounded detonation chamber; (l) the air breathing propulsion system comprises a rotating detonation engine configured with a continuous rounded detonation chamber; (m) said tanks include thermal insulating material coupled with said interconnected cells to maintain desired temperatures profiles of fuel in the cells; (n) said thermal insulating material includes phase-changing material that changes between solid and non-solid phases to help maintain said desired temperature profiles; (o) said internal lattice structure includes one or more hollowed portions the contents of which are configured to selectively control heat transfer between fluids stored in the tanks; (p) said one or more hollowed portions of the internal lattice structure include further beam lattice structures; (q) the VTOL system includes fuel conduits connecting said tanks with said propulsion systems, which fuel lines are embedded in said structural skeleton; and (q) said propulsion systems are configured to provide said VTOL system with endo-atmospheric as well as exo-atmospheric mobility.

According to some embodiments, a self-contained vertical takeoff and landing vehicle (VTOL) system comprises: a skin 183 and fuel tanks 182 lining an inside of said skin and integrated therewith to form a unitary structural skeleton 120 that has a rounded outer surface; wherein the fuel tanks comprise internal lattice structures formed of one or more groups of multiplicities of interconnected cells 1310 lining and integrated with an inside of said skin over a sufficient area thereof to enhance structural strength of said structural skeleton and to reduce fuel slosh compared with tanks lacking such lattice structures; a rocket propulsion system 180 that has aft-facing exhaust nozzles 350 at a periphery of an aft portion of said structural skeleton and is coupled with one or more of said fuel tanks for supply of rocket fuel; and an airbreathing propulsion system 170 that has aft facing exhaust nozzles 362 radially inwardly spaced from said rocket propulsion system exhaust nozzles and is coupled with one of more said fuel tanks for supply of fuel for airbreathing propulsion; wherein said rocket and airbreathing propulsion systems are configured to operate selectively to provide sufficient propulsion for ascent, descent, and landing of said VTOL system.

According to some embodiments, the self-contained VTOL system described in the immediately preceding paragraph can include one or more of the following features: (a) the rocket propulsion system and the airbreathing propulsion system are configured to operate concurrently at selected times; (b) the rocket propulsion system and the airbreathing propulsion system are configured such that only one operates at selected times; (c) said airbreathing propulsion system includes forward facing air intakes 174 at a forward portion of the structural skeleton; (d) the rocket propulsion system comprises a rotating detonation rocket engine configured with a continuous rounded detonation chamber; and (e) said propulsion systems are configured to provide said VTOL system with endo-atmospheric as well as exo-atmospheric mobility.

According to some embodiments, a self-contained vertical takeoff and landing vehicle (VTOL) system comprises: a skin 183 and fuel tanks 182 lining an inside of said skin and integrated therewith to form a unitary structural skeleton 120 that has a rounded outer surface and an aspect ratio of height to maximum width no greater than 5.3:1; a rocket propulsion system 180 that has aft-facing exhaust nozzles 350 at a periphery of an aft portion of said structural skeleton and is coupled with one or more of said fuel tanks for supply of rocket fuel; and an airbreathing propulsion system 170 that has aft facing exhaust nozzles 362 radially inwardly spaced from said rocket propulsion system exhaust nozzles and is coupled with one of more said fuel tanks for supply of fuel for airbreathing propulsion; wherein said rocket and airbreathing propulsion systems are configured to operate selectively to provide sufficient propulsion for ascent, descent, and landing of said VTOL system.

According to some embodiments, the self-contained VTOL system described in the immediately preceding paragraph can include one or more of the following features: (a) said airbreathing propulsion system includes forward facing air intakes 174 at a forward portion of the structural skeleton; and (b) the rocket propulsion system comprises a rotating detonation rocket engine configured with a continuous rounded detonation chamber.

According to some embodiments, a self-contained vertical takeoff and landing (VTOL) system comprises: a skin 183 and fuel tanks 182 lining an inside of said skin and integrated therewith to form a unitary structural skeleton 120 that has a rounded outer surface and an aspect ratio of height to maximum width no greater than 5.3:1; wherein the fuel tanks comprise internal lattice structures formed of one or more groups of multiplicities of interconnected cells 1310 lining and integrated with an inside of said skin over a sufficient area thereof to enhance structural strength of said structural skeleton and to reduce fuel slosh compared with tanks lacking such lattice structures; and a propulsion system [170 and/or 180] that has at least 10 aft-facing exhaust nozzles [350 and/or 362] arranged in a ring at an aft portion of said structural skeleton and is coupled with one or more of said fuel tanks for supply of fuel; wherein said propulsion systems is configured to operate selectively to provide sufficient propulsion for ascent, descent, and landing of said VTOL vehicle.

According to some embodiments, the self-contained VTOL system described in the immediately preceding paragraph can include one or more of the following features: (a) said tanks include thermal insulating material coupled with said interconnected cells to maintain desired temperatures profiles of fuel in the cells; and (b) the rocket propulsion system comprises a rotating detonation rocket engine.

According to some embodiments, a process of vertical takeoff and landing (VTOL) comprises: forming a structural skeleton 120 that has a rounded outer surface and an aspect ratio of height to maximum width no greater than 5.3:1 by lining an inside of a skin 183 with fuel tanks 182 integrated therewith; wherein said lining the skin with fuel tanks comprises forming the fuel tanks with internal lattice structures of one or more groups of multiplicities of interconnected cells 1310 lining and integrated with the inside of said skin over a sufficient area thereof to enhance structural strength of said structural skeleton and to reduce fuel slosh compared with tanks lacking such lattice structures; securing to said structural skeleton a rocket propulsion system 180 that has aft-facing exhaust nozzles 350 at a periphery of an aft portion of said structural skeleton and is coupled with one or more of said fuel tanks for supply of rocket fuel; further securing to said structural skeleton an airbreathing propulsion system 170 that has aft facing exhaust nozzles 362 radially inwardly spaced from said rocket propulsion system exhaust nozzles and is coupled with one of more said fuel tanks for supply of fuel for airbreathing propulsion; and configuring said rocket and airbreathing propulsion systems to operate selectively to provide sufficient propulsion for ascent, descent, and landing of said VTOL vehicle.

According to some embodiments, said forming the fuel tanks uses one or more additive manufacturing processes.

As used herein, the grammatical conjunctions "and", "or" and "and/or" are all intended to indicate that one or more of the cases, object or subjects they connect may occur or be present. In this way, as used herein the term "or" in all cases indicates an "inclusive or" meaning rather than an "exclusive or" meaning.

BRIEF DESCRIPTION OF THE DRAWINGS

To further clarify the above, and other advantages and features of the subject matter of this patent specification, specific examples of embodiments thereof are illustrated in the appended drawings. It should be appreciated that these drawings depict only illustrative embodiments and are therefore not to be considered limiting of the scope of this patent specification or the appended claims. The subject matter hereof will be described and explained with additional specificity and detail through the use of the accompanying drawings in which:

FIGS. 4A to 4G are various views of a vehicle having a slightly different outer geometry than that of FIGS. 3A and 3B, according to some embodiments;

FIGS. 11A-11E are various cutaway diagrams illustrating further aspects of a structural airframe fuel tank, according to some embodiments;

FIGS. 14A to 14C are diagrams of a structural body embedded multi-component fuel tank based on a diamond-shaped unit cell, according to some embodiments;

FIGS. 16A to 16C are diagrams illustrating a further configuration for a multi-component fuel tank embedded and structurally integrated into the body of a vehicle platform, according to some embodiments;

FIGS. 18A to 18C are diagrams illustrating further aspects of liquid rocket propulsion systems configured for vehicle platforms, according to some embodiments;

FIGS. 20A to 20J are outline diagrams of variations of nose cone attachments, according to some embodiments;

FIGS. 21A to 21F are diagrams showing small aspect ratio vehicle platforms using hybrid propulsion of air breathing and liquid rotating detonation rocket engine (RDRE) technology, according to some embodiments;

DETAILED DESCRIPTION

Figure 1:
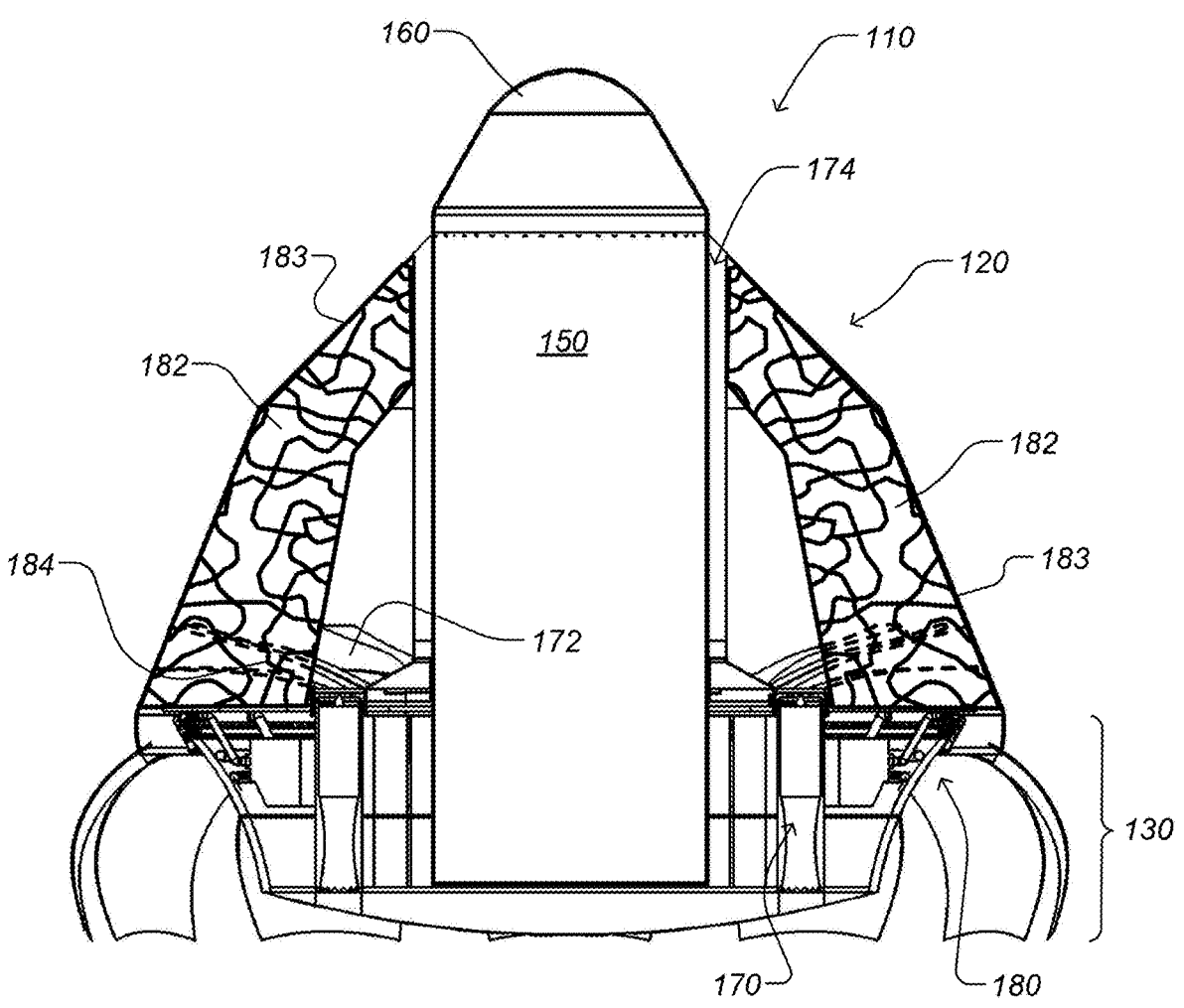
FIG. 1 is a cross section view of a mobility platform or vehicle according to some embodiments.

A detailed description of examples of preferred embodiments is provided below. While several embodiments are described, it should be understood that the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all of these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features or other described embodiments. Further, like reference numbers and designations in the various drawings indicate like elements.

This disclosure relates to the aerospace and defense industries specifically for a new aircraft vehicle design profile for mobility in various planetary environments, including atmospheric, suborbital, and orbital environments on Earth, as well as interplanetary and intergalactic flight environments.

According to some embodiments, vertical take off and landing capable aircraft and spacecraft are described, that incorporate a wide base with variable external geometry and a small aspect ratio. The vehicle takes a conic like profile with a widest diameter leading into a spherical or curved blunt face at the aft of the vehicle. This coupling location, in which embodiments contain a thrust ring or other propulsive devices, has the widest diameter, this is a larger diameter than the mid fuselage which has a diameter larger than a top fuselage with an increased angle as measured off a vertical line along the body axis which ultimately has a diameter larger than the nose cone or nose attachment. As such, the aspect ratio of these embodiments preferably does not exceed 5.2:1 or 0.2:1, and is usually in the range of 1.2:1 to 3.0:1. The modular system integration of blending the structure with other subsystems provides operational capability in all flight environments to improve cost-effectiveness, operational efficiency, and to increase payload capacity for a wide range of mission profiles. Different configurations and combinations of propulsive subsystems integrated to the small aspect ratio structure allows for varying flight performance that caters to specific mission requirements. The blended nature of the structure allows for the subsystems to be integrated in a scalable manner to satisfy the required performance specifications defined by mission requirements. A variety of payload configurations allow for goods and services to be supported in varying flight regimes ranging from low altitude flight to orbital flight. The modular and hybrid propulsion systems allow the vehicle to maintain efficiency and allow for the vehicle to operate in a variety of flight environments. A thermal protection system can be integrated as part of the vehicle structure in conjunction with the geometry of the airframe to manage large temperature gradients experienced in high velocity flight particularly in the hypersonic regime. Various materials and thermal protection systems may be used to achieve necessary performance with total heat rates and total heat loads experienced dictated by geometry, trajectory, flight velocity, mass and other factors. The thermal protection system may be scaled as necessary to meet mission requirements. Further modularized attachments can be applied and integrated to the system allowing embodiments to perform sustained supersonic and hypersonic flight velocities.

Described embodiments can serve many functions, including an advanced autonomous transportation vehicle, launch vehicle, satellite, reentry capsule, planetary probe, or spacecraft system. As used herein the term "vehicle" refers to a means of carrying or transporting something, and can include spacecraft for flying and operating in outer space as well as aircraft for traveling through air.

The described vehicles can use a combination of integrated propulsion systems. As used herein, the term "air breathing propulsion" refers to a system which includes a mechanical power source (i.e., an engine of some kind) and a system component capable of doing work on the air to increase its momentum and converting this engine power into a propulsive force. Increasing the time rate of change of momentum of the fluid as it goes through the propulsion system produces the thrust to propel the vehicle. Air breathing propulsion system elements may include turbine, rotor, piston, turboprop, turboshaft, turbojet, turbofan, ramjet, scramjet, and electric systems powered by combustion processes such as deflagration and/or detonation. As used herein the terms "rocket engine" and "rocket based propulsion system elements" refer to a system which is not air-breathing, with thrust produced by expelling high-speed gasses that are a product of the combustion of a fuel and oxidizer out of an engine, thrust chamber, nozzle, or a similar device to contain, direct, control, or guide the expulsion of exhaust gasses. Other advanced, novel, and or futuristic propulsion systems which are driven by other means and practices which generate propulsive thrust for a vehicle are included in this definition. In each case, the principles of thrust production must be in accordance with Newton's laws and the conservation of mass, momentum, and energy. Rocket engine based propulsion system elements can use solid rocket motors, liquid rocket engines both deflagration and detonation based combustion, standing oblique shock detonation propulsion, hypergolic propellants, electric driven engines, nuclear powered systems, synergetic air breathing rocket engine, ion drives, laser propulsion, directed energy, phase change materials, heat exchangers, radio-frequency ion propulsion, quantum vacuum thrusters, radioisotope sources, field resonance propulsion, hydrodynamic, magnetic, or electrodynamic propulsion. Such propulsion systems support a reusable flight body in a more blunt, capsule-esque airframe.

While the vehicle is capable of using a single propulsion subsystem, blending of various propulsive systems will create hybrid propulsion systems to the platform which give operational benefits for a wide range of flight domains. This blunt external profile of the vehicle system architecture has a much lower aspect ratio (height to width ratio) than traditional rocket propelled systems, with described embodiments preferably staying below a 5.3:1 ratio with the included nose cone attachments. The external form factor mold line of this vehicle with integrated propulsion systems for the purpose to perform both ascent and reentry starkly contrasts from known existing vehicles in various planetary environments, space access, and spaceflight, as currently used vehicle bodies do not resemble a tall, slender missile airframe or have wings which are fixed to the main body to structurally define the outer mold line. According to most embodiments, the aspect ratio is below 2.4:1 including nose cone attachments. The dimensions of such embodiments with this aspect ratio can range from a height of 12 feet and a maximum diameter width of 5 feet to a height of 300 feet and a maximum diameter width of 125 feet, for example. Many combinations and values of dimensions could fall in between the outlined upper and lower bounds of width and height. For all other aspect ratio ranges discussed, many combinations of dimensions exist within the defined ranges for different embodiments, as the lower and upper limits of width and height are defined by the smallest and largest dimensional values, and will not exceed these extremes in most cases.

If no nose cones were to be attached to the airframe profile, most embodiments could have an aspect ratio in the range of 0.2:1 to 2.0:1. Dimensions of such embodiments without nose cones in the lower aspect ratio range of 0.2:1 could vary from a height of 8 feet and a width of 40 feet to a height of 75 feet and a width of 375 feet, for example. Dimensions of such embodiments without nose cones in the upper aspect ratio range of 2.0:1 could vary from a height of 8 feet and a width of 4 feet to a height of 350 feet and a width of 175 feet, for example. Preferred embodiments with no nose cone attachments will have aspect ratios in the range of 0.5:1 to 1.6:1. Dimensions of preferred embodiments without nose cones in the lower aspect ratio range of 0.5:1 could vary from a height of 4 feet and a width of 8 feet to a height of 150 feet and a width of 300 feet. Dimensions of preferred embodiments without nose cones in the upper aspect ratio range of 1.6:1 could vary from a height of 8 feet and a width of 5 feet to a height of 320 feet and a width of 200 feet. For the attachment of a short, stubby nose to the vehicle profile, such embodiments could have an aspect ratio in the range of 0.3:1 to 3:1. Dimensions of embodiments with a short nose attached in the lower aspect ratio range of 0.3:1 could vary from a height of 4.5 feet and a width of 15 feet to a height of 105 feet and a width of 350 feet, for example. Dimensions of embodiments with a short nose attached in the upper aspect ratio of 3:1 could vary from a height of 12 feet and a width of 4 feet to a height of 375 feet to a width of 125 feet, for example. According to some embodiments, the aspect ratio ranges between 4:1 and 5.2:1 with longer nosecones for payload integration and aerodynamic optimization, and in other embodiments the ratio ranges from about 1.2:1 to about 3:1.

The aspect ratio in particular cases will, at least in part, depend on the desired mission or use case for the vehicle and the selection of the attached nose cone. The smallest dimensioned vehicles will have lower thrust outputs in the range of hundreds to thousands of pounds force of thrust, while large scale vehicles can have on the order of tens of millions of pounds force of thrust.

According to some embodiments, subsystems are embedded, integrated with structural vehicle configurations, resulting in improved cost-effectiveness, operational efficiency, and increased payload capacity. As used herein the terms "embedded" and "integrated" refer to cases where one or more components of a system, are enclosed closely within or a matrix with, or set firmly into a mass or material, or otherwise formed into the structure system, or part thereof, thereby forming part of its structural system or structural frame. The system, subsystems, elements, components, assembly, and or parts can be integrated to be one with the structure, providing structural support and or integrity while being capable to serve other functions. Its innovative design allows for less infrastructure requirements than known heavy launch systems in development or use today.

During launch and flight operations, the integrated air-breathing and rocket engines can ignite sequentially, propelling the launch vehicle and its payload into space. Air-breathing propulsion integration in addition to rocket engine systems is novel to enable propulsive system performance increases, better efficiency, and promotes VTOL capabilities of the platform. The modular airframe allows for flexibility in configuring various propulsion systems based on specific mission requirements or for desired performance specifications. The mobility platform can be scaled for deployment in orbit, enabling usage as a satellite or spacecraft with dynamic capabilities for orbital movement and deorbit. For flight operation on planet Earth, airbreathing propulsion systems will be leveraged for flight cases including takeoff, ascent, descent, hovering, and landing the vehicle until better solutions become commercially available or are developed.

The movement speed regimes of this vehicle can range from stationary, hovering, subsonic, transonic, supersonic, hypersonic, orbital, orbital transfer, and escape velocities to support a variety of use cases including defense, intelligence, aerospace, logistics, supply chain, human transport, and scientific research applications.

Applications of described embodiments include service as a launch and data collection platform, supersonic/hypersonic flight test bed, boost platform for other technology support and deployment, dynamic orbital operations, responsive maneuverable satellite, AI-chip flight testing and verification, cargo transport platform, manned/crew transport, tactical responsive launch, munitions delivery, weapons system, launch-satellite integrated sensor suite, and rapid point to point transportation system with vertical take off and landing flight operations.

Advantages and/or benefits of many described embodiments can include one or more of the following.

Full system reusability. Rocket based launch vehicles expend components such as but not limited to the following: booster stage, upper stage, interstage couplers, stage separation bulkheads, payload attachments, and payload fairing. Not expending system components of the flight platform unless required by the specific mission allows for cost reduction, operational efficiency, improved flight cadence, reduced waste and environmental impact, and increased system reliability and lifetime.

Atmospheric Reentry Capabilities for Hypersonic aerodynamic descent and landing capabilities with propulsion systems. A blunt body conical geometry shape allows for successful management of heat rates and heat loads due to high enthalpy flow conditions in the hypersonic flight environment. The windward blunt body utilizes the geometry of a large radius curvature to create a shock layer further away from the surface of the airframe than that of more slender, ellipse sled, and ballistic shaped airframes. The further the shock layer is from the surface of the platform, reduced thermal gradients are experienced on the structures. However, due to extremely high temperatures that will still remain behind the shock layer in supersonic and hypersonic flow, the structure will have an integrated, attached, or embedded heat shield (e.g. passive, insulation, conductive, ablative, actively cooled) to the structure.

According to preferred embodiments, embedding of airbreathing take-off and landing propulsion into an aerodynamic form factor designed for ascent and reentry capabilities enables further flight modes such as hovering and loitering, into a low ballistic coefficient vehicle airframe for hypersonic flight and atmospheric reentry capabilities is described. According to some embodiments, the system is designed to support primarily controlled and guided landing under throtollable forms of propulsion in a vertical or near vertical orientation and may support landing such as water landings, parachute landings, and/or landing that make use of a net(s) or other catching mechanism (e.g. on the ground). Reentry systems have previously taken a capsule form factor yet must achieve water landings and require naval fleets or naval recovery teams to egress payloads or land touchdowns that can also require complex planning and facilities to egress payloads. These vehicle system variants thus far utilize rocket based propulsion for landing, not integrated airbreathing propulsion systems. Ground landing has also been achieved via parachute or lifting landing as well as propulsive. The benefit of achieving reentry and under propulsive control guide to landing sites under typically airbreathing form of propulsion enables safer and more efficient operations with less infrastructure requirements, which may lead to cost reductions on orbital reentry services and orbital shipping lines back to Earth or other bodies.

Hybrid airbreathing propulsion system integration for wide operational domain in atmosphere. An advantage of implementing hybrid airbreathing propulsion systems allows for reduced rocket oxidizer and or propellant storage requirements (cryogenic liquid, gaseous, solid, hypergolic, paraffin, or other fuels) and increased ISP performance when compared to existing system architectures for vehicles which can access suborbital and orbital environments. This ultimately translates into increased payload mass and volume capabilities onboard the aircraft platform. The reduced fuel storage requirements allows for reductions in fuel costs to complete the same mission objective as done with a traditional rocket vehicle system architecture.

The scalable nature of technology described herein can enable a variety of propulsion systems to be integrated depending on mission requirements and may be determined by the use case basis. Some propulsion systems lend themselves to larger aspect ratio vehicles, while others are best suited for smaller aspect ratio configurations. The selected nose cone attachment can be a main driver of overall aspect ratio, with taller nosecones lending to larger aspect ratios. For example, embodiments may range from several feet in diameter to of the order of 100 feet in diameter and follow the similar system architecture and integration of key systems that remain fundamental to the design and range of mission capabilities.

Integrated Metamaterials and Lattice Generation for Structural Chassis Design, System Components, and Thermal Protection Systems. According to preferred embodiments, metamaterial structural design and lattice generation can be integrated into the components and members to enable topology optimization, allowing for the design of both intrinsic and extrinsic properties which are not experienced by traditional materials through the use of advanced manufacturing methods such as powder bed fusion, binder jetting, direct energy deposition, and bound powder extrusion. Well suited methods include directed energy deposition which uses focused thermal energy from a source such as a laser beam, electron beam, or plasma arc which melts the surface to create a molten pool of material. Material powder is fed through a nozzle or similar component to deposit the powder to the molten pool to create the product. Powder bed fusion machines may use lasers or electrons to melt and fuse metal layers into finished parts and are particularly well suited for this technology, supporting the fabrication of a wide range of substructures and metamaterials. As used herein, the term "metamaterial" refers to structures which are engineered to exhibit properties not usually found in natural metals or materials. Integration of such architected metamaterials can enable the design of tailorable properties which can include features of negative refractive index, negative stiffness, radiation tolerance, radiation resistance, materials with zero coefficient of thermal expansion, negative compressibility, and materials with negative Poisson's ratio (auxetics) with applications for radar avoidance, fracture toughness, and armor protection. Lattice structures can be used for high performance designs, consisting of geometric arrangements of points over a spatial area which consist of webs, surfaces, and trusses. Design with lattice structures can enable lightweighting while strengthening structural parts and subsystems, with capabilities of spitting a volume in two or more domains to support multiple integrated components or features. This enables system design for thermal efficiencies including insulation, isolation, low conductivity, and heat exchange, as well as high energy absorption, and or acoustic and vibrational damping to be directly embedded to the structural design.

While certain properties can be found in biological material in the natural environment, lattice structures can join structural members as well as be integrated on and into surfaces, 2D regions, inside 3D beams and structural members as well as 3D surfaces. Embodiments with integrated lattice structures can have a variety of internal structural complexity, ranging from beam lattice, stochastic lattice, honeycombs, diamonds, gyroids, transformable triangle mesh (TTM), and Triply Periodic Minimal Surfaces (TPMS). These integrated metamaterials and lattice structures are well suited for embedded structural vehicles with integration of multi-component volumes and other structurally efficient designs. Such integrated structures are generally referred to as infill materials in this disclosure where the structural wall infill is a geometric pattern or sets of patterns defined by multiple unit cells which are typically additively manufactured within a volume to create connections with surrounding structural elements such as the structural wall surface or other material deposits constructed to create a structural pattern within the body to provide benefits in structural efficiency and performance depending on the type, thickness, and number of unit lattice cell(s) used. For these embodiments, the metamaterial structural skeleton with embedded systems can also provide large reductions in vibrational loads and frequency responses providing major dynamics dampening and offering a smoother ride for payloads enabling carriage of highly sensitive systems.

For embodiments designed with infill materials and or advanced manufacturing methods, lattice design and optimization enables massive structural efficiencies and the blending of subsystem architecture. This design practice enables the integration of the airframe and structure to the subsystems housed within the vehicle, bolstering the structural strength of the system while reducing the total part count. Manufacturing methods for conjoining structural members like fastening, bolting, welding, and riveting enable the fastening of components to structural members with independent system assembly. In proposed embodiments, the structures are directly fused to couple and seamlessly mate with the required vehicle systems through digital design optimization and conforming of the structural material to critical vehicle systems. Instead of fastening propellant feed lines to the structure, they can be embedded directly with the structure akin to how veins and arteries are embedded in the human body. The final skeleton has systems in place with the necessary components to make them function without requiring extra material or manufacturing means.

This design practice enables some embodiments of the structural airframe chassis which constitutes the external vehicle mold line to be conjoined with the propellant storage and air intakes. The propellants can be stored in the same volume, as component dividing walls enable the splitting of a volume into two or more domains, allowing for lightweight but extremely efficient storage and thermal packaging between the propellant volumes. Thermal protection systems can be integrated directly into the structure for compatibility with extremely low temperatures applications like cryogenic storage or operation in cold environments as well as extremely high temperature applications like atmospheric reentry or operation in direct sunlight while in space.

Not relying on staging. Traditional staging with current launch vehicles and the infrastructure required to support operations is can be avoided, according to some embodiments. While a traditional booster could be used or added to the described platform, many embodiments are designed to act as a single all in one flight body with no need for staging as propulsive systems are integrated into the vehicle structural subsystem. The system skeleton can be integrated with all of the necessary components to make it function for the specific mission and can be compatible with a wide variety of vehicle sizing, aspect ratios, shapes and internal wall components, infill materials, propulsion systems, and systematic blending of subsystems to maximize operational efficiencies. Furthermore, this system can act as a first stage boost and or flyback platform for other payloads with supersonic, hypersonic, and orbital platforms.

According to some embodiments, where a wall separates two volumes of fluid such as a TPMS or other lattice structure, the wall itself can be made hollow. A property of TPMS is splitting the infill volume in two separate continuous domains as fluid storage containers/fuel tanks. The TPMS structural skeleton which serves as the storage container for the two separate fluids that have different temperatures. For example, the TPMS lattice wall can be made with a beam lattice interior. The interior volume of the wall (or walls) can then be filled with material that is either thermally conductive or insulative. According to some embodiments, the wall interior volume can be filled with an insulative material when thermal insulation between the two tank volumes is desired and at a later time, when thermal conduction between the tank volumes is desired the wall interior can then be replaced with a conductive material. For example, during fluid flow transition to the propulsion system, the vacuum can be pulled out the structure can become solid such temperature differences can be matched. According to some embodiments, Getters could be used for variable insulation control for matching fluid temperatures at outflow of fuel tank storage containers and support thermal management of infill material volumes. According to some embodiments, the material used for the hollow walls is C-103.

Elimination of staging reduces cost, enables ease of operations, promotes more launch versatility and landing flexibility. The structural design of these embodiments also enables a more efficient structure with reduction of interstage couplers and other staging assembly components. Many of the described embodiments can act as the single stage to get certain spacecraft or technology platforms designed for other missions to orbit. Infrastructure requirements to support this technology's operations depend on factors including vehicle sizing and specific propulsion subsystem integrated into the mobility platform, but are significantly reduced when compared to what is required for state of the art launch systems.

Modular Payload Compartments. The vehicle interior can include a payload compartment that can accommodate various payloads with a modular interfacing. Payloads can include but are not limited to data collection systems, sensory suite integration, weapons system integration, critical developing technologies requiring testing, cargo, supplies, flight test bed articles, novel heat shields and materials, sensory and imaging capabilities, remote surveillance, scientific instrumentation, additional propulsive systems, and or other flight payloads. In some instances, the payload may contain sensory suites and instrumentation embedded in the vehicle for data collection which do not require deployment, and could require mirrors, viewports, or windows integrated with the structural chassis for receiving, collecting, and transmitting information. The payload bay, compartments, and or cavity may be blended or embedded into the structure with mechanisms supporting various deployment or integration configurations, while more traditionally payloads are deployed from a vehicle system. The external structure of the cavity may be structurally integrated to support propulsive subsystem components like (but not limited to) air intakes, propellant storage, fluid movement and or dispersion, thermal protection for insulation, low thermal conductivity, and or resistant features to extreme temperature gradients.

Some embodiments for orbital operations may be appropriate to serve as a space debris removal system by capturing debris and storing them within the internal payload bay and recovering the material back to Earth or deorbiting them. Other space or orbital assets can be captured and stored within for deorbit. Other embodiments which are not deployed may look out the nose, mirrors, or other viewports for applications which may include data collection, storage, and or transmission.

Modular Exterior Interface Capabilities for Payloads and Airframe Nose and Body Attachments. The top section, nose region, or external faces of some embodiments may contain modular attachment interfaces to support a variety of payload attachments or configurations depending on mission requirements and system use cases.

Vehicle attachments such as nose cone configurations can act to improve aerodynamic performance, energy absorption, flight stability and control, increased internal volume, external surface area, and enhance cargo carrying capabilities. External interfacing and nose cone attachment variations can support a large range of payload mounting possibilities, enabling more internal volume for cargo and payloads, greater rideshare versatility for external spacecraft, hypersonic vehicles, boost-glide waveriders, upper stages for orbital access, orbital transfer vehicles (OTV), spaceplanes, swarm technology deployment, or other craft with independent mission requirements for orbital or interplanetary missions.

Different nose cone attachments can provide a variety of benefits to system performance. Nose cones embodiments can be designed to include better support for more massive payloads with or without larger form factors, incorporate generative topology design and or tear drop shapes for drag minimization, hypersonic aerothermal performance, testbed support, critical technology deployment, heat shield material development, digital twin integration, real time flight data collection, and remote sensing capabilities. Embodiments may be wider, longer, and incorporate various shapes, control surfaces, mechanical mechanisms, or trim angles to drive optimal system performance.

Some nose embodiments useful to support the extremely high temperatures of hypersonic flight conditions include a narrow cone with small angles to break the shock waves. The embodiment with a narrow, extended cone can use a central material in the middle that can withstand or ablate as a result from being exposed to the high enthalpy flow. Other hypersonic nose cone embodiments may include integration with a heat exchanger or heat pump with an internal lattice structure with good conduction and one or more working fluids and or phase change materials to manipulate the phase change of a coolant. Differential geometry as a function of distance away from the heated surface can enable cyclic phase changes of coolant material. Another nose cone embodiment that is capable of supporting the high temperatures experienced in hypersonic flight is dispensing and recapturing ions to deflect the air from the body.

Embedded Structural Propulsion System Components. Propulsion subsystem components and elements can be directly embedded into the structure to allow for easily customized propulsion configurations based on mission requirements. As the system architecture of the mobility platform is dictated by mission requirements, the number of air breathing propulsion units, solid rocket boosters (SRBs), liquid propulsion systems, and or other advanced propulsion systems (such as nuclear thermal propulsion) can be easily scaled, added, or removed to promote rapid reload or refuel operations. The structural elements like the diameter of the platform can be scaled and sized to support various mission requirements and payload, propulsive, structural, and thermal requirements.

Liquid propulsion elements including tanks and supportive propellent delivery systems like plumbing, feed systems, valves, pressurization units, and fluid management devices can be directly integrated to the structural walls. Airbreathing propulsion elements including air intakes, fuel storage, flow channels, piping, and ducting can be housed directly embedded into the structural wall member of the embodiment. The ability to blend the propulsion system components to the physical structure allows for component and structural weight reduction, maintaining and enabling design advantages for structural efficiency. Easily configurable operation of a variety of propulsion systems allows for a wide range of mission operations to be satisfied.

Aerodynamic outer mold line geometric structural airframe design and nose cone integration. According to preferred embodiments, the outer mold line structure of the vehicle can be aerodynamically designed for the given mission flight environments based on the intended use cases of the flight mobility platform. With today's advanced engineering tools and computing resources, digital blocks representing the design in the simulation space can be appended to requirements, constraints, and parameters which help inform digital tuning of the model for a given mission or flight envelope.

The mission environment and payload inform propulsion requirements for the vehicle. Propulsion requirements dictate the structural chassis infill material selection and sizing for fuel storage volume and multi component wall integration design. Wind tunnel and flight testing may further inform and or refine outer mold line design for optimal aerodynamic vehicle shape, inlets, ducting, and control surface integration for flight performance. Variation in angles of the bi conical shape may change from the forebody to aft region of the vehicle, which will impact the aspect ratio of the aircraft. Wall sizing, infill material selection, thermal protection integration, and thickness of the external outer mold line varies upon the embodiment structural requirements for the given configuration. Depending on the integrated propulsion system(s) selected for the use of the embodiment, the maximum diameter size of the vehicle could range from just a few feet to many hundreds of feet. Most embodiments will range between eight to one hundred and eight feet. Certain propulsion systems will lend themselves to larger aspect ratios due to propellant storage, thermal management, and air ducting blending to the structure. Air intakes, flow channels, piping, and ducting are blended with the structural multi-component walls, having various inlet and ducting configurations for subsonic, transonic, supersonic, and hypersonic flight environments. This ducting providing airbreathing can all be integrated into a single vehicle structure. The blended air intake further provides structural support to the airframe.

Various nose cone attachments that can be used to aerodynamically improve system performance for the desired flight environment(s). Some nose attachments and wall structural blending will entail multi-component structure design for thermal management of heating loads due to high speed flight environments, which may include TPMS infill to increase internal surface area, active cooling from working fluids, regenerative cooling through capillaries and plumbing in the structures, fluid communication, thermally insulative material infills for conductive and radiative shielding, phase change materials, and ablative materials.

Efficient structural volume utilization and improved form factor design. The ability to integrate the thrust chamber into the structure within the vehicle base at or near the largest diameter portion enables the utilization of ambient surrounding as part of the nozzle providing optimal flow expansion at all altitudes. The aft section of the base houses other critical systems and elements enabling maximized efficiency of the utilization of the volume within the vehicle structure. Current rockets utilize long bell nozzles to achieve optimal or efficient flow expansion for certain flight altitudes and take up significant percent of the overall sizing budget of the vehicle. Eliminating the need for large form factor nozzles that achieve necessary expansion ratios saves mass and creates more efficient form factor capabilities. These efficiencies can then be utilized on storing the necessary propellant volume required for a single stage vehicle to achieve orbit. Furthermore, by utilizing a large diameter, the volume scales with the radius squared rather than linearly with the height as is done by missile based airframes of existing rocket architectures. This enables more volume to package propellant storage or other technology enabling systems like airbreathing propulsion systems.

Geometries of most embodiments may range from several feet in diameter capable of housing microturbine air breathing technology, rocket based propulsion, and or small auxiliary propulsion system(s) meant for rapid and low altitude flights and are able to scale to a diameter of 50 to 250 feet or more for heavy boost to orbit and other orbital and reentry applications.

Full mission lifecycle design. Launch vehicle systems are staged with payloads that can be designed and integrated for the specific mission. Multiple successive steps are executed for a mission to be successful. For example, stages must individually fire and perform separation to get the payload to the orbital environment in space. Once in the orbital environment, the payload is released from its fairing to embark on its designated mission.

Based upon how space is currently accessed with existing rocket propulsion based launch vehicle architecture, the payload is designed specifically around how it needs to be moved through space, being ultimately constrained by the narrow diameter of the missile-like architecture. The fairing, housing, or storage cavity location of the launch vehicle fastens to the top of the narrow airframe. Depending on the goal of the mission, the payload (which could be a spacecraft, satellite, space plane, waverider, planetary probe, lander, scientific instrumentation package, orbiter, rover) can rideshare on an OTV (Orbit or Orbital Transfer Vehicle), propel itself to a defined orbit for space operation, embark on its journey through space, or be capable of landing on a planetary body such as the moon. Many described embodiments can limit the need for such complex moving parts and the coupling of many systems together to achieve a single mission. The embodiment is intended to be able to serve as a complete, integrated solution. The payload is completely integrated to the vehicle platform due to the nature of the systematic coupling of the system architecture.

Embodiments described are capable of integrating all complexities into a single flight platform for mobility. For example, some embodiments can be scaled to do lunar missions, acting as the launch vehicle, lander, base station, and return capsule. This represents a total mission solution versus using many coupled systems or subsystems to achieve a mission or goal which requires flight mobility and space access. In such cases the entire vehicle could fly from Earth to the moon, land, and take off from the lunar surface, returning to earth with cargo.

Precision return from orbital placement. Some embodiments can be designed for integration into payload fairings of existing launch vehicles. For compatibility with a rideshare to orbit, the system can have a height of roughly 9 feet and maximum diameter of roughly 13 feet, giving this vehicle aspect ratio of 0.69:1. Some of the embodiments discussed with respect to FIGS. 17A and 17B can be capable of this. The vehicle must be delivered to a desired orbit, and can be capable of dynamically changing orbits. The vehicle can maintain orbit until tactical orbital insertion is required or requested. Given the period of a low Earth orbit is 90-120 minutes, such a vehicle can maneuver and begin deorbit burns with integrated auxiliary propulsion systems. This can allow the vehicle to descend on demand to locations of interest within a maximum of 2 hours.

Vehicle embodiments placed on orbit can remain in space with cargo for extended missions, and certain embodiments can additionally act as a satellite to serve other functions provided by orbital assets. Such embodiments have the compatibility to be integrated to support other existing technology suites like sensory, imaging, and communication while supporting novel responsive space delivery. The vehicle can be integrated with thermal protection systems to survive the peak heat rate and total heat load during atmospheric reentry and deceleration. Upon direction, the vehicle can perform atmospheric reentry and hypersonic aerodynamic braking based on a trajectory selected based on GPS coordinates of precise landing location. This embodiment is designed to enable precise reentry into Earth's atmosphere and utilize hypersonic aerodynamic deceleration with a transition to powered airbreathing propulsion systems for controlled descent at or below 35,000 ft for example. Using GNC algorithms and on-board controls which could be autonomous, the vehicle can perform precision landing and harnesses the capability for critical asset extraction if needed. The rapid reentry and precision landing can enable time sensitive logistics support.

Once the vehicle is traveling subsonic, on board airbreathing propulsion will be activated and the system can autonomously descend and perform precision landing en route to the landing zone.

The vehicle can deliver its critical payload or services as determined by the end users and some embodiments can allow for extraction by storing additional propulsion systems on board for use after landing at the desired location. The vehicle can ascend using the onboard air breathing propulsion system and once at a safe altitude depending on the scope of the mission, a series of solid rocket boosters (SRBs) or other rocket based engines can be activated to provide necessary propulsive capabilities to perform rapid extraction en route to a safe zone such as military bases, allied territories, naval crafts and other predetermined locations. Although downmass reentry systems are available today, they are unable to extract themselves from contested and austere environments. Operation in remote or austere environments can necessitate capabilities that can handle precise cargo delivery with autonomously controlled, externally controlled via radio frequencies or other means, and/or preprogrammed extraction; as handing over technology, intelligence, or supplies to adversaries can pose a national security risk. The lack of rapid orbit-to-Earth delivery systems results in hindered payload delivery to critical locations, as traditional aircraft methods are significantly slower, unable to perform reentry, and require nearby aircraft assets to drop supplies with parachutes or land in hostile environments. Traditional methods can face vulnerability to disruption from anti-air defense systems due to predictable flight paths as well as may require infrastructure for operation. Inaccessible areas pose a challenge for current transportation and resupply systems, limiting the military's ability to project power and provide support in austere environments.

After completion of the mission profile, the highly reusable vehicle system can be resupplied and returned to orbit. Resupply costs per mission should be marginal; propulsive systems will need to be refueled, TPS (Thermal Protection Systems) might need minor refurbishment, and novel cargo may need to be reintegrated to the vehicle. Costs of launch and orbit return logistics are the most limiting factors for implementation.

Single stage to orbit capability. According to some embodiments, a vehicle is described that is capable of achieving orbital velocity in one single stage. With currently used rocket launch systems or winged orbital systems, there has always been a need to perform successful staging events in order to propel the payload to orbit. This allows for removal of parasitic mass, which has been critical to achieve orbital velocities. However, the blending of critical systems—like but not limited to structural, propulsion, and thermal—with current advancements in manufacturing can enable the reality of such a capability. Allowing for a single body vehicle to perform orbital flight and reentry can drive consumer costs down and accessibility to space will be accelerated. Such embodiments represent a complete ascent, entry, descent, and landing architecture.

Many of the described embodiments can achieve one or more of the following objectives: launch, flight services, cargo logistics, human transport, and data collection. Some embodiments are directly capable of offering launch, flight services, cargo logistics, human transport, and data collection to serve a wide range of use cases for military, intelligence, civil, and commercial domains. In flight vehicle capabilities are expanded upon when discussing implementations.

Reentry services/downmass capabilities. The extremely low ballistic coefficient of this vehicle enables downmass capability for transport of cargo, supplies, or orbital assets from space to Earth or to other atmospheric planetary bodies. New markets can be enabled, offering atmospheric reentry services to support payload or other downmass return from space with precision, propulsive landing capabilities by the vehicle. Such a service can enable further innovations and novel tech in space environments, such as using microgravity for space manufacturing, infrastructure assembly, pharmaceutical development, and scientific research.

Known atmospheric reentry systems and vehicles lack use of integrated airbreathing propulsion systems for precision landing, relying solely on other recovery mechanisms which can include parachutes, paragliders, and or inflatable devices. Such known systems tend to require additional human support, assets, and or resources for complete recovery on land or water. Currently used downmass reentry systems may not be capable of supporting large and or massive payloads on the order of tens of thousands of pounds depending on exact embodiments and their respective trajectories to be flown. Embodiments that perform rocket based propulsive landing can increase this value as allowed by the overall thrust to weight ratio achievable by the embedded propulsion system utilized during descent and landing.

Making space more accessible. The high level of reusability allows for high flight cadence which can support a cheaper barrier of entry for spaceflight. The lack of infrastructure and operational needs to support frequent flights allows for costs to be further driven down. External and internal adaptable payload support enables more accessibility for different technical concepts or large volume payloads to get to their end destination.

Embodiments can embark on custom orbits and trajectories, with abilities to house, boost, or deploy secondary payloads that are capable of doing so. Embodiments can directly support on-demand logistics of orbital assets. It can enable objectives of refueling, asset recovery, refurbishment, and relaunch for satellites or other assets on board that would otherwise need to be decommissioned or terminated.

Dynamic mobility on orbit. Following ascent or placement into an orbit by another vehicle or entity, some embodiments can enter a predetermined orbit and remain until required to relocate or maneuver depending on end user needs. The system can be fully autonomous and integrated into existing communications and guidance systems, acting like a dynamic satellite or spacecraft. State of the art in-space propulsion systems can be integrated to enable dynamic orbit transitions, deorbit, and landing.

Support of planetary exploration. As some embodiments are scaled to support lunar and interplanetary flight, their airframes allow for significant downmass capabilities and serve the ability to mine, capture, and or return resources or other assets to Earth from space. Some embodiments can land on planetary bodies and return to Earth, including but not limited to moons, asteroids, comets, and other planets. Some embodiments could have a variety of integrated subsystems to support planetary base infrastructure set up, autonomous exploration, in space resource collection for materials or energy.

Operational capabilities before orbit. While embodiments described in this section have been geared towards space access, suborbital capabilities provided by some embodiments which will enable lower cost space access by acting as a boost platform, replacing the first stage of current launch vehicle architectures. Such a system can enable the concept of first stage as a service. The increased efficiency of the vehicle with its embedded systems, increased structural efficiency, and hybrid propulsion systems can enable upper stages, kick stages, or orbital boost stages as well as other propulsive spacecraft systems to achieve stage separation at higher altitudes and velocities without penalizing their own systems and enable more range, increased velocities, higher payload capacity, less fuel requirements, reduced cost, and greater propellant budget to enable more maneuvers in space. The embodiment serves to enable a more efficient first stage compared to missile based airframe rocket architectures in use today due to lack of infrastructure requirements for operation and high flight cadence.

Some embodiments can accelerate hypersonic testing and development, offering Mach 5 (and other mission required Mach numbers) as a service. Some embodiments can enable material and technology demonstration, and can provide critical data to improve technology readiness and develop emerging technologies. Some embodiments can serve for rapid point to point suborbital cargo delivery, remote sensing, videography, and rapid human transit.

Dynamic embedded satellite platform. Some embodiments can provide dynamic operability for commercial, defense, ISR, and civil satellite functions.

Enable mobility for orbital transfer and atmospheric reentry for some embodiments that are embedded with satellite technology deemed necessary for dynamic responsiveness for reconnaissance, imaging, communications and other orbital operation requirements for government, civilian and commercial operations. Instead of a vehicle platform deploying a satellite payload with such operable capabilities, these capabilities can be integrated directly to the flight platform enabling a complete mission solution according to this patent specification.

Reusable flying payload deployment silo and range extender system for deterrence and swarm technologies. The vehicle in some embodiments can also serve as a reusable range extender system and flying silo for deploying payloads and testing critical technologies which may be used for deterrence, defense, and targeting. This system functions by enabling smaller rocket, drone, waverider, boost-glide vehicle, and or swarm systems to achieve mission objectives without requiring them to be deployed by other means or to have excessive propulsion systems on-board. The reusable flying deployment silo can carry other vehicle systems to a high altitude range of about 20,000 to 40,000 feet for example in embodiments supported with airbreathing propulsion systems like turbojets. The vehicle would fly vertically and can pitch to various angles using thrust vectoring and deploy systems out of the middle payload section designed to be a silo in this embodiment. As such, this can increase the operational range significantly without requiring larger rocket motors. The flying silo can then come back to base or its launching point to be reloaded with new payloads and be refueled to launch again. By launching at higher altitudes and velocities, smaller and more affordable systems can achieve their objective at ranges previously unreachable in standalone state. This embodiment can serve as a technology enabler to systems that would previously not be qualified for certain mission requirements. This can provide better resource management and add strategies for asset utilization. Embodiments of such a system could further gather intelligence and communicate with ground based and air launched assets.

FIG. 1 is a cross section view of a mobility platform or vehicle according to some embodiments. Mobility platform or vehicle 110 can include a blended structural skeleton 120 having a main aerodynamic exterior mold shape. Skeleton 120 is integrated with systems embedded or integrated to structural wall members that create the main airframe chassis of the skeleton 120. Vehicle 110 further includes engine bay 130 housing the propulsion systems 170 and 180 at the aft of the vehicle 110, a modular internal payload compartment 150, and nose cone 160. As used herein the terms "structural chassis", "structural skeleton" and "structural shell body" refer to a load-bearing framework of the vehicle, which structurally supports the vehicle in its construction and function. These system architecture pieces of vehicle platform 110 can be decomposed into many subsystems, components, and elements.

Structural chassis 120 is integrated with the fuel tanks 182 at the inside of a skin 183 made of a material such as stainless steel, a niobium alloy such as C103, or another aerospace grade skin material such as tungsten, Inconel, titanium, aluminum, cobalt-base alloys, copper alloys, and alloys of any of the above. Integrated lattice fuel tank structure 182 holds one or more fuels used for liquid rocket propulsion system 180 in groups of multiplicities of interconnected cells described in more detail below in connection with FIGS. 10 and 11C-16C. In this example, an architectured gyroidal wall thickness (shown schematically) is sized appropriately for the given propellants and can be hollowed out to support the thermal gradient of the fuel and oxidizer. Integrating tanks 182 aids in optimizing structural strength, lightweighting, energy absorption, and thermal management for vehicle platform 110. Multi-component tanks 182 can be integrated to support design efficiencies for thermal management, fluid communication, electric conductivity, propellant and phase change material storage, capable of holding three or more components together in the same volume. In general the tanks can include multiple propellants for the various propulsion systems as well as active or phase change materials for thermal management. In some cases, incorporating three or more components into the walls of body 120 can be quite useful for the implementing storage of cryogenic propellant within the structural walls of the airframe. Rocket propulsion system 180 also includes rocket engine module 184. The air breathing engine propulsion system 170 includes two types of air intakes, side air intakes 172 and forward air intake(s) 174. Forward air intakes 174 move air directly along the internal cylindrical payload bay 150. According to some embodiments, fuel tanks, air intakes, as well as other thermal protection materials to support propulsion system operations for subsonic and hypersonic flight are embedded and integrated into the structural skeleton 120. The skeleton or chassis 120 provides the overall aerodynamic shape of the external airframe, structural mounting and attachment points, and embedded subsystem members blended with the structure. An avionics system (not shown) can be housed within the engine bay 130 or the structural shell chassis 120.

The internal payload bay 150 fits inside the upper neck of the vehicle 110 and supports modular integration of items which can include cargo, spacecraft, infrastructure elements, services, and or other mission specific elements. Various nose cone attachments 160 can be applied to the system architecture given the mission use cases of the system.

Figure 2:
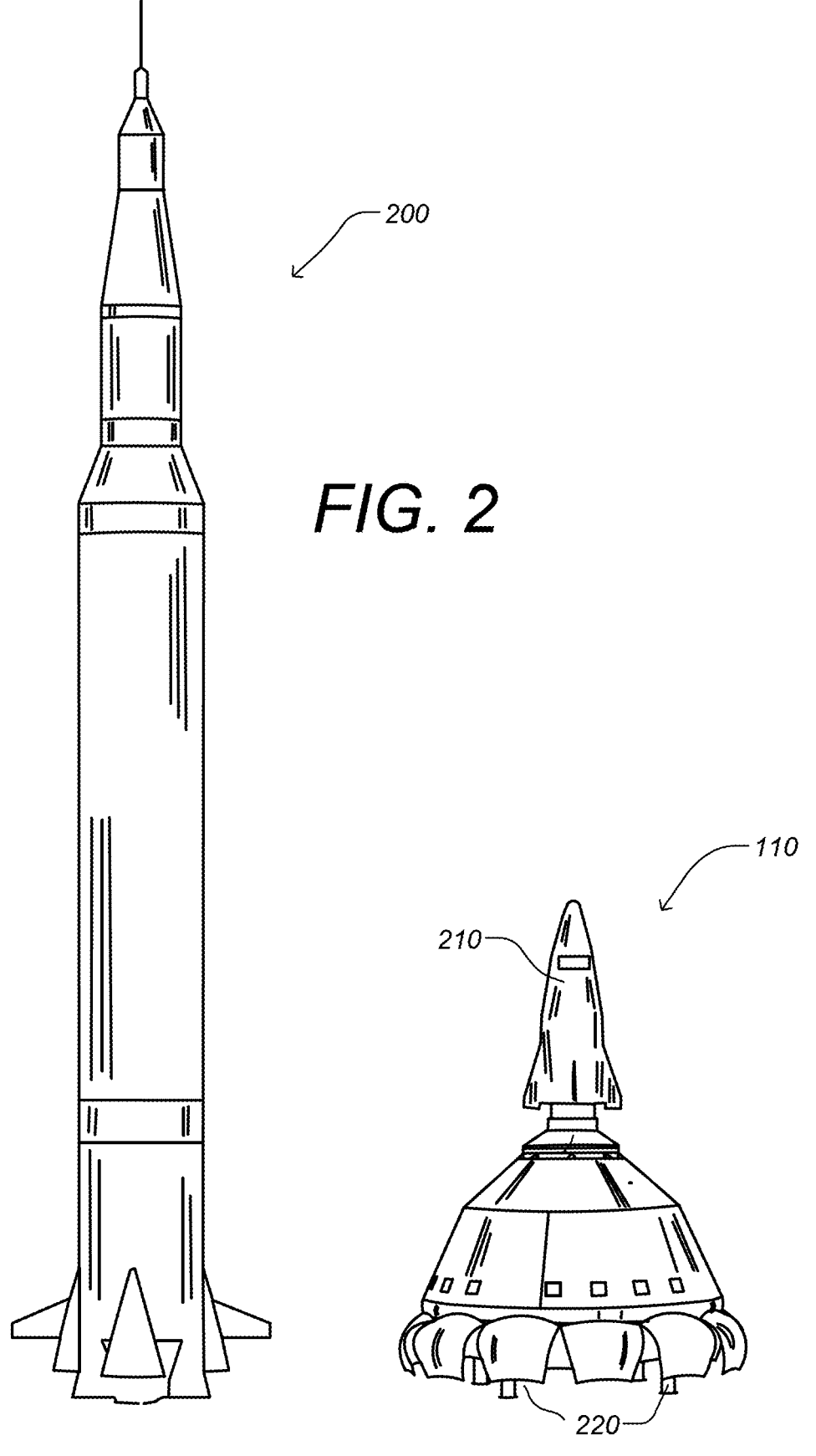
FIG. 2 is a side view showing the aspect ratios of a legacy launch vehicle, the Saturn V, and a vehicle platform according to some embodiments.

FIG. 2 is a side view showing the aspect ratios of a legacy launch vehicle, the Saturn V, and a vehicle platform, according to some embodiments. The Saturn V (200) has an aspect ratio of about 11.1, whereas the vehicle 110 has an aspect ratio of about 1.5. Also visible in FIG. 2 are nose attachment 210 and legs 220.

Figure 3A:
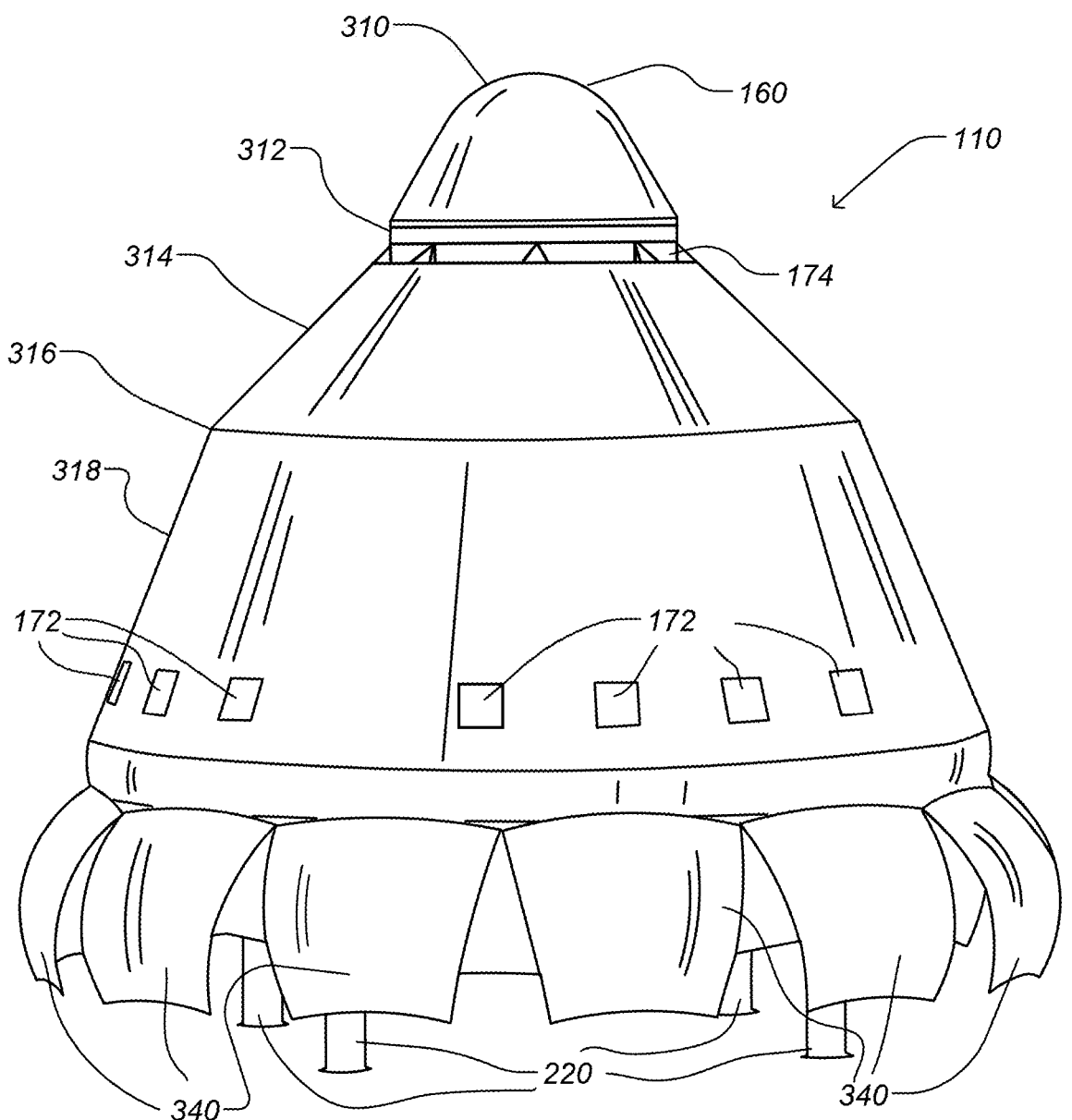
FIGS. 3A to 3E are various views of a vehicle platform according to some embodiments.

FIGS. 3A to 3E are various views of a vehicle platform according to some embodiments. FIG. 3A is a side perspective view of a vehicle platform 110 as it might be viewed on the ground or on some surface. Retractable legs 220 are shown in their extended position. Although three legs 220 are shown, other numbers of legs can be used such as 4 and 5 legs. In some embodiments, legs 220 are not retractable. Vehicle 110 is shown with nose cone 160 having a rounded, spherical leading end 310 and a conic portion. Nose cone 160 can be actuated for example using a hinge mechanism (not shown) such that the internal payload compartment can be accessed. Below nose cone 160 is a short cylindrical portion 312. The biconic exterior shape of the mid portion of vehicle 110 is shown and is defined mainly by conic portions 314 and 318 joined at ridgeline 316. Multiple air intake openings 172 are shown circumferentially spaced about the lower end of conic portion 318. Openings 172 have actuable doors (not shown) that are configured to fully or partially cover each opening 172. Actuable mechanical flaps 340 are spaced about the lower (aft) end of vehicle 110. Flaps 340 are shown in an extended position, as might be during a service or inspection procedure on the ground. Flaps 340 can be extended to allow solid or liquid rocket engines to operate, such as during a launch of vehicle 110. According to some embodiments, flaps 340 act as altitude compensating nozzles, base structure and selectively enclose engine bay 130.

Figure 3B:
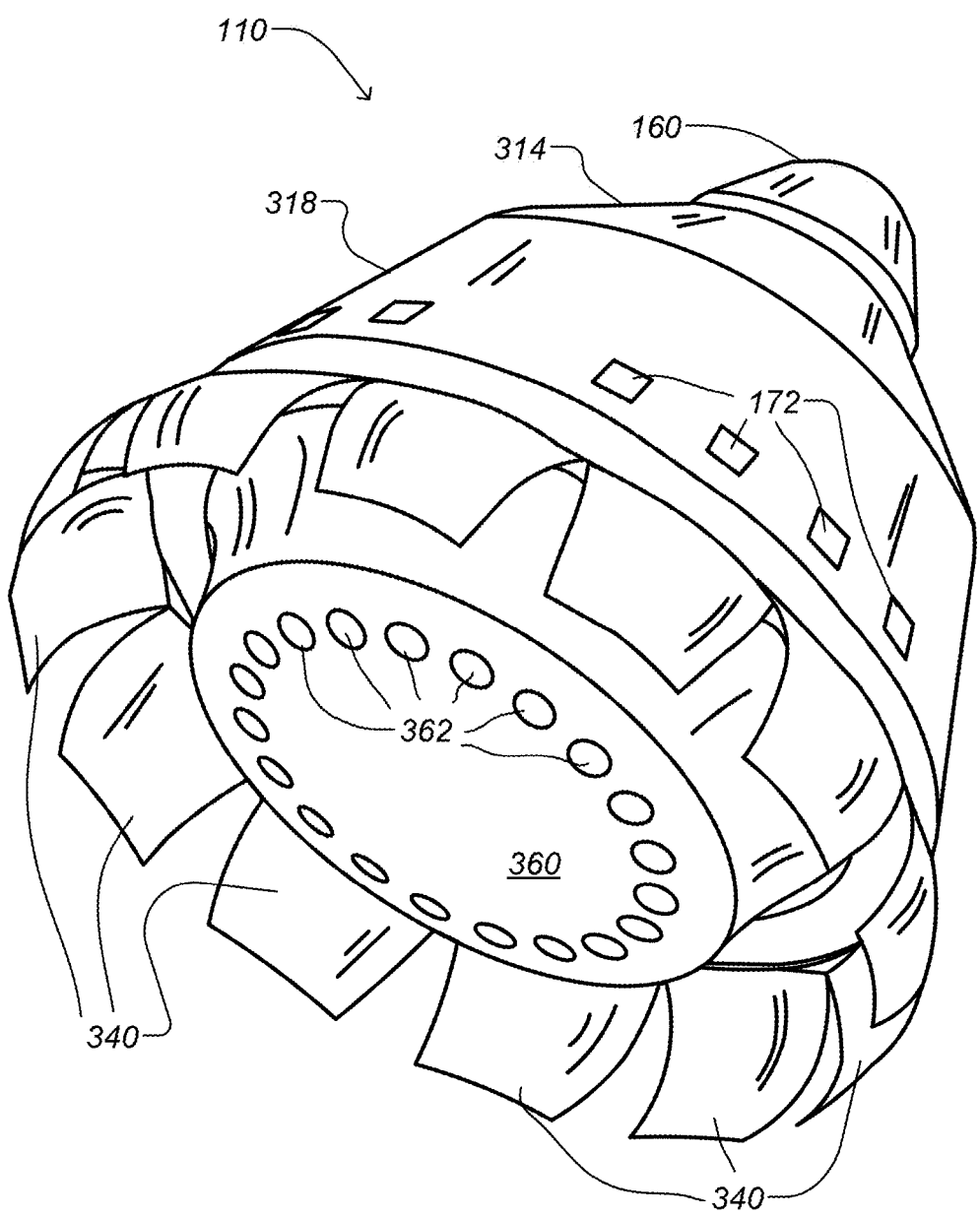
Figure 3C:
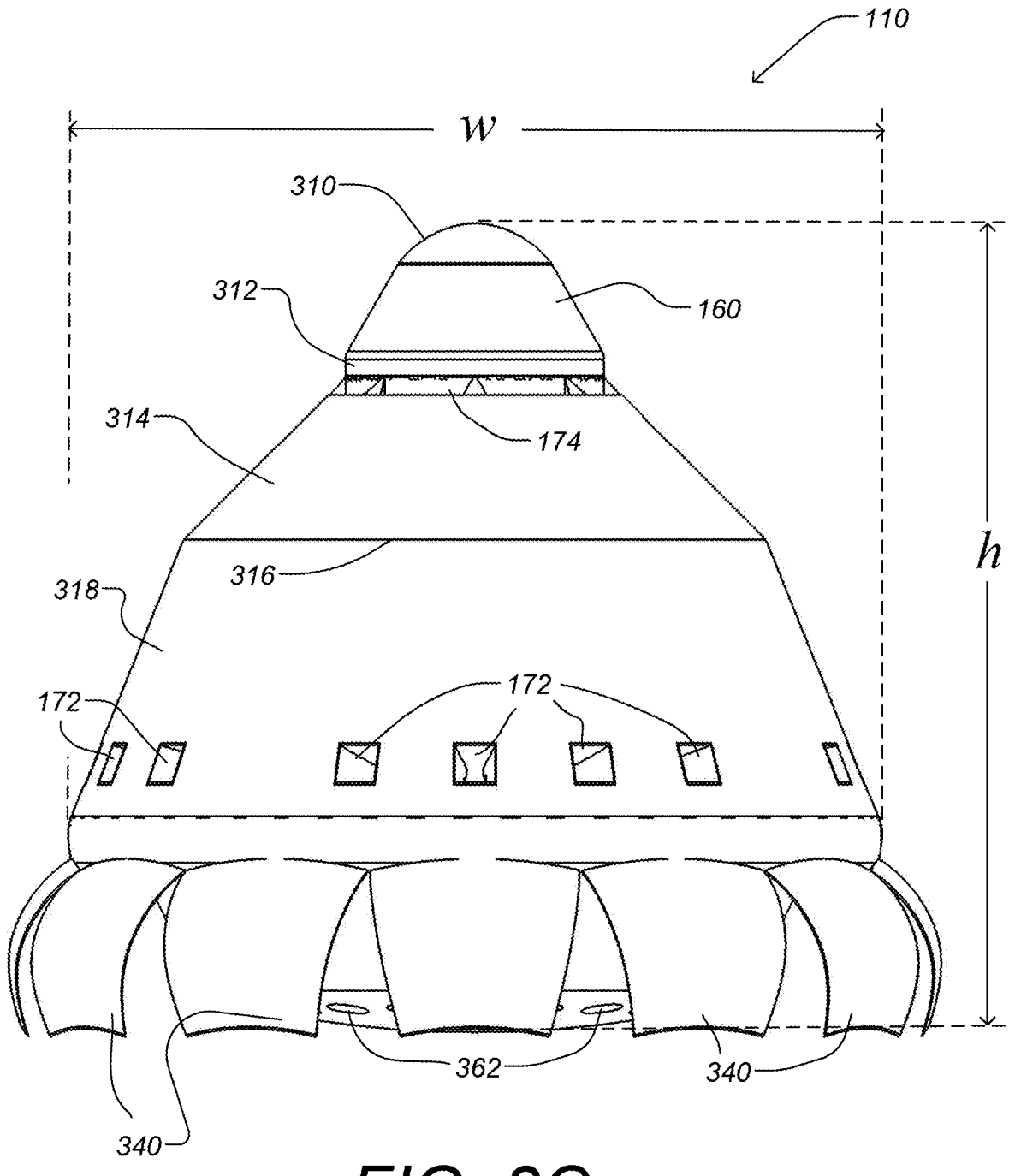
Figure 3D:
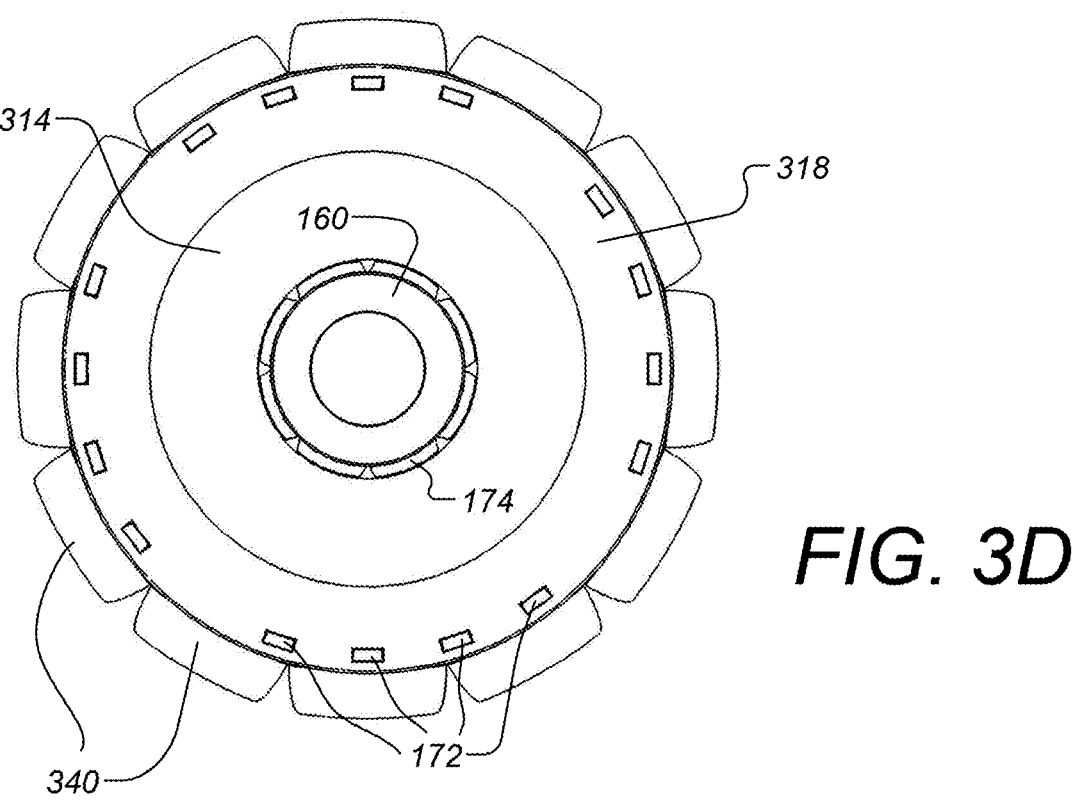
Figure 3E:
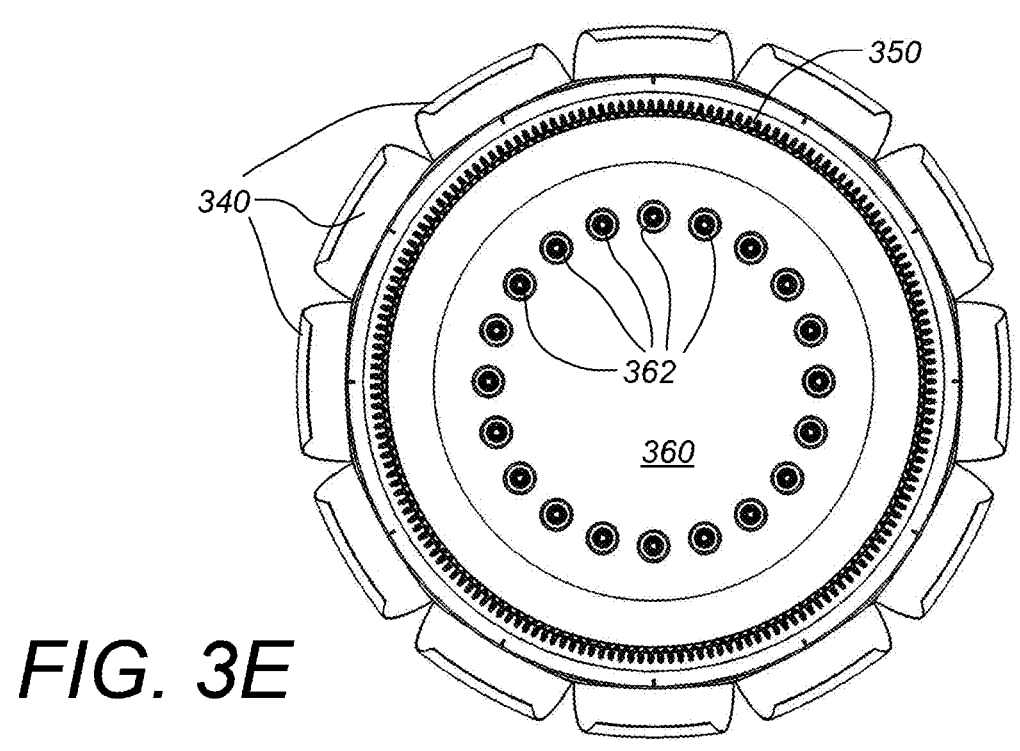

FIG. 3B is a perspective view of vehicle platform 110 as it might appear during a launch phase. On the rounded lower (aft) surface 360 are several exhaust ports 362 for air breathing engines, such as jet engines. According to some embodiments, a hybrid propulsion system is implemented which includes both air breathing propulsion and rocket propulsion. FIG. 3C is an elevation side view of vehicle platform 110. FIG. 3C illustrates a vehicle platform that is 80 feet wide and 110 feet tall with a stubby nose cone attached, having an aspect ratio of 1.37:1. According to some embodiments, the dimensions h and w can range from 25 feet to 200 feet, with such dimensions dictating the number of embedded components and the final aspect ratio range of the vehicle between 1.2:1 and 2.4:1, depending on the included nose cone attachment. FIGS. 3D and 3E are top and bottom views, respectively, of the vehicle 110, according to some embodiments. Rocket engine exhaust nozzles 350 is shown in the bottom view 3E.

Figure 4A:
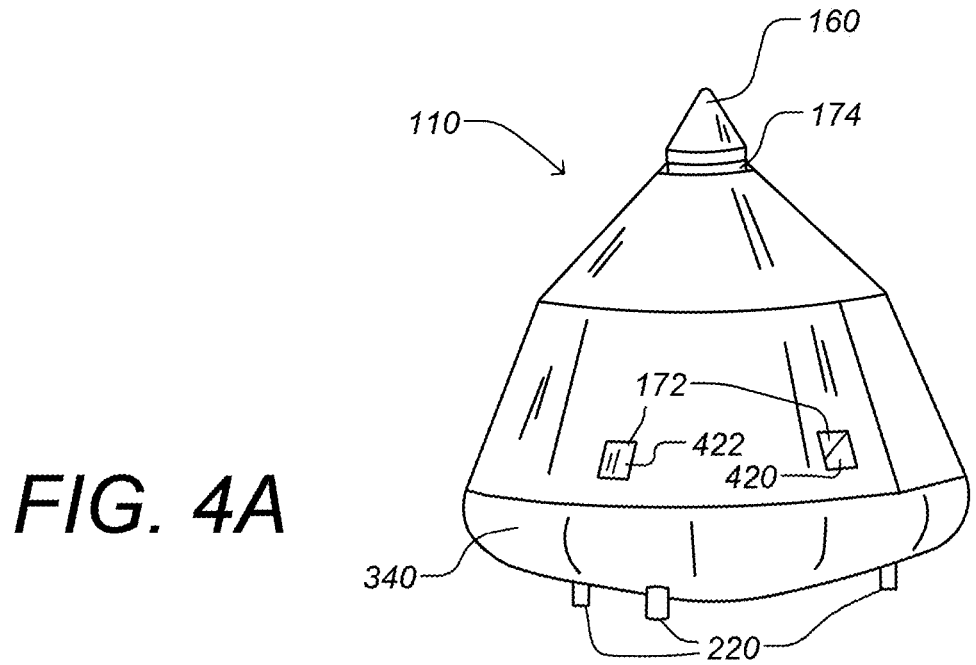
Figure 4B:
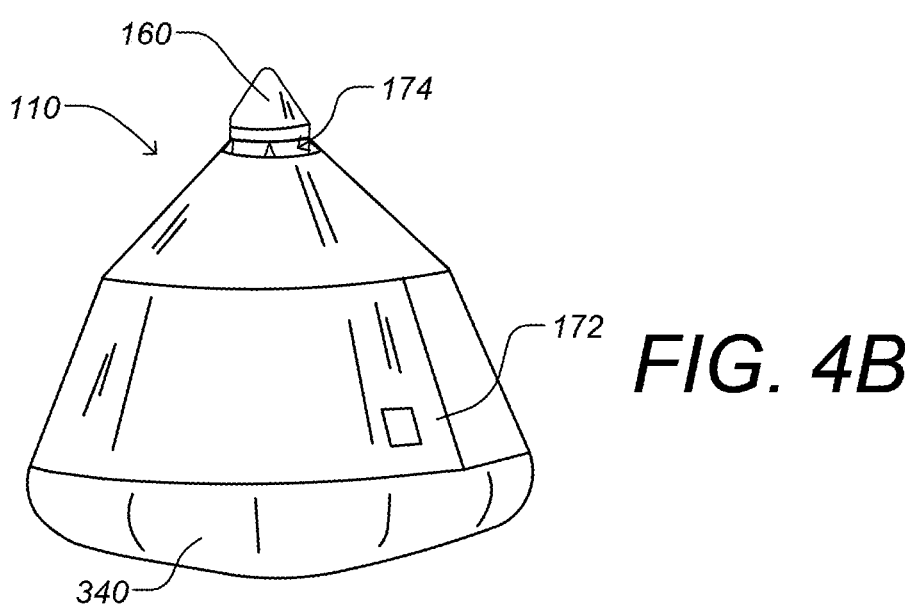
Figures 4E, 4F, 4G:
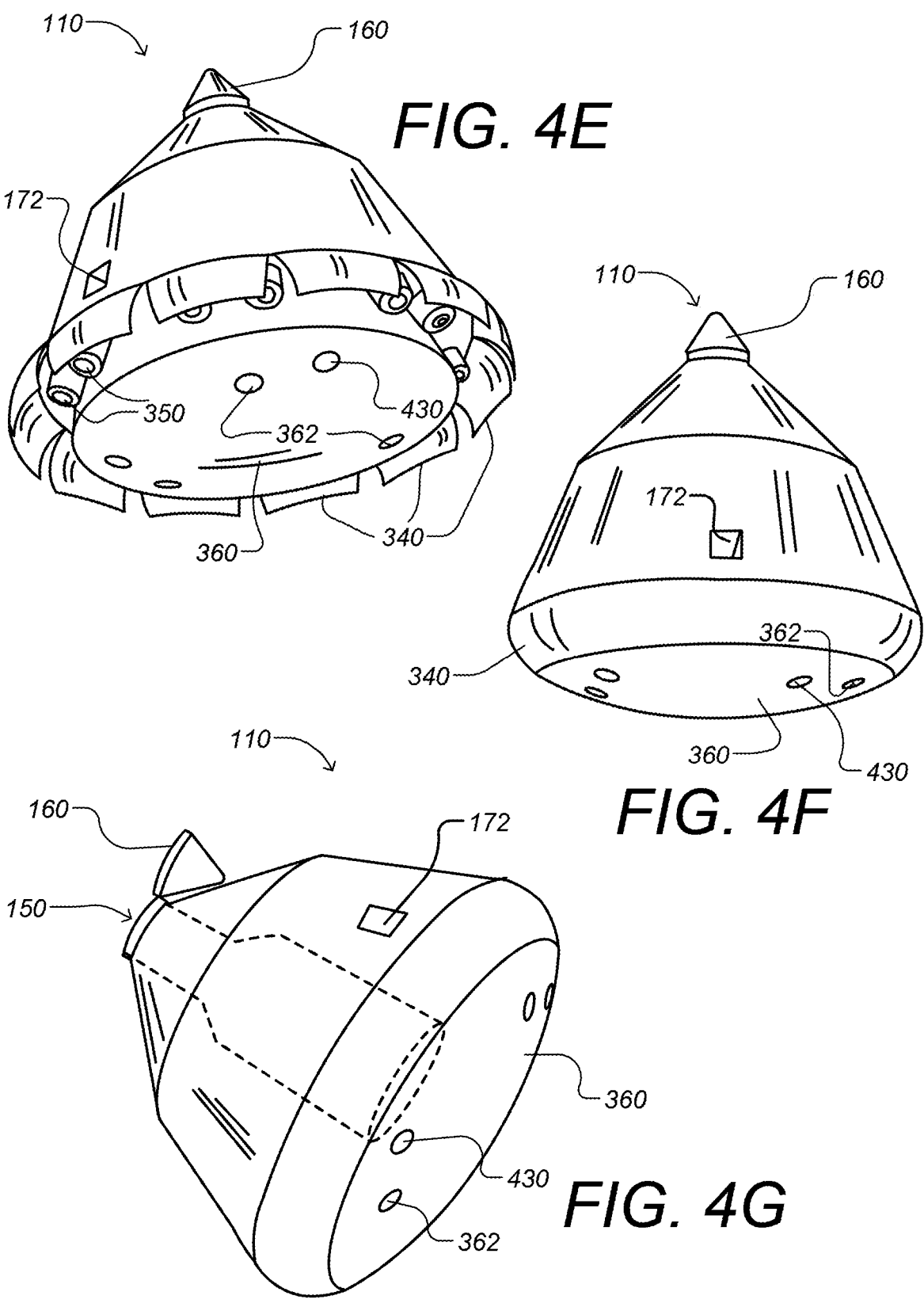

FIGS. 4A to 4G are various views of a vehicle 110 having a slightly different outer geometry than that of FIGS. 3A and 3B, according to some embodiments. In these examples, the nose cone 160 has a less blunt shape and is slightly smaller in size, relative to its body. FIG. 4A shows vehicle 110 with legs 220 extended, as it might appear on the ground, or at low altitudes such as just after launch or just prior to landing. Flaps 340 are shown retracted, as they may appear when the rocket engines are not in use. In this position, flaps 340 also act to protect components that otherwise would be more directly exposed to harsh conditions, such as during reentry into the atmosphere. Two air intake ports 172 are visible. One port (420) is shown open the other port 422 is shown closed. FIG. 4B is similar to FIG. 4A except that legs 220 are retracted. FIG. 4C shows vehicle 110 with legs 220 and flaps 340 extended. FIG. 4D shows the vehicle 110 with legs 220 extended and nose cone 160 in an open position. With nose cone 160 in an open position, payload bay 150 (shown in dashed line) can be accessed. FIG. 4E shows vehicle 110 with flaps 340 extended and several of the rocket exhaust nozzles 350 are visible. Also visible on surface 360 are jet exhaust ports 362 doors 430 that cover the extendable legs. According to some embodiments, legs 220 are configured so that the lowermost surface of the legs cover the holes in surface 360 from which the legs protrude. Thus what is visible in FIG. 4E are the bottom portions of the legs 220. FIG. 4F is similar to FIG. 4E except that the flaps 340 are retracted. FIG. 4G shows the vehicle 110 with nose cone 160 opened while the legs are retracted. This is how the vehicle 110 might appear when the payload compartment is being accessed while in space, such as to deploy or retrieve equipment.

Figures 5A, 5B:
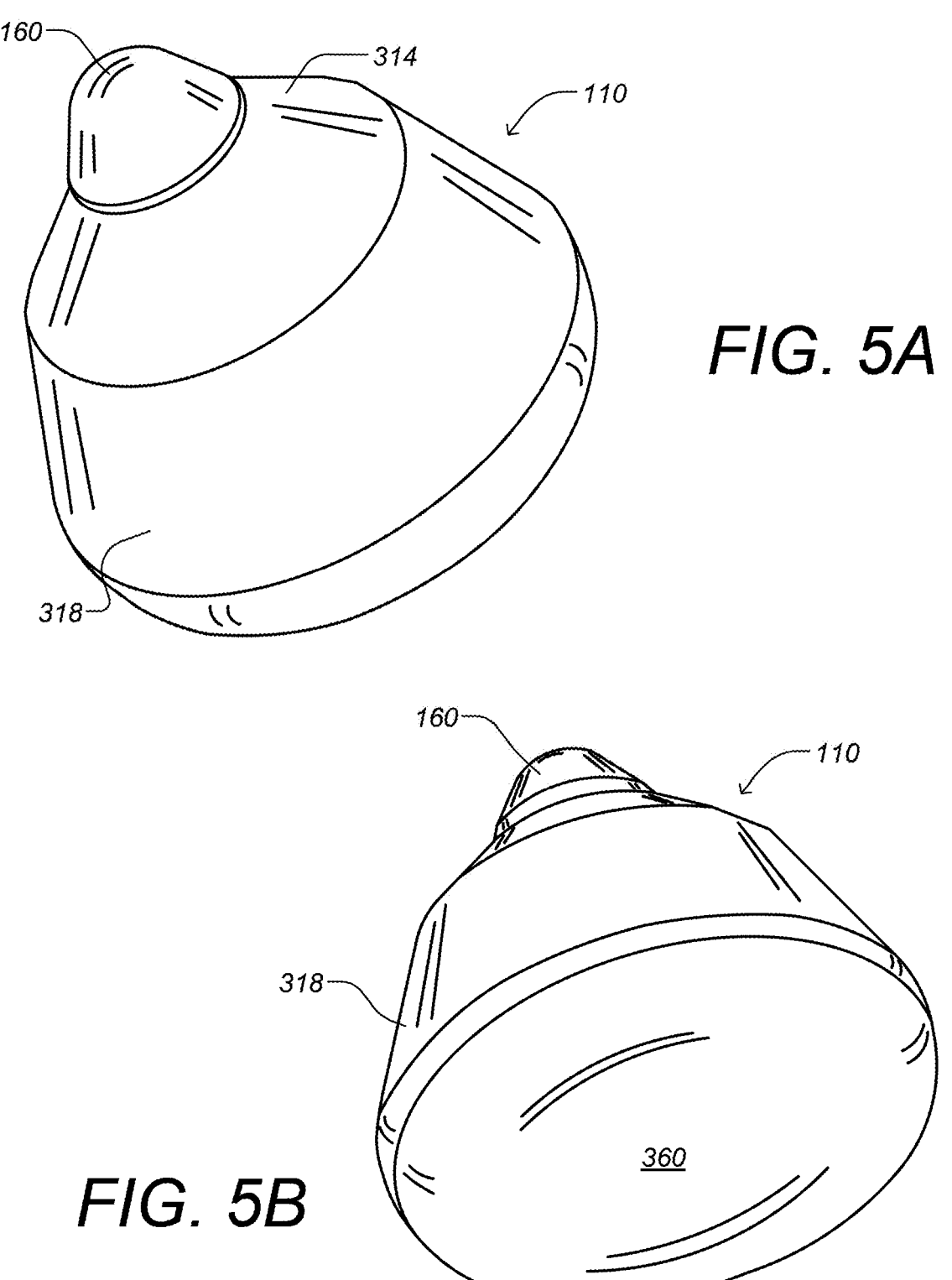
FIGS. 5A-B are perspective views of a vehicle platform having exterior proportions similar to the vehicle shown in FIGS. 3A and 3B, according to some embodiments.

FIGS. 5A-B are perspective views of a vehicle platform having exterior proportions similar to the vehicle shown in FIGS. 3A and 3B, according to some embodiments. FIGS. 5A and 5B show the air intake openings closed, mechanical flaps and legs retracted, and exhaust ports closed.

Figure 6A:
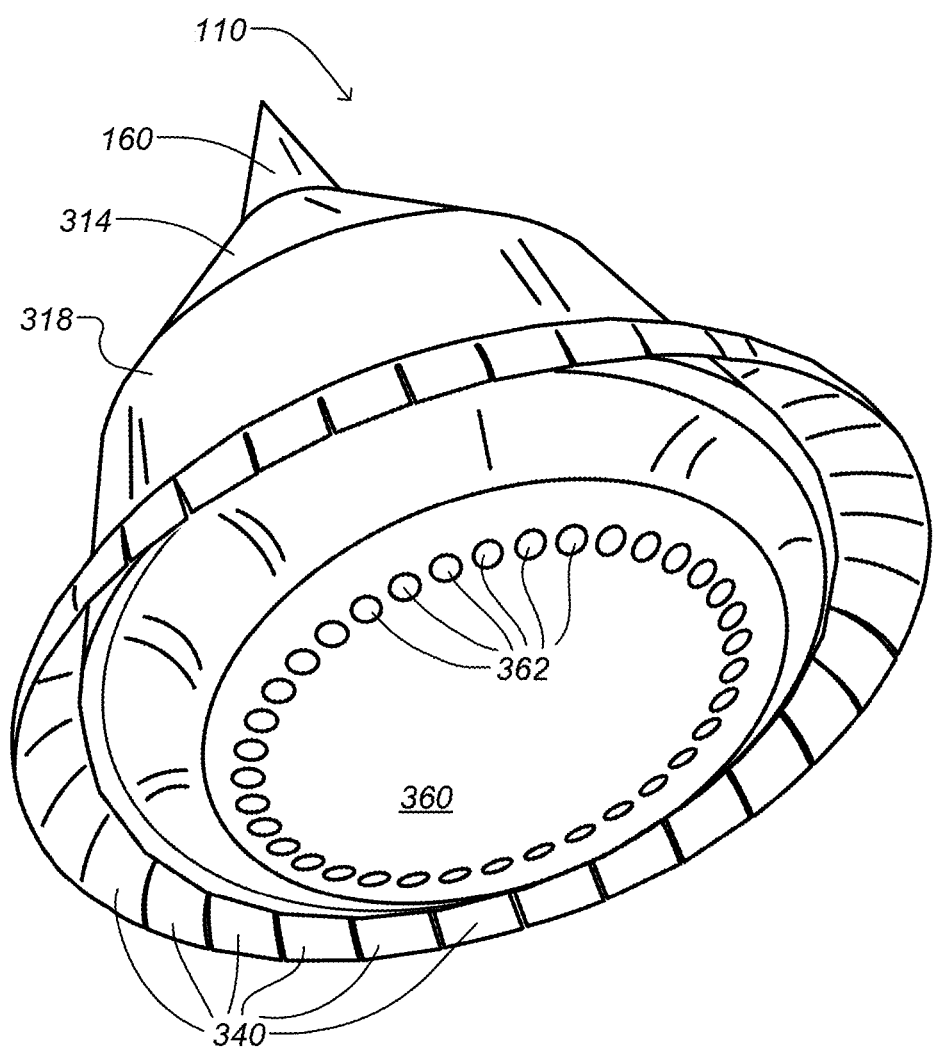
FIGS. 6A to 6G are views showing further aspects of a vehicle platform having slightly different shape, according to some embodiments.
Figures 6B, 6C:
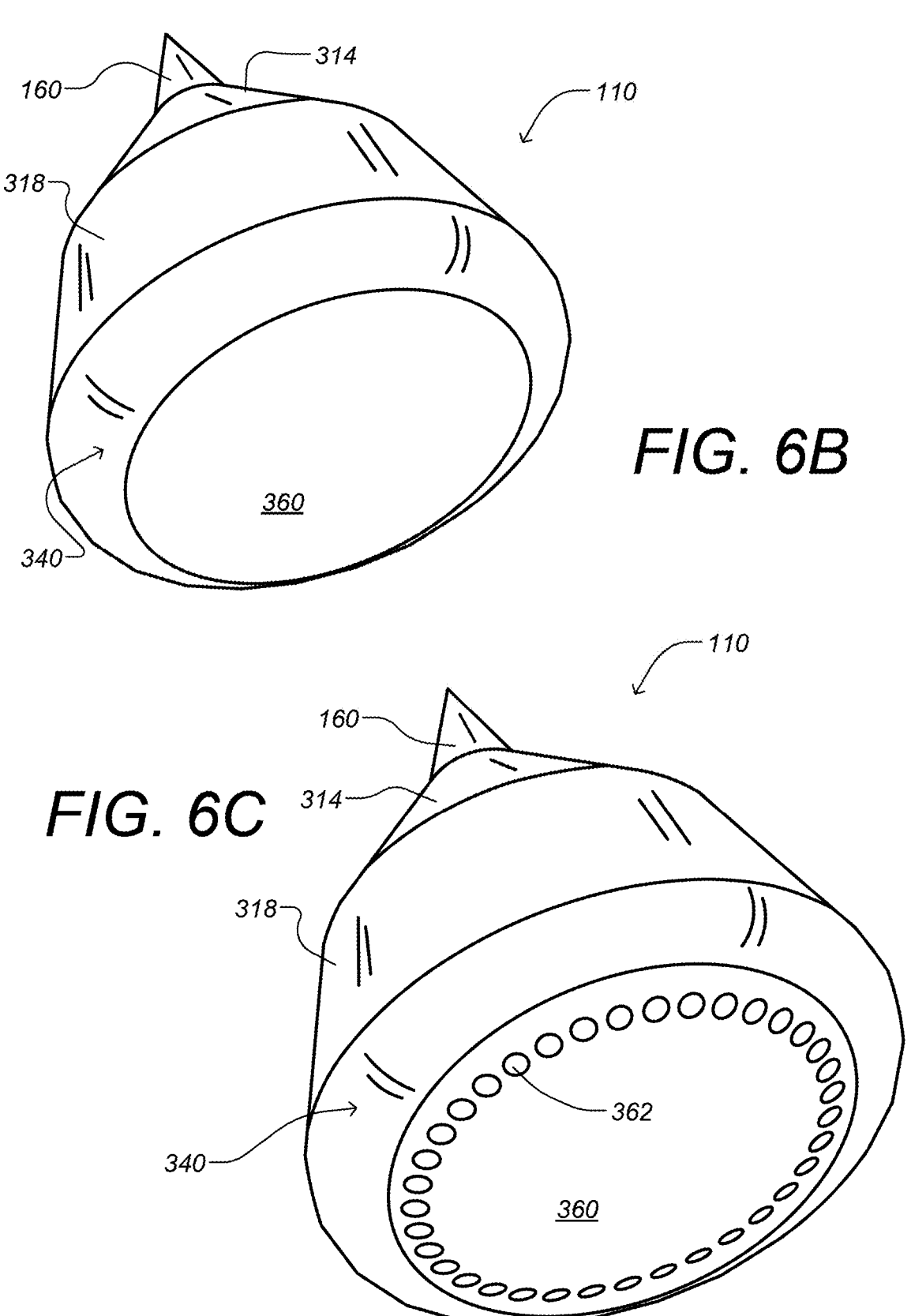
Figures 6D, 6E:
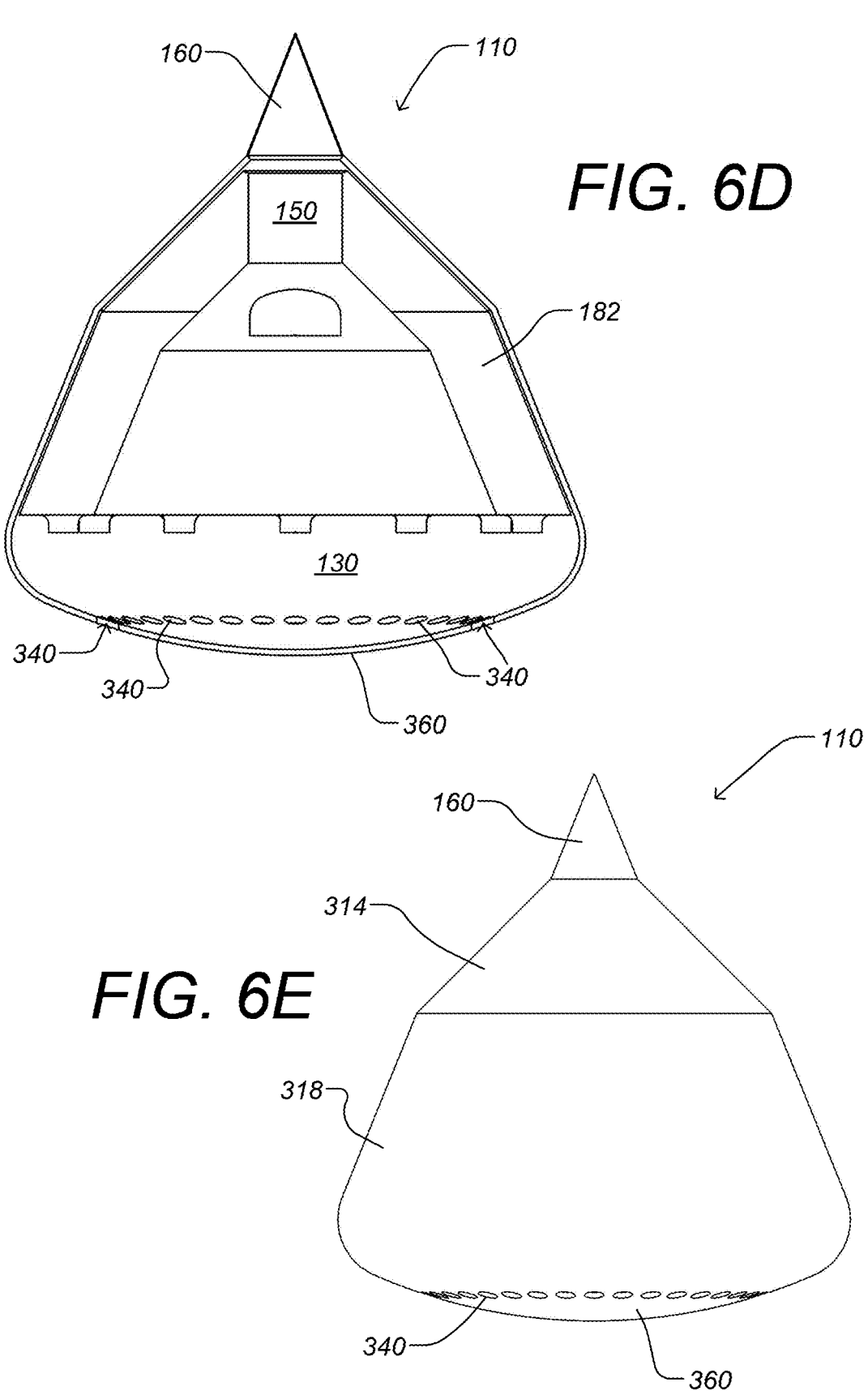
Figure 6F:
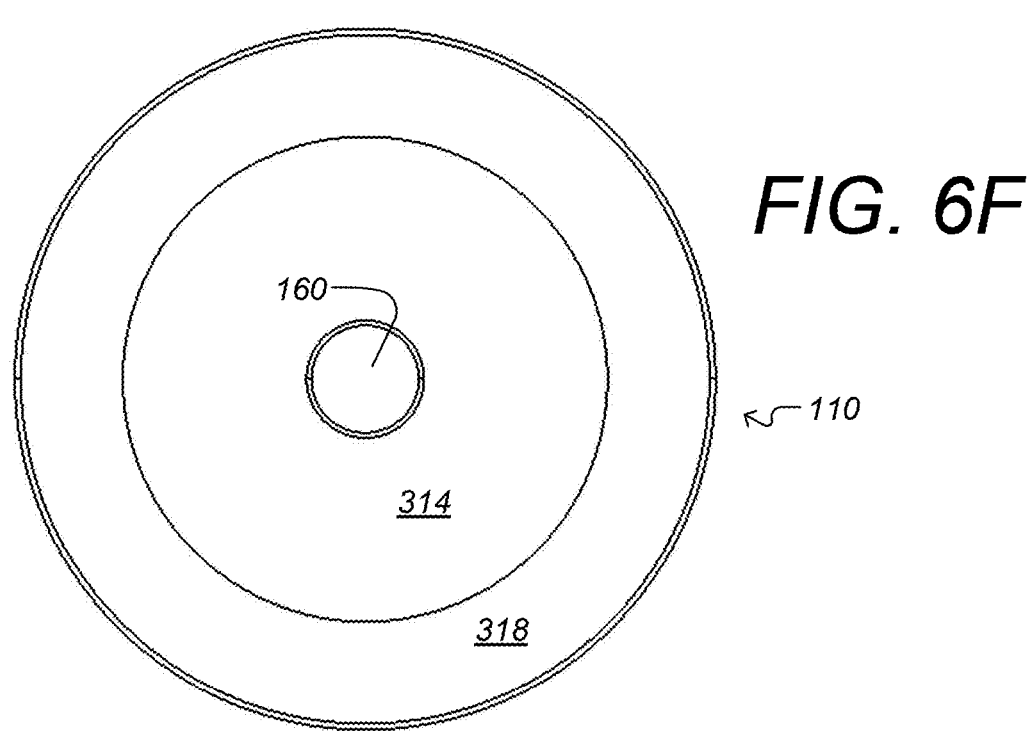
Figure 6G:
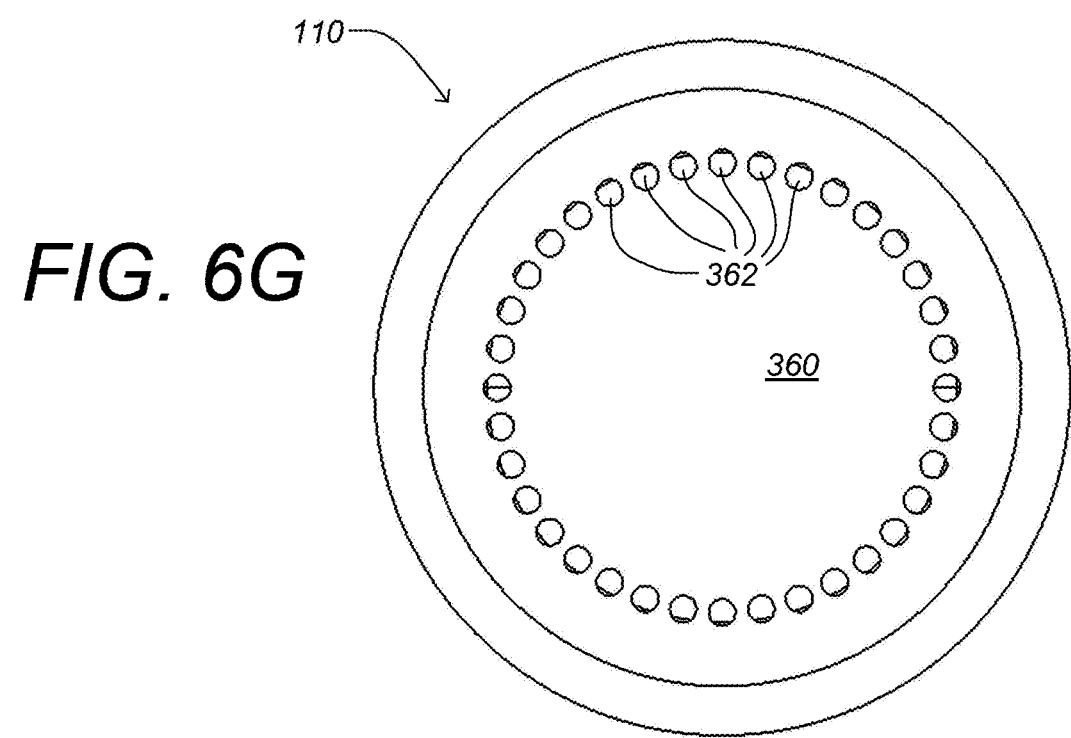

FIGS. 6A to 6G are views showing further aspects of a vehicle platform having slightly different shape, according to some embodiments. The vehicle shown has an even more rounded nose cone that blends into the main body. FIG. 6A is a perspective view of the vehicle platform 110 with mechanical flaps 340 opened. System architecture for the embodiment of an orbital class vehicle will change based on the phase of the mission. The three main phases for this embodiment are ascent, atmospheric reentry, and descent to landing. FIGS. 6B and 6C are perspective views of the vehicle platform 110 having flaps and legs retracted and side air intake doors closed. This view could be of the vehicle during a phase of reentry. FIGS. 6D and 6E are cut-away and elevation side views, respectively, of vehicle 110. In FIG. 6D, the embedded and integrated fuel tanks 182 are shown. FIGS. 6F and 6G are top and bottom views of vehicle 110, according to some embodiments.

Figure 7:
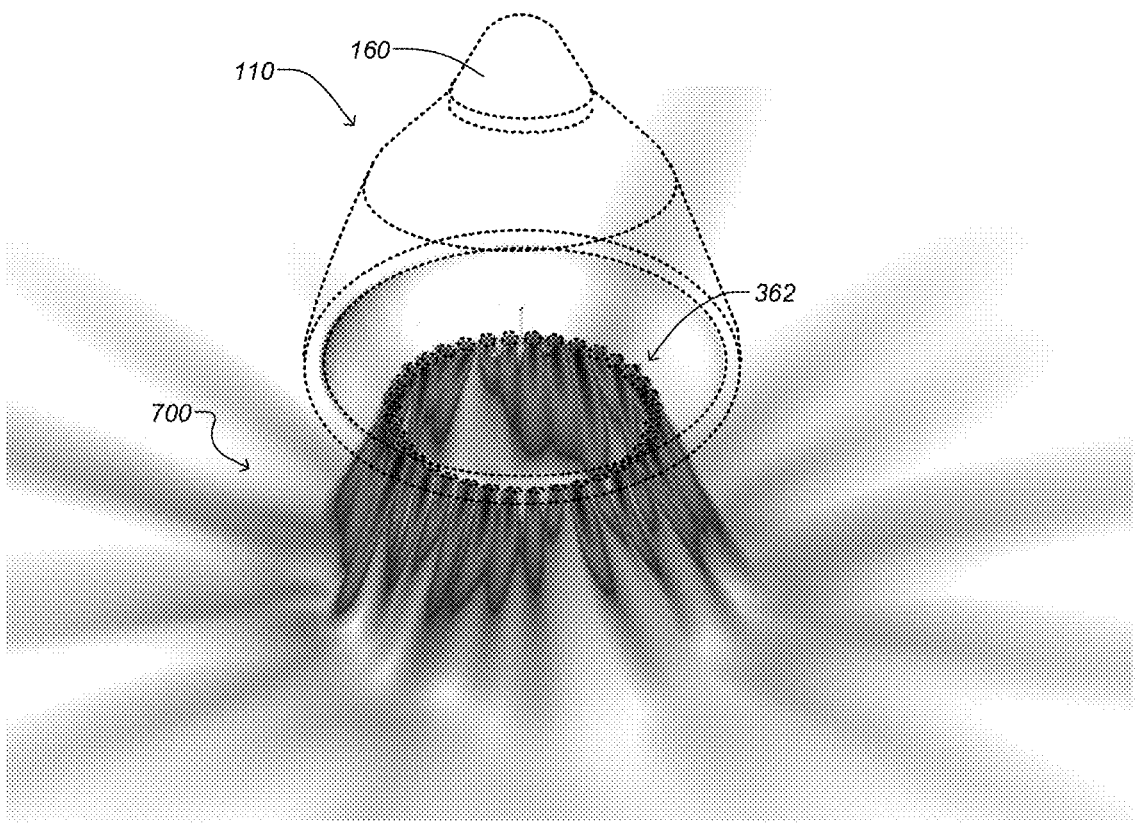
FIG. 7 is an illustration showing results of a simulation of an air-breathing engine exhaust plume upon landing of a vehicle platform, according to some embodiments.

FIG. 7 is an illustration showing results of a simulation of an air-breathing engine exhaust plume upon landing of a vehicle platform, according to some embodiments. The approximate location of the vehicle platform 110 is shown in dashed lines. The exhaust plume 700 is shown being emitted from exhaust nozzles 362 (also shown in dashed lines).

Figure 8A:
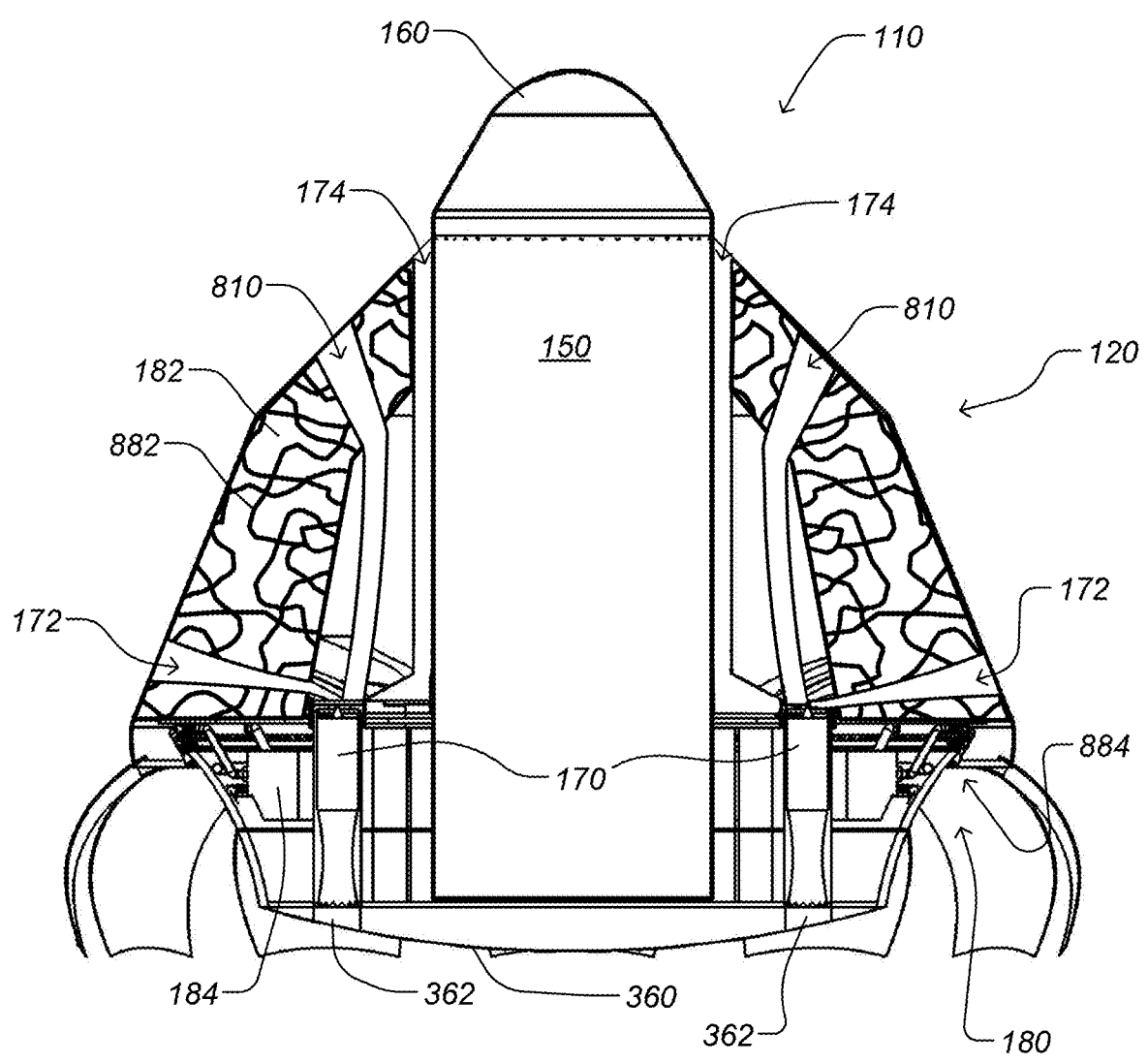
FIGS. 8A to 8C are cross sectional views illustrating further aspects of a vehicle platform, according to some embodiments.
Figure 8B:
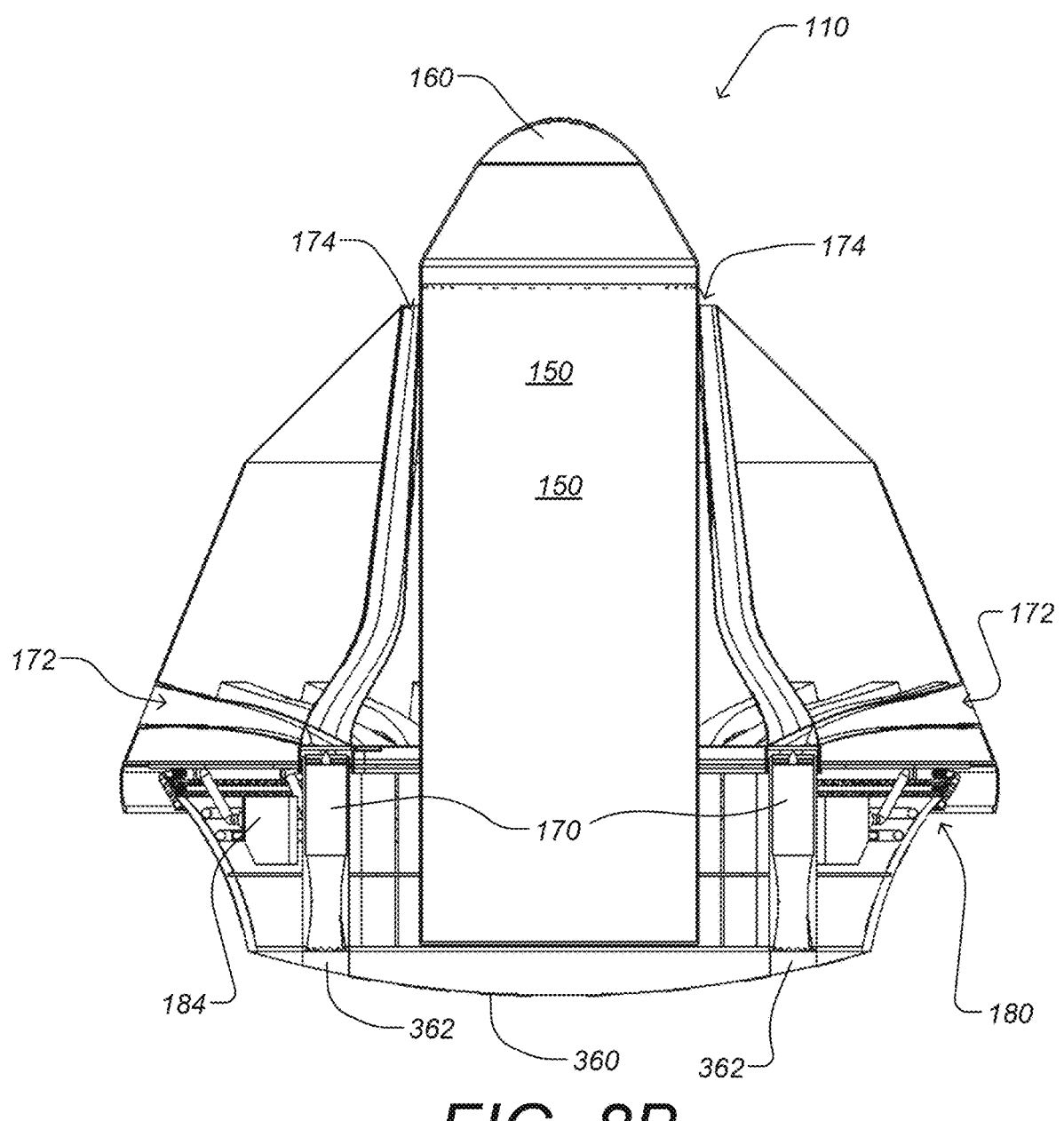
Figure 8C:
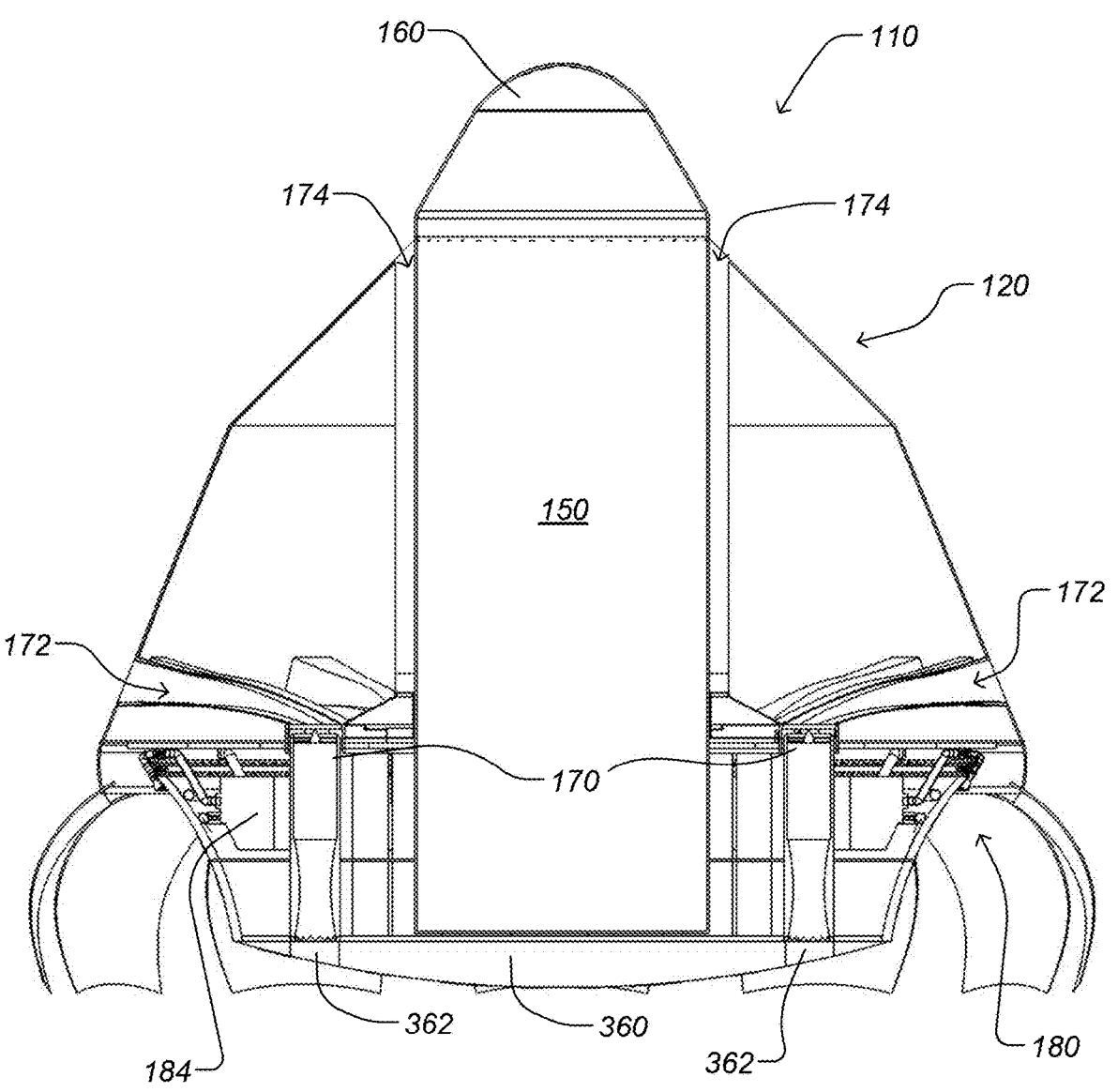

FIGS. 8A to 8C are cross sectional views illustrating further aspects of a vehicle platform according to some embodiments. FIG. 8A is a diagram in which embedded multi-component liquid fuel tanks 182 are schematically shown. Various components of the air breathing propulsion system 170 and liquid rocket propulsion system 180 are shown. Further systems that could be integrated or embedded with the structure like thermal protection, avionics, and custom payloads for specialized users or mission requirements are not included in the scope of this figure.

Primary system components such as fuel tanks, feed lines, and air intake systems act to support the structural skeleton 120 of the vehicle 110 as they are directly embedded to the vehicle structures, according to some embodiments. Fluids are able to travel directly through the structural body, similarly to how blood flows through the arteries, veins, and capillaries of the human body.

Fuel can be added to integrated tank system 182 prior to flight of vehicle platform 110. Tank system 182 includes walls 882 that separate multiple fluid components (such as fluid and oxidizer). The walls 882 are configured to facilitate propellant storage and flow of the system and also contribute significantly to the structural performance of skeleton system 120. During atmospheric flight such as an ascent and/or descent vehicle 110 is configured to use a hybrid air breathing and rocket engine operation, making use of both rocket propulsion system 180 and air breathing propulsion system 170. Exhaust from the air breathing propulsion system 170 flows through vents 362 and exhaust from rocket propulsion system 180 flows through annular chamber 884. Airflow is through structural walls with embedded air intake vents 174, 810 and 172. FIG. 8B illustrates a slightly different configuration of forward facing air intakes 174 for air breathing propulsion system 170. FIG. 8C is similar to FIG. 8A except that the additional air intake vents 810 are not shown. In FIGS. 8B and 8C, the integrated liquid fuel tank system 182 is not shown for reasons of clarity.

According to some embodiments, other subsystems like thermal protection systems can also be embedded into the structural subsystem. Custom manufactured structures with integrated architected metamaterials, infill materials, high temperature ceramics, high temperature prepregs, high temperature composites, high temperature fabrics, ablative materials, and/or phase change materials can be blended into the structure to act as thermal protection for cooling, insulating, conducting, reflecting, transporting, and radiating heat to or from the vehicle. Internal gyroid or lattice designs can be integrated to have multi-component sections for thermal protection to enable lightweighting and structural mass efficiency.

According to some embodiments, other additional propulsion systems can be integrated that incorporate solid propellants or other propulsion subsystems. Mechanical mechanisms for fuel, propellant, and airflow operation management including pistons, valves, and sealings as well as other details relevant to technical internal layout are not shown for reasons of clarity.

Further detailed description of some embodiments will now be provided. According to some embodiments, a modular, scalable embedded structure is described that serves as a highly reusable, versatile VTOL aircraft serving as a platform for mobility. Integral subsystem components that are embedded to the optimized structural vehicle design include various propulsion systems, mechanical mechanisms, thermal control and protection systems. Flight avionics, supportive electronics, and or sensors can be additionally integrated to support operation of this technology, serving as the "brains" for functions including but not limited to guidance, navigation, control, communications, telemetry, electrical power, data handling, and flight data collection ensuring complete system operation. Vehicle sizing is ultimately determined by the environment and use case domain of the technology on board the vehicle. This will determine specific subsystem component selection, sizing, layout, and integration into the vehicle.

The vehicle sizing is highly scalable, as the maximum diameter and height of the vehicle can change for specific flight conditions and mission requirements. As vehicle sizing is altered, its external geometry can be consistent, unless significant alterations need to be made to the airframe outer mold line for use case dependent reasons including extreme aerodynamic cases or stealth operation. Nose cone attachment design can be varied to support different mission concepts, flight operational environments, and payload configurations.

The internal subsystem components and structural support will vary depending on the use case and flight or orbital conditions encountered for a specific mission. Avionics subsystems can be programmed differently to serve the specific mission requirements, with preferred embodiments capable of supporting autonomous vehicle flight. A wide range of controllers can be pre-programmed or trained using advanced machine learning, deep learning, reinforcement learning, artificial intelligence or programmed in real time through real time computational fluid dynamics being run with pre-developed reduced order models to inform the controller transfer functions and optimize controller gains for real time responsive autonomous controls and guidance. These onboard guidance navigation and control systems can be tailored according to mission requirements and vehicle propulsion system selection as well as specified trajectories as necessary. The vehicle can control itself through thrust vectoring of its propulsion systems, lift modulation through controlling the location of the center of gravity by pumping fuel or propellant to various envelopes of the internal vehicle or through reaction wheel systems.

This flight mobility platform is designed to be highly versatile, including operation in most weather conditions and flight environments (velocity and/or altitude) for any trajectory. The vehicle can be placed into orbit and act as an orbital asset until needed to return from space to Earth.

Figures 9A, 9B:
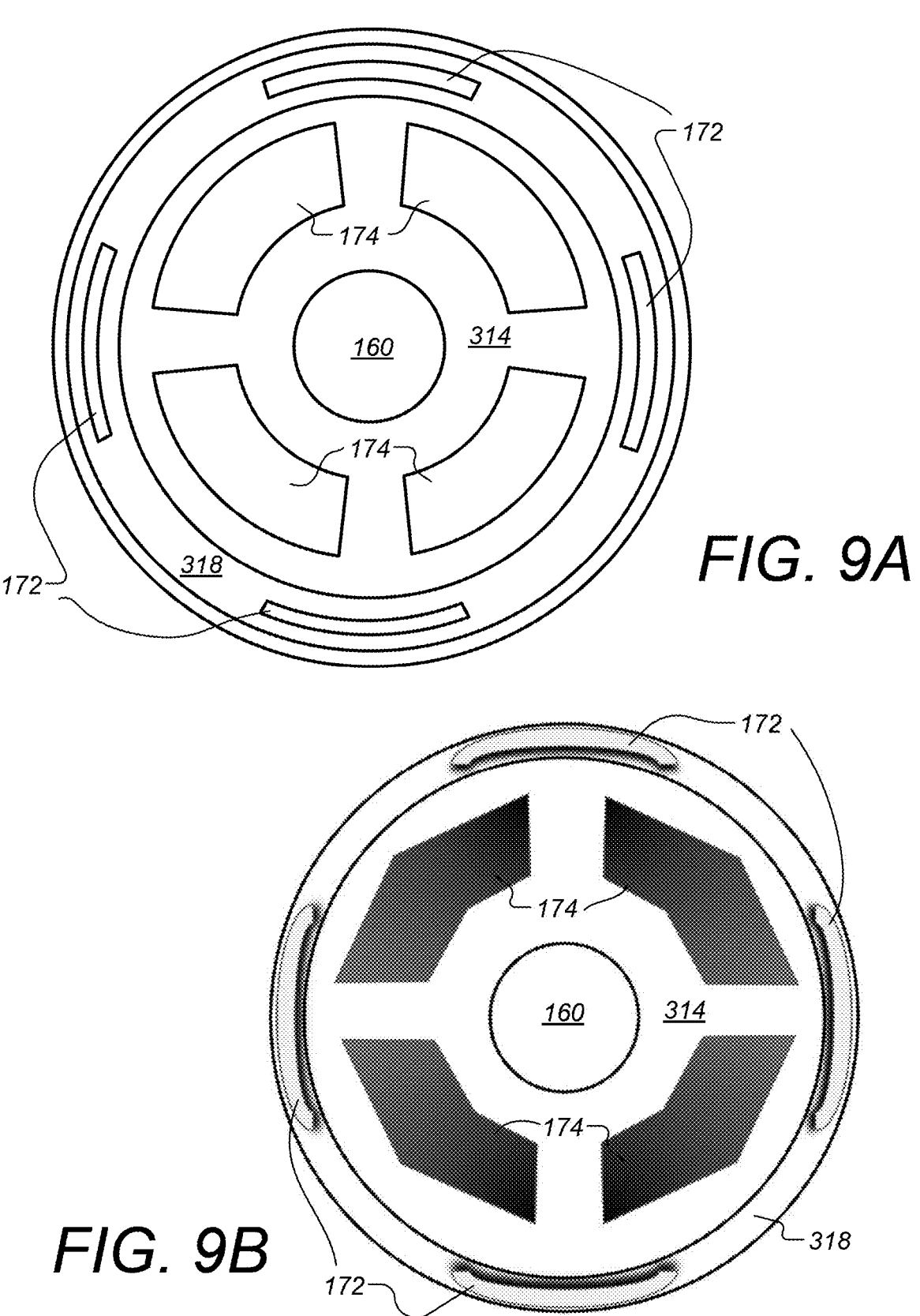
FIGS. 9A and 9B are top view diagrams showing further aspects of air intake configuration for a vehicle platform, according to some embodiments.

FIGS. 9A and 9B are top view diagrams showing further aspects of air intake configuration for a vehicle platform, according to some embodiments. In general the shape, size, spacing, and location of the air intakes will depend on the application and the intended use in different scenarios (subsonic, supersonic, hypersonic, etc.). These examples show different configurations.

Figure 10:
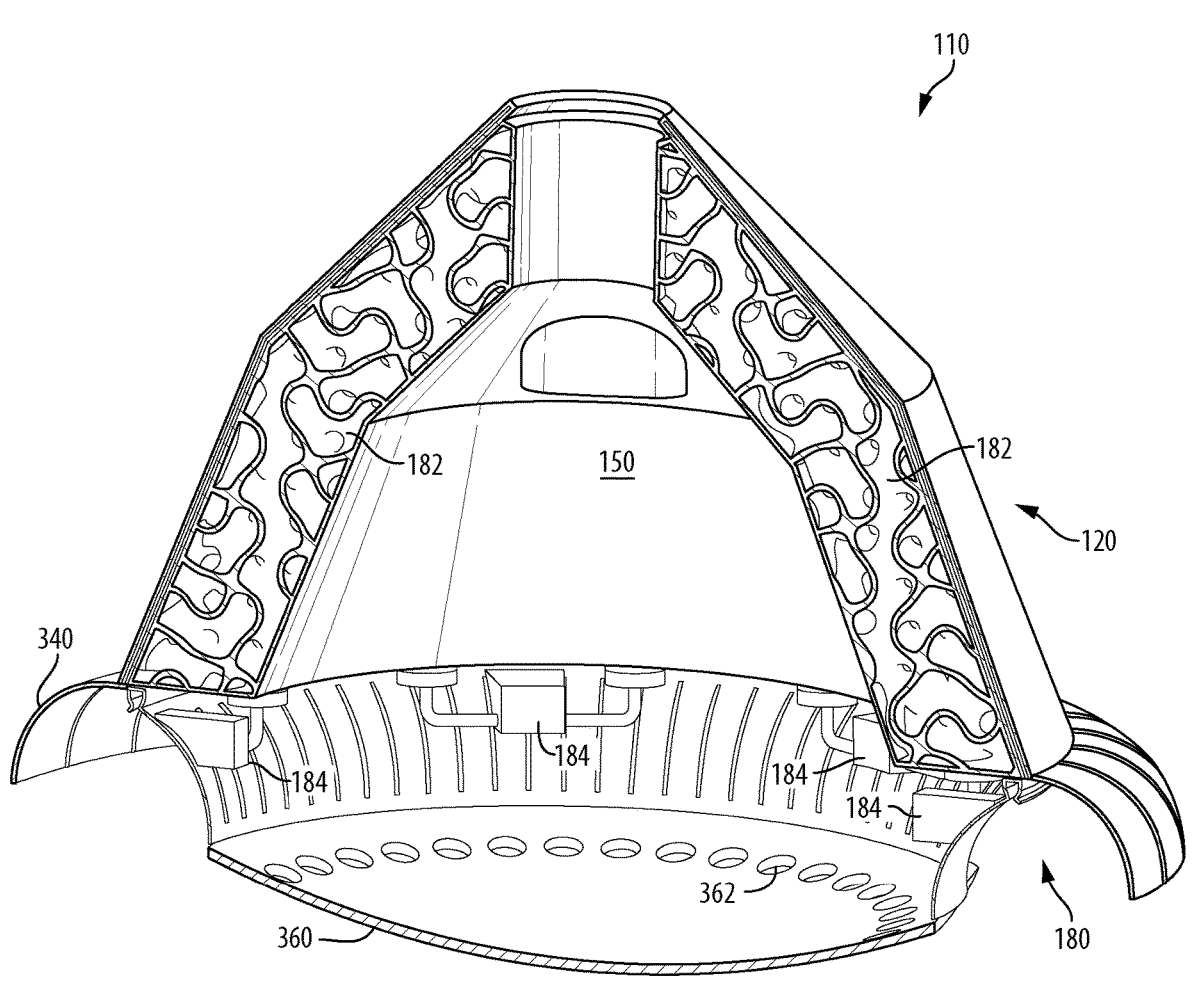
FIG. 10 is a cutaway side view of portions of a platform vehicle showing further aspects of an integrated fuel tanks structure, according to some embodiments.

FIG. 10 is a cutaway side view of portions of a platform vehicle showing further aspects of an integrated fuel tanks structure, according to some embodiments. The integrated lattice fuel tank structure 182 holds liquid bi-propellant cryogenic fuels. Structural mass reductions can be enabled through a variety of infills and or architected metamaterials. The architectured wall thickness of the infill material is sized appropriately for the given cryogenic propellant storage temperatures and can be hollowed out to be filled with other components to support the thermal gradient of the fuel and oxidizer. Structural subsystems are designed for efficiency and for integration of critical vehicle system components for aerodynamics, propulsion, and thermal protection. As an example of structural efficiency and blending, in this embodiment the fuel tanks are integrated to the structure, directly coupled to the walls that constitute the outer mold line of skeleton 120. The wall sizing, shape, and internal configuration or infilled material can vary depending on the embodiments propellant and structural requirements. This fuel tank shell 182 enables multiple components to be stored or integrated to the same area or volume, but divided by a material wall. The fuel tank 182 further minimizes sloshing of propellant, with the ability to be able to maintain internal pressure or be pump/pressure fed to change fuel properties and location during system operation. Thin walls between fluids with lattice structures like gyroids can be hollowed and infilled or embedded with phase change materials or other working fluids. The inner walls can be sized and integrated according to expected temperature gradients and cryogenic storage requirements of the integrated fuel tank.

The shape and thickness of the component infused wall can vary, with the ability to hold two or more components supporting propulsion, thermal protection, and or other critical subsystems required for vehicle operation. By integrating infilled material walls that can store multiple components, enormous lightweighting, strengthening, vibration dampening, energy absorption, radar avoidance, and armor protection opportunities are provided to the exterior and internal structures. This design methodology specific to preferred embodiments enables maximum efficiency of the system architecture, supporting blending and coupling of structural, thermal, and propulsive subsystems. For embodiments with stored cryogenic fuels, phase change materials, heat pumps, and or heat exchangers, operational and thermal efficiency is promoted in the supersonic or hypersonic flight environments FIGS. 11A-11C illustrate some example embodiments of the integrated fuel tank structure.

Figures 11C, 11D:
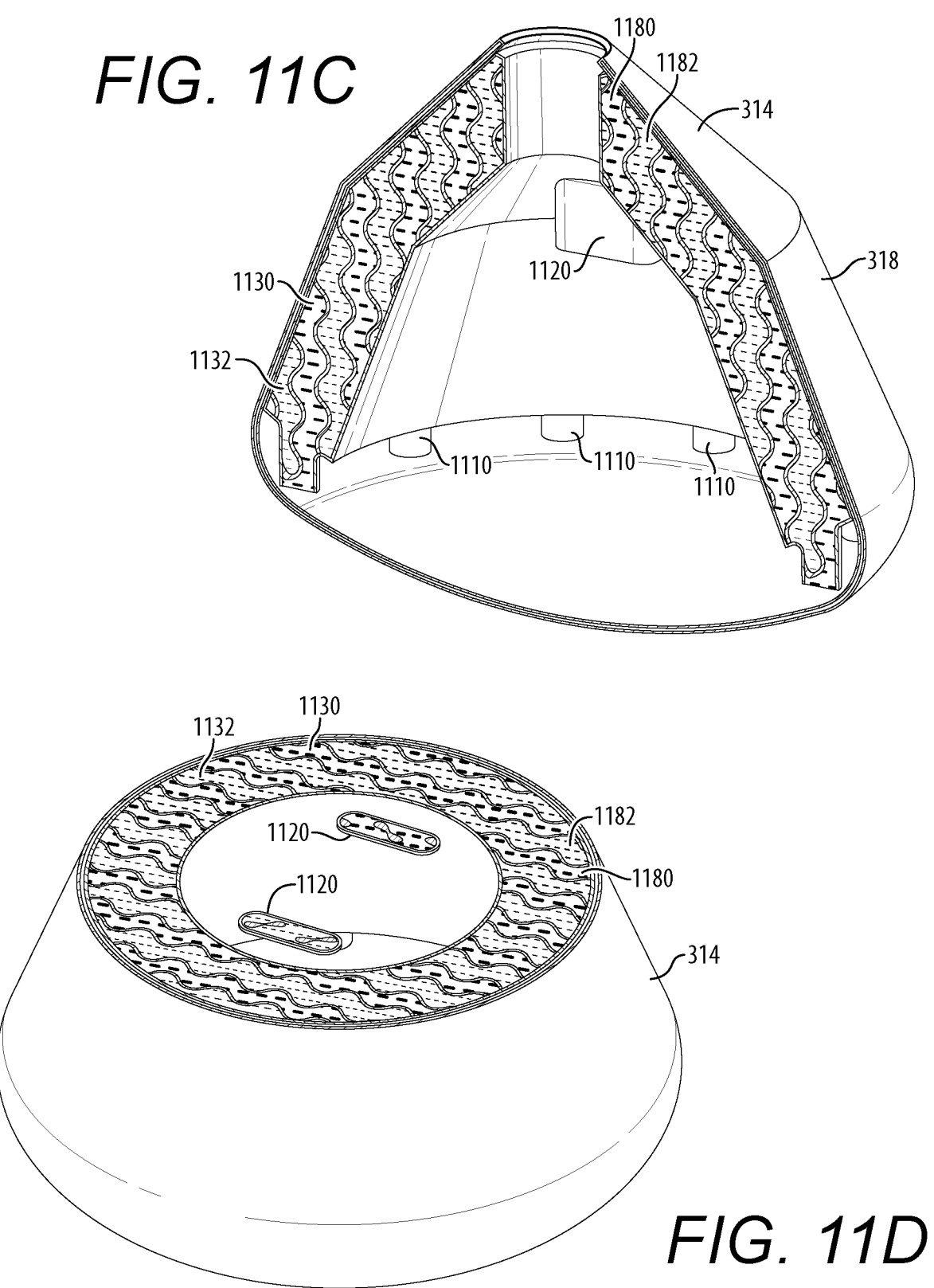
Figure 11E:
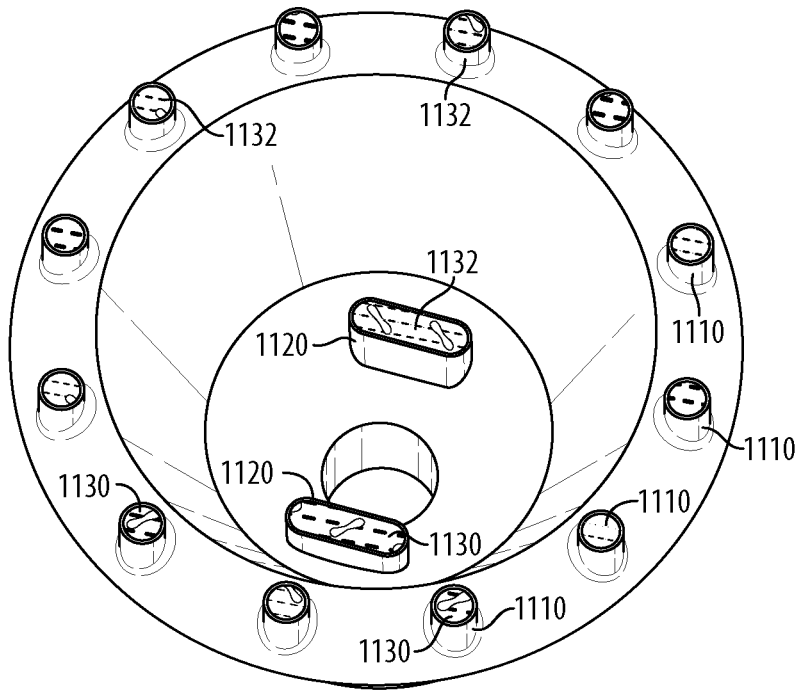

FIGS. 11A-11E are various cutaway diagrams illustrating further aspects of a structural airframe fuel tank, according to some embodiments. In this tank 182 is configured to hold two fluids, 1130 and 1132 (for example fuel and oxidizer). In this way tank 182 is a tank system that includes two separate tank volumes: tank 1180 for fluid 1130 (e.g. fuel) and tank 1180 for fluid 1132 (e.g. oxidizer). Note that air intakes are not shown for reasons of clarity. The blending of the component separating walls are shown in FIG. 11B. Propellant inlets 1120 for filling the tank are seen on the inside below the nose, while propellant outlets 1110 are seen near the aft of the vehicle and feed directly into the engine bay, fueling onboard propulsion systems. FIGS. 11D and 11E show top down and bottom up cross sections, respectively.

FIGS. 12A to 12D are diagrams illustrating further aspects of the structural airframe fuel tank depicted in FIGS.

Figure 12A:
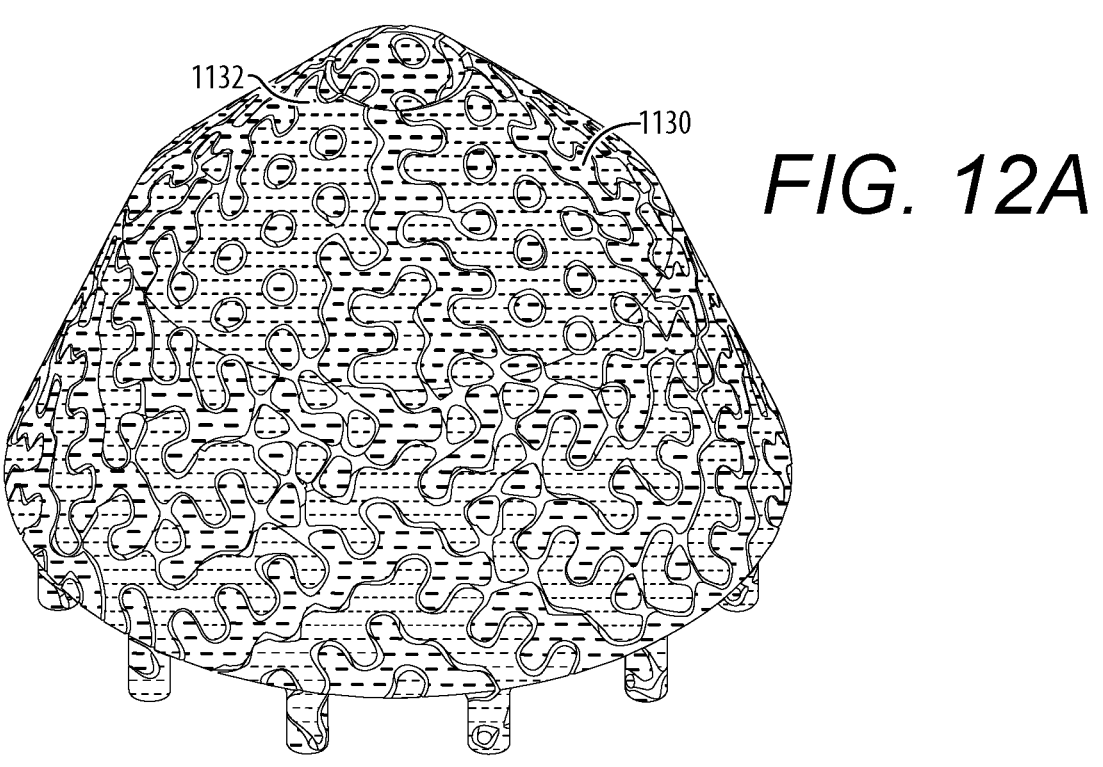
FIGS. 12A to 12D are diagrams illustrating further aspects of the structural airframe fuel tank depicted in FIGS. 11A-11E, according to some embodiments.
Figure 12B:
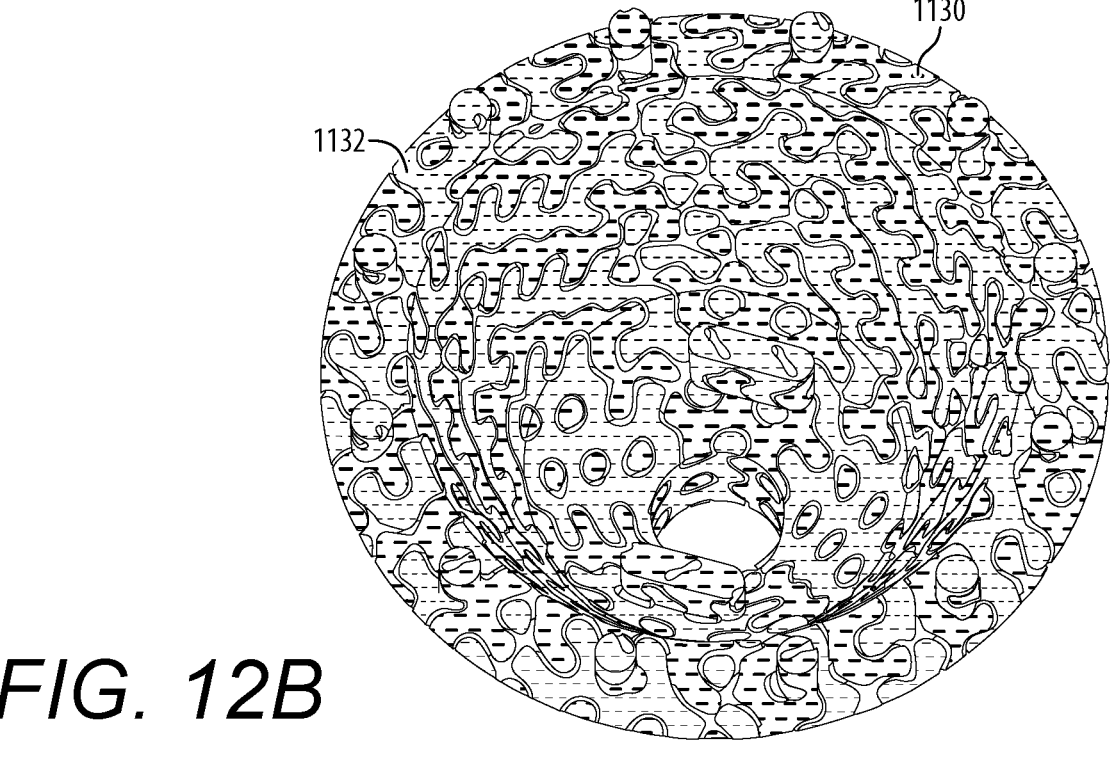
Figure 12C:
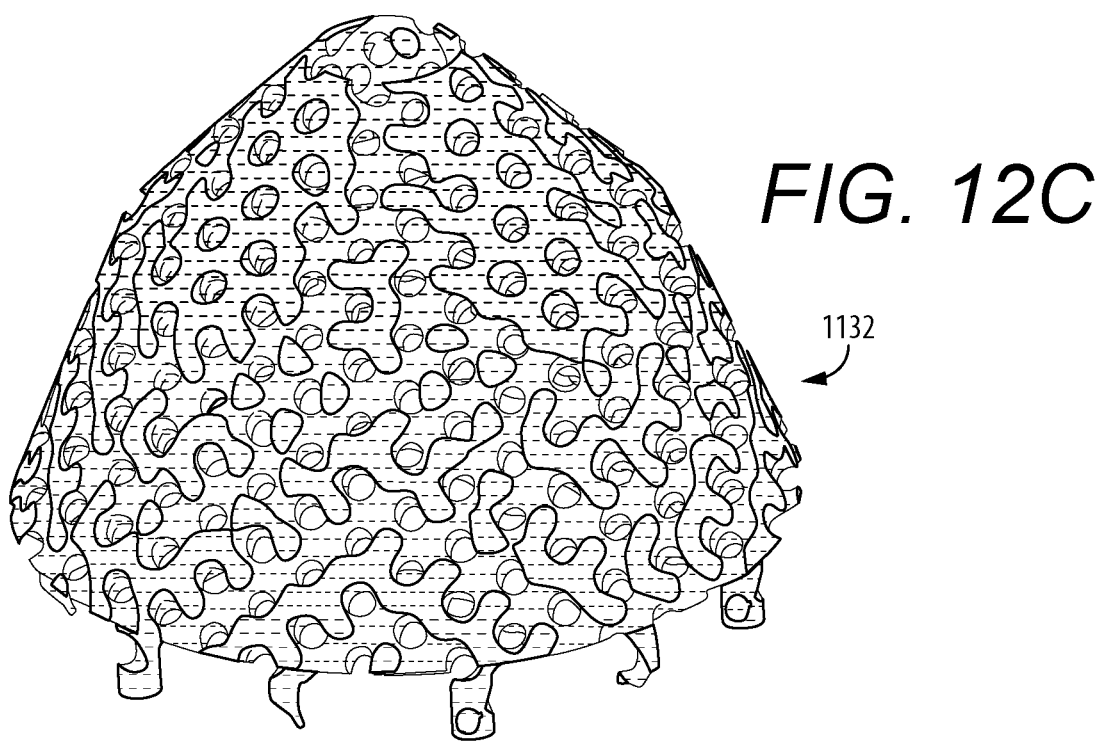
Figure 12D:
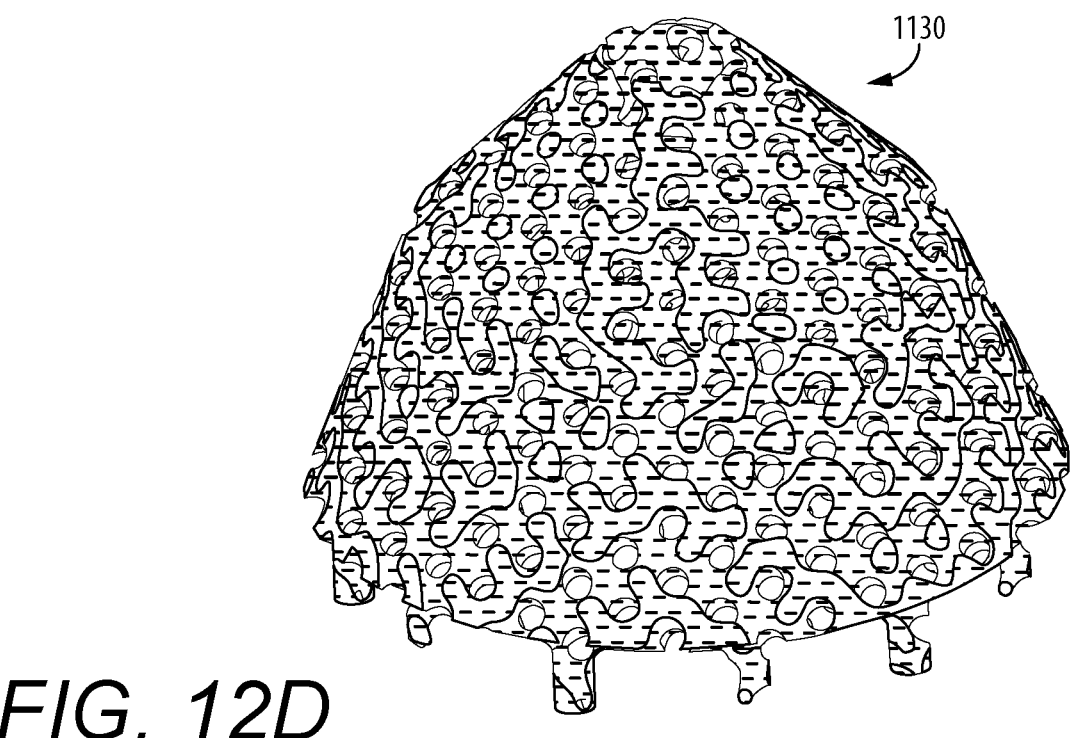

11A-11E, according to some embodiments. FIGS. 12A and 12B show the two components 1130 and 1132 together. The components 1132 and 1130 are shown separately in FIGS. 12C and 12D, respectively.

Figures 13A, 13B, 13C:
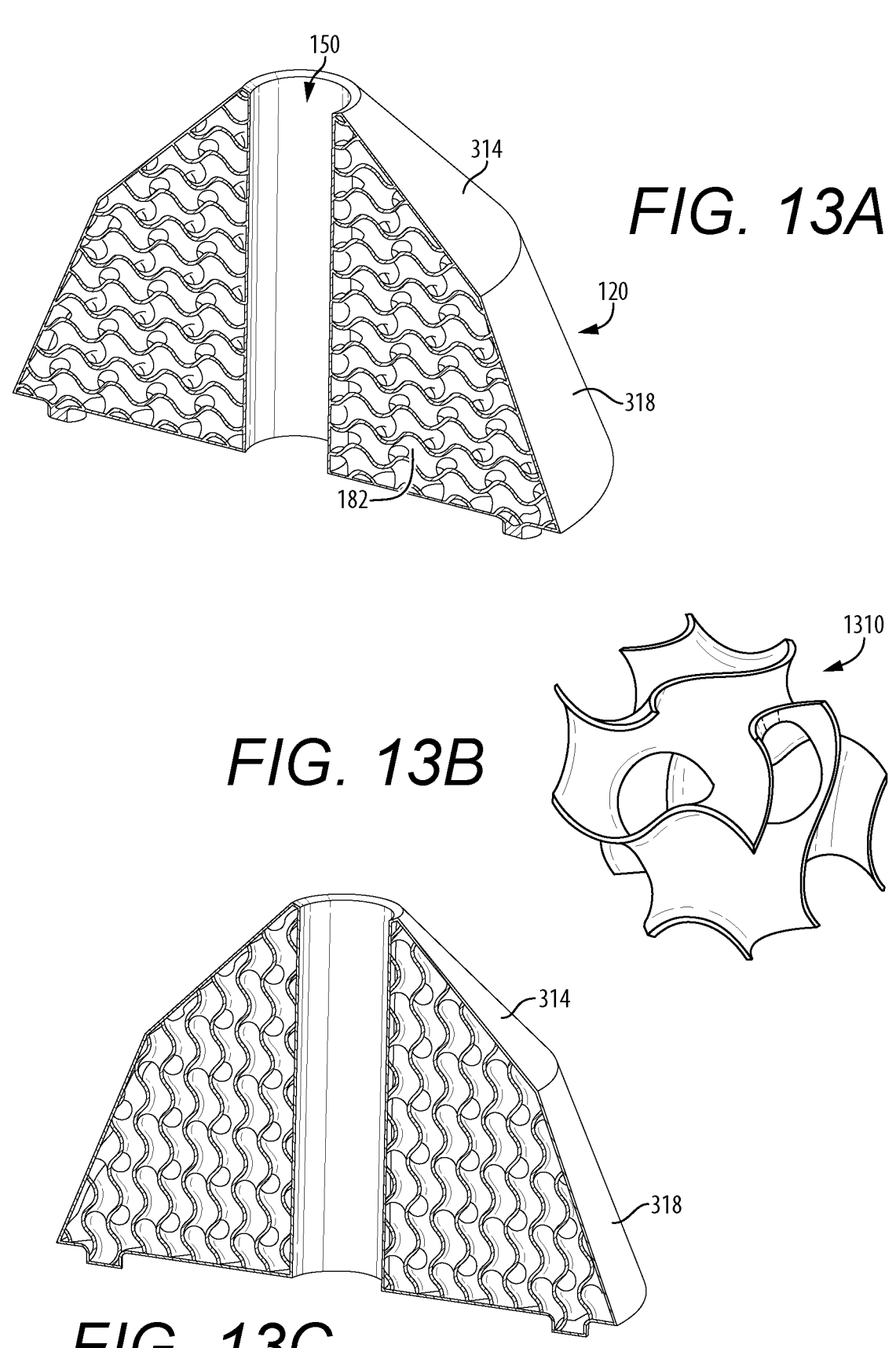
FIGS. 13A to 13C are diagrams illustrating further configurations of a structural body multi-component liquid fuel tank, according to some embodiments.

FIGS. 13A to 13C are diagrams illustrating further configurations of a structural body multi-component liquid fuel tank, according to some embodiments. FIGS. 13A and 13C show gyroid multi-component variations of structural body with integrated fuel tanks 182. In this case, more of the internal volume of the vehicle is used for tank 182. FIG. 13B shows wall shape for a unit gyroid cell 1310.

FIGS. 14A to 14C are diagrams of a structural body embedded multi-component fuel tank based on a diamond-shaped unit cell, according to some embodiments. FIG. 14A is side-view cutaway diagrams and FIGS. 14B and 14C show two different views of a unit cell 1410 used for multi-component tank configuration.

Figures 15A, 15B, 15C:
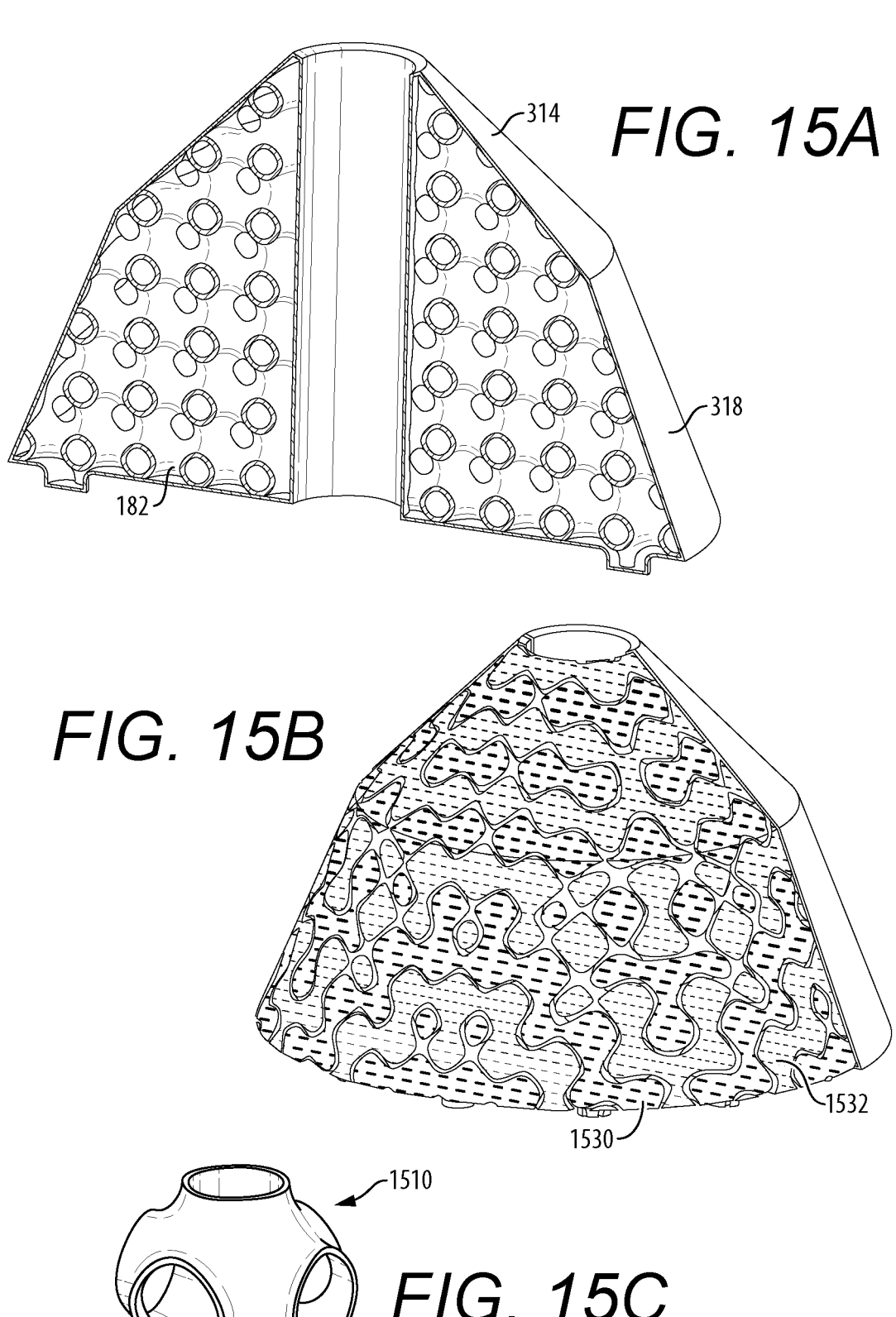
FIGS. 15A to 15C are diagrams illustrating a further configuration for a multi-component fuel tank embedded and structurally integrated into the body of a vehicle platform, according to some embodiments.

FIGS. 15A to 15C are diagrams illustrating a further configuration for a multi-component fuel tank embedded and structurally integrated into the body of a vehicle platform, according to some embodiments. This example is based on a primitive lattice. FIG. 15A illustrates the walls, and FIG. 15B shows two components 1530 and 1532 stored within the tank 182. FIG. 15C shows the unit primitive lattice cell 1510.

FIGS. 16A to 16C are diagrams illustrating a further configuration for a multi-component fuel tank embedded and structurally integrated into the body of a vehicle platform, according to some embodiments. This example is based on an I-graph and wrapped package-graph (IWP) lattice. FIG. 16A illustrates the walls, and FIG. 16B shows two components 1630 and 1632 stored within the tank 182. FIG. 16C shows the unit IWP lattice cell 1610.

Some embodiments as seen in the figures to follow, depict the integration of various hybrid propulsion systems in a similar external outer mold line geometry. In certain applications dependent on the mission and operating environment of the vehicle, some propulsion systems will be better suited than others and certain combinations of hybrid propulsion systems will be better suited than others. Some propulsion systems lend themselves to smaller or larger aspect ratio vehicles with different external mold line shapes or contours with various nose cone attachments. Structural elements and components of subsystems can be supported or improved by infilled materials with multi-component functionality. For example, some embodiments of subsystem elements and components could serve (but are not limited to) specific functions for thermal insulation and or isolation, propellant storage and integration, and or fluid flow optimization.

Figures 17A, 17B:
FIGS. 17A and 17B are diagrams illustrating further aspects of some embodiments of a vehicle platform.
Figure 19A:
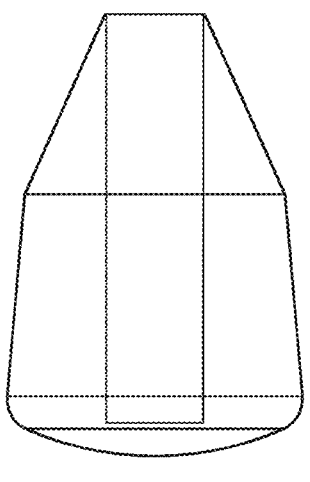
FIGS. 19A to 19F are outline diagrams of variations in mold line of various vehicle platforms, according to some embodiments.
Figure 19B:
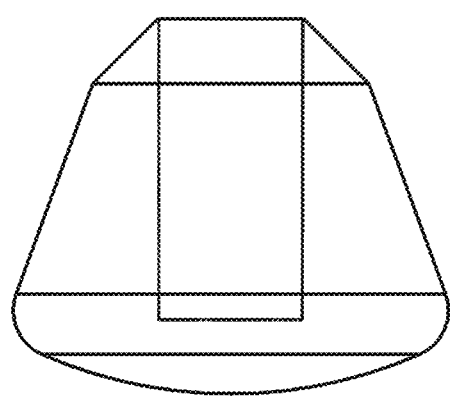
Figure 19C:
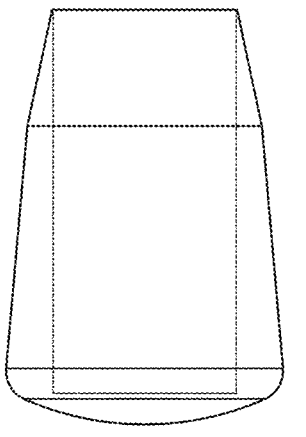
Figure 19D:
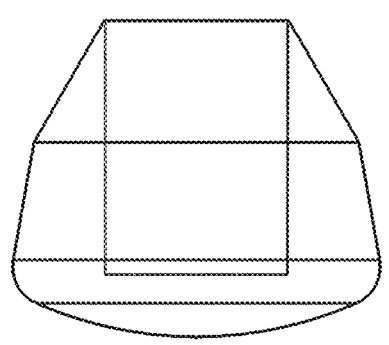
Figure 19E:
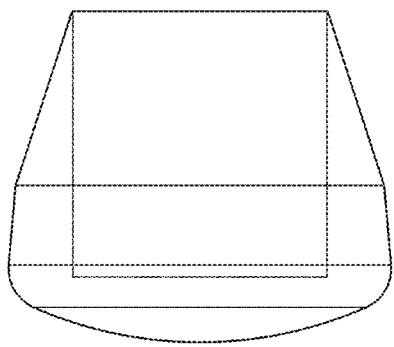
Figure 19F:
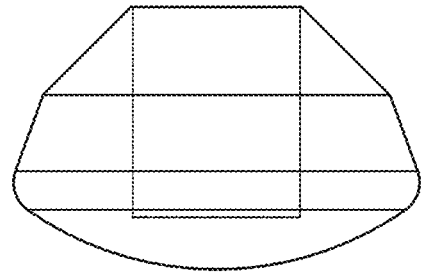
Figures 20F, 20G, 20H, 20I, 20J:
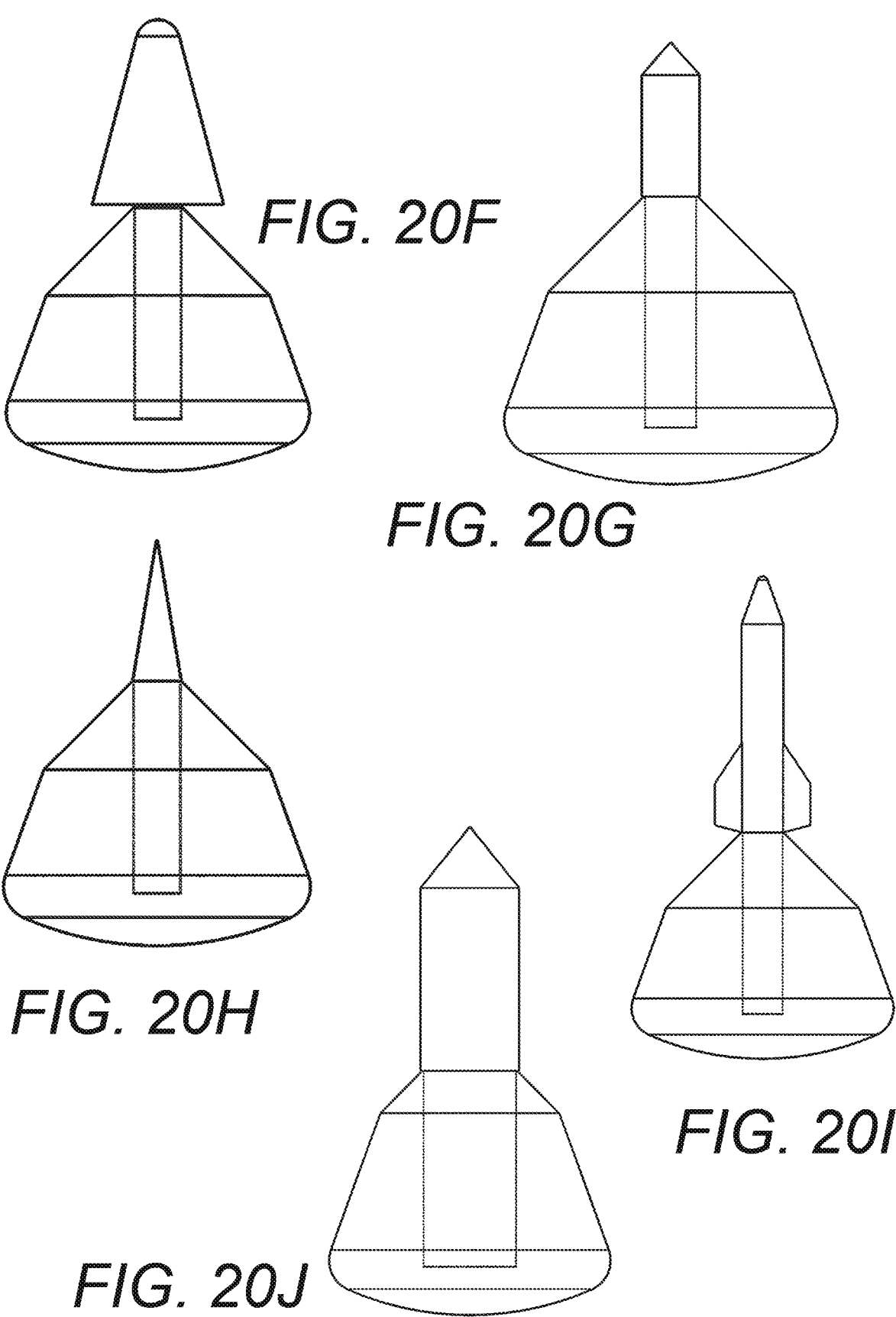

FIGS. 17A and 17B are diagrams illustrating further aspects of some embodiments of a vehicle platform. In this example, several solid rocket booster (SRB) motors 1710 are included along with an air breathing propulsion system, which is identical or similar to system 170 shown and described elsewhere herein. Not shown for reasons of clarity are forward facing air intakes such as intakes 174 shown and described elsewhere herein. The vehicle platform shown in this example thus is configured to use a hybrid air breathing and solid rocket motors during ascent.

FIG. 17B is a bottom view (aft) and illustrates thrust vector capability and underside of engine bay at aft of the vehicle.

FIGS. 18A to 18C are diagrams illustrating further aspects of liquid rocket propulsion systems configured for vehicle platforms, according to some embodiments. The liquid rocket propulsion system 180 includes a circular engine ramp 1810. FIGS. 18A-18C show a small cross section of the engine ramp 1810. In this example infill material 1812 is added to the ramp 1810 for heat exchange with the hot gas plume. Also shown in FIG. 18A is annular chamber 1820. FIG. 18B shows infill material 1812 in further detail.

FIG. 18C shows results of a simulation of the integral cooling ramp 1810 with infill material 1812. As can be seen infill material 1812 provides regenerative cooling for annular combustion chamber 1820 around the annulus of the vehicle.

FIGS. 19A to 19F are outline diagrams of variations in mold line of various vehicle platforms, according to some embodiments. The illustrated proportions can be scaled to the desired size of examples of the vehicles described in this patent specification.

FIGS. 20A to 20J are outline diagrams of variations of nose cone attachments, according to some embodiments.

Figures 21A, 21B:
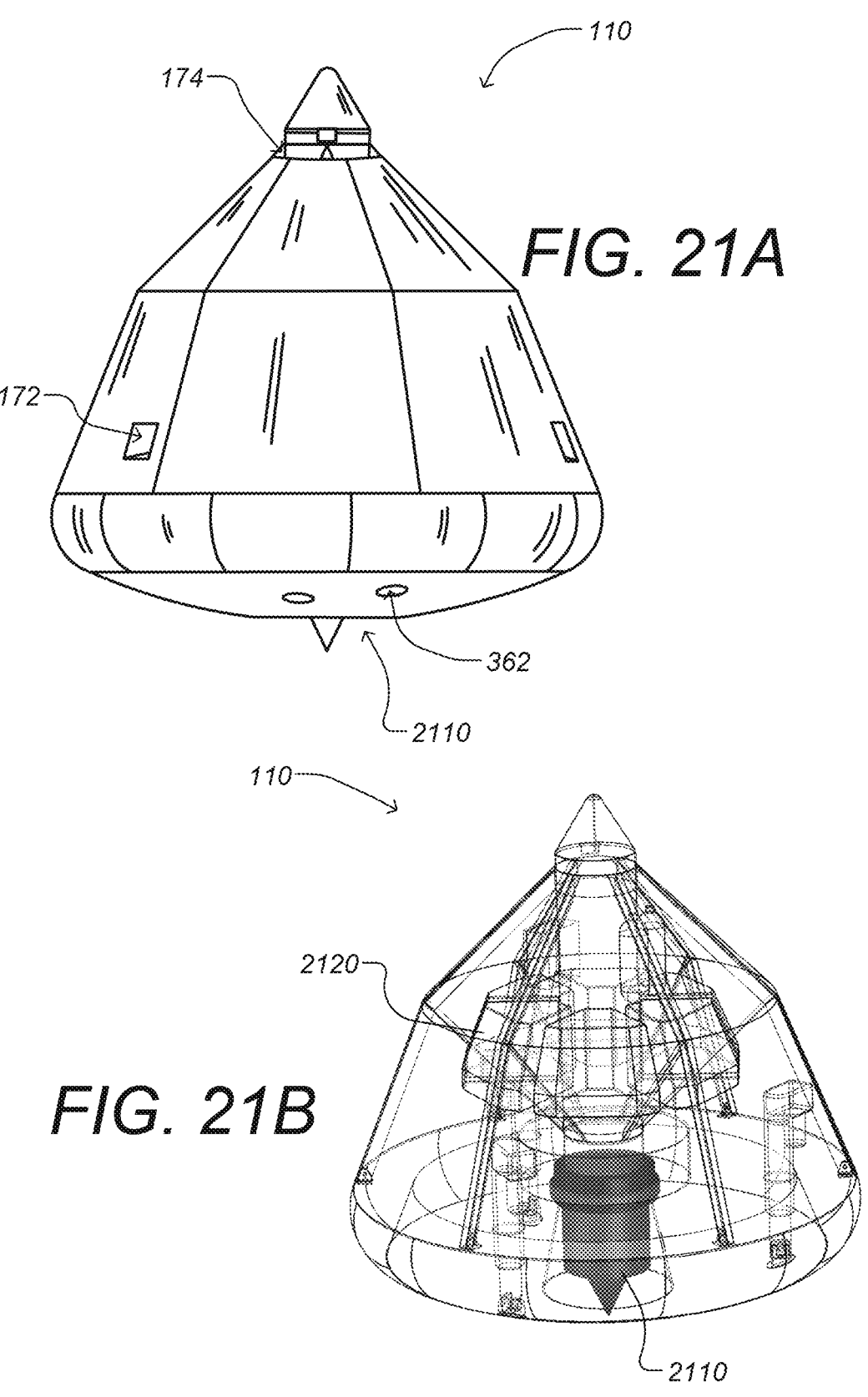
Figure 21E:
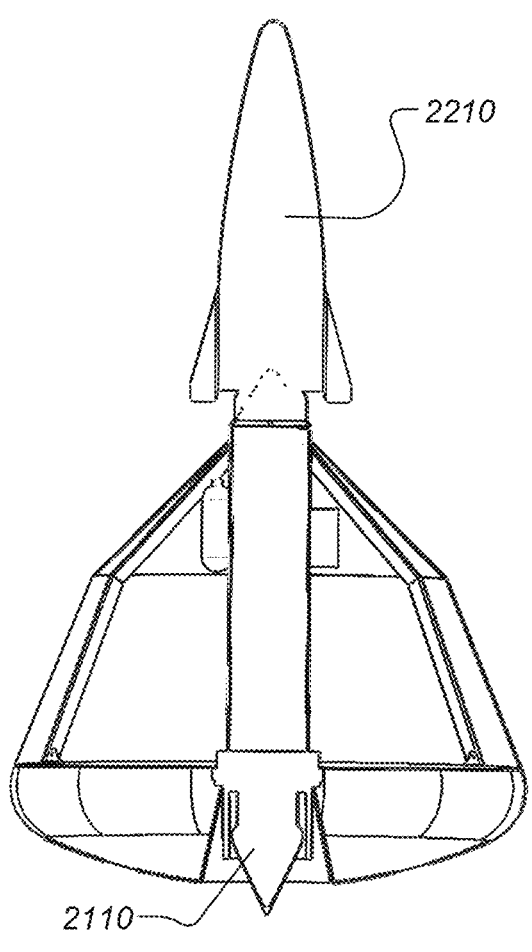
Figure 21F:
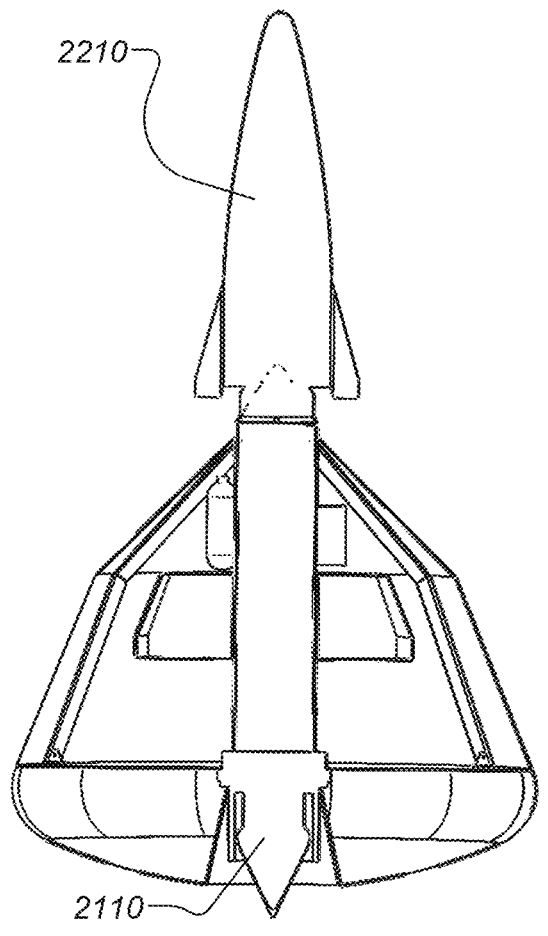
Figures 22A, 22B:
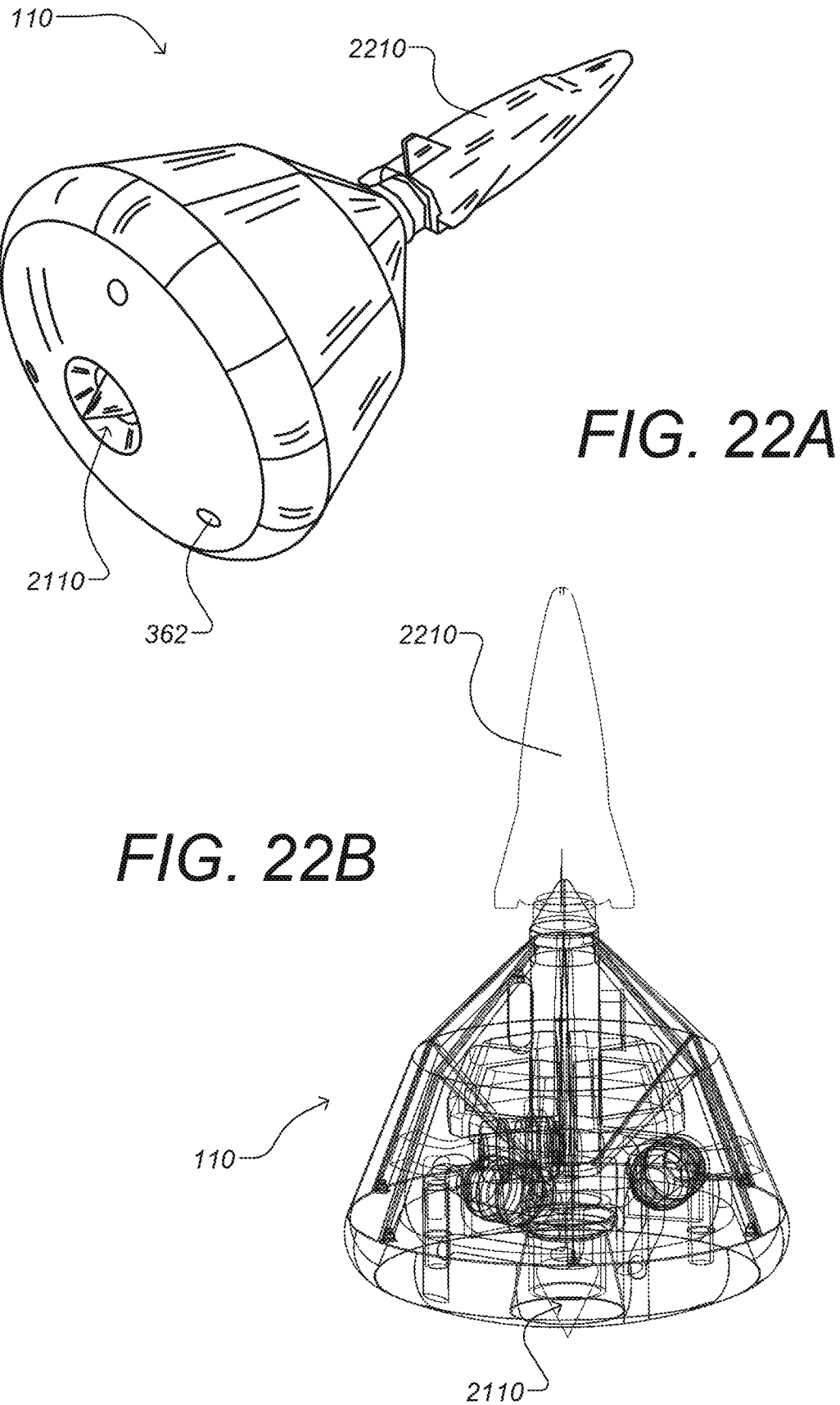
FIGS. 22A and 22B are diagrams illustrating a small aspect ratio vehicle using hybrid propulsion of air breathing and liquid RDRE with a wave glider space plane attachment, according to some embodiments.

FIGS. 21A to 21F are diagrams showing small aspect ratio vehicle platforms using hybrid propulsion of air breathing and liquid rotating detonation rocket engine (RDRE) technology, according to some embodiments. FIG. 21A shows a small aspect ratio vehicle 110 with RDRE 2110. Also shown are forward air intake 174, side air intake 172 and air breathing exhaust vent 362. FIG. 21B shows RDRE fuel tanks 2120 and engine 2110. FIGS. 21C and 21D show fuel tanks 2122 and 2120. Note that tank 2122 could be used for storing fuel for the air-breathing propulsion system. According to some embodiments, tank(s) for storing fuel for the air breathing propulsion system are integrated into the structure in an identical or similar fashion as the tank(s) for the rocket propulsion system. FIGS. 21E and 21F show further configuration variations. FIGS. 22A and 22B are diagrams illustrating small aspect ratio vehicle using hybrid propulsion of air breathing and liquid RDRE with a wave glider space plane attachment 2210, according to some embodiments.

Further component details are now provided, according to some embodiments. Aerodynamic outer mold lines may change in embodiments designed to achieve different flight regimes. For example, subsonic embodiments may take different outer mold line shapes with different angles or bends or curvatures to enable more optimal flow paths for the vehicle. Hypersonic variants may contain their own angles, curvatures, deformations, and other geometric features that are optimal for hypersonic flight. For some embodiments during reentry, where the large base of the vehicle is in the windward orientation, the aerodynamic forces acting on the blunt body change at different locations away from the stagnation point with the stagnation point of the flow being varied depending on attitude control of the system during flight. Attitude control may be achieved aerodynamically or internally with center of gravity modulation, propulsion systems, and/or magnetohydrodynamic systems which can manipulate the ionized flow and the plasma layer around the body creating pressure gradients that can cause forces as desired or required by the control systems. Recirculation regions and flow separation while the vehicle is in its blunt body at the windward position can be changed depending on certain outer mold lines where the discrete angles formed by the upper conic sections can be rounded or smoothened to change flow field physics and reentry and also during ascent. Embodiments may be built with smoothened and continuously changing angles providing a curved surface for more optimal flow paths the air can take as it goes around the body. Instead of a bi-conic shape, the geometry may take more of a curved body outline at the external regions of the structure that is exposed to the flow. Some embodiments may include direct or deployable vehicle trim integration for lift modulation and additional aerodynamic improvements during flight.

Structural subsystem: This includes the main airframe with the embedded subsystems. The exterior outer mold line of the vehicle profile resembles a wide-body blunt capsule-like airframe with an aspect ratio at or below 5.3:1. This airframe enables increased stability for flight conditions when compared to traditional missile-like rocket airframes and provides better structural efficiency as the thrust loads are distributed over a larger area due to the girth of the mobility platform. The structural design is engineered to improve its overall flight performance, thus enabling tailoring for mission use. Vehicle structural engineering can include topology optimization, lightweight and high-strength material sizing and selection, integration of meta-materials, advanced composites and manufacturing practices, quantum or nanomaterial providing enhanced structural integrity.

In many embodiments, the structural subsystem houses some or all of the remaining architectural components:

Propulsion system(s): The propulsion system is integrated to be embedded within the structure which supports the engine bay of the system. The overall vehicle flight propulsion system utilizes a combination of propulsion subsystems depending on the use case, mission requirements, or environment of operation. Propulsive systems can include but are not limited to air-breathing engines, liquid propellant engines, solid rocket engines, hypergolic propellant engines, cold gas thrusters, electric propulsion systems, nuclear engines, paraffin fuels, directed energy propulsion, etc. Propulsion system components may couple directly to the structural system or attach within the structure as necessary to reduce part count and while promoting structural efficiency. For manned operation or sensitive payload cargo, propulsion systems supporting abort features can be integrated in the event of major malfunction of the aircraft. Future advancements in propulsion system technology that enable better performance capabilities will be capable of being integrated.

Figures 23A, 23B:
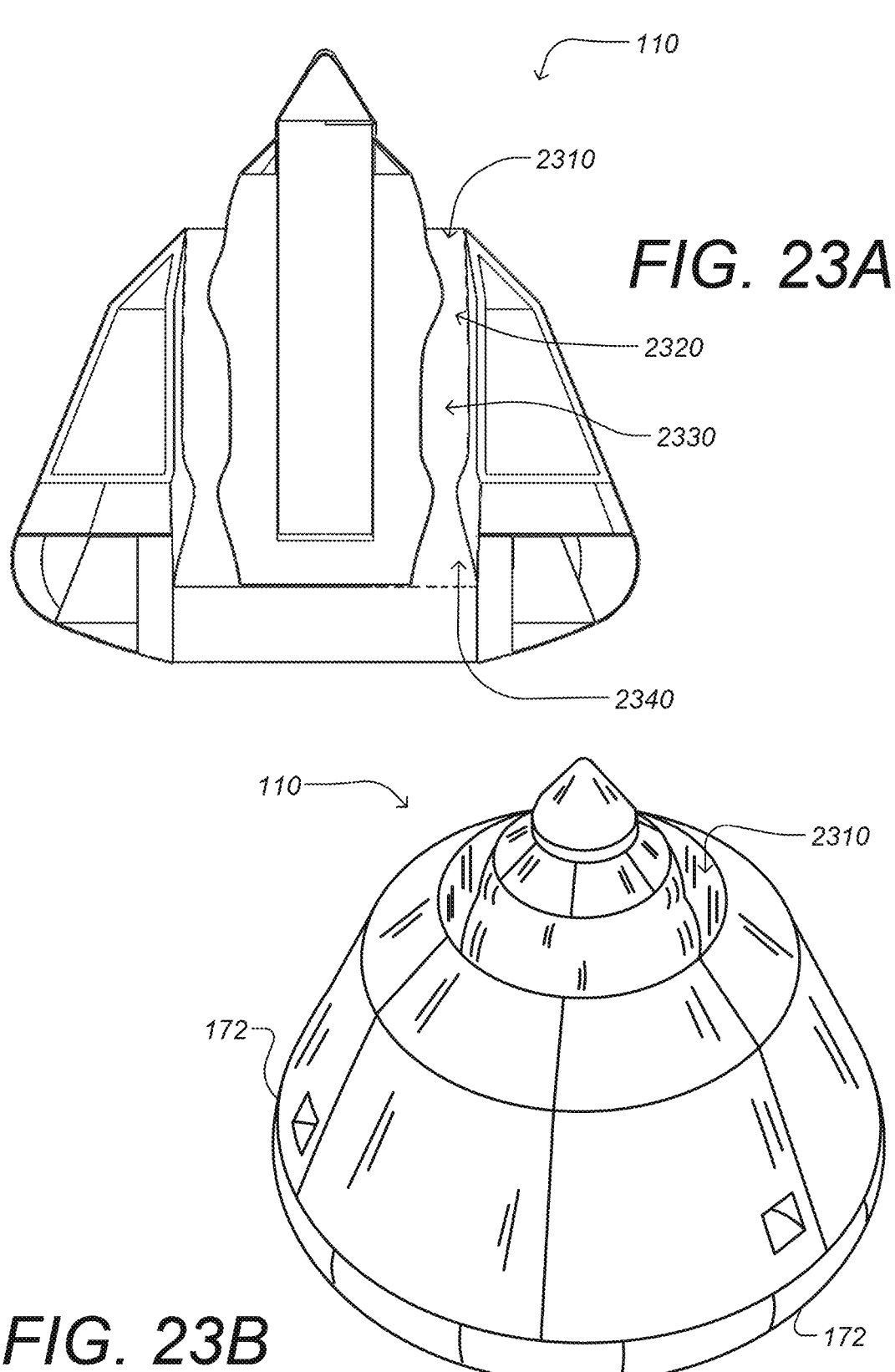
FIGS. 23A and 23B are views of a low aspect ratio vehicle platform configured with supersonic ramjet technology, according to some embodiments.

FIGS. 23A and 23B are views of a low aspect ratio vehicle platform configured with supersonic ramjet technology embedded into the vehicle core and revolved around in an annular manner, according to some embodiments. FIG. 23A is a cross section view showing inlet 2310, fuel injection site 2320, combustor 2330 and nozzle 2340. Some embodiments may also have individual ram jets in quadrants, thirds, halves or integer number of segments divided within the circumference of the engine inlet radial location away from the axis. The inlet 2310 can also be designed to be supersonic at the exit of the inlet and as such provide the ability to use scramjet propulsion. Other embodiments may constrain detonation wave propulsion with supersonic or hypersonic airbreathing applications and/or can contain standing oblique detonation waves downstream of the inlet producing detonation combustion of fuel sprayed into the flow path upstream of the detonation wave and downstream of the nose cone inlet region.

The FIG. 23B is a top down isometric view of the vehicle 110 with the airbreathing inlet 172. The inlet 172 can be designed to ensure correct flow fields for supersonic and hypersonic flight conditions. The inlet is directly in line with the velocity vector of the body and provides an efficient means of utilizing all of the vehicle geometry purposefully and with efficiency. The benefit of this embodiment allows for high thrust production within atmospheric flight environments and reduces the oxidizer storage requirements for certain liquid rocket propulsion system vehicle systems.

Given the extra volume budget of some of these embodiments, there is space to embed inlets and diffusers and combustors and nozzles or annular configurations of these propulsion system elements and stages that wrap around at a radial distance from the center axis. Some embodiments contain a supersonic ramjet engine which may also be configured as a scramjet or oblique detonation wave engine. These embodiments provide high thrust within atmospheric flight at supersonic and low hypersonic velocities. Furthermore, utilization of air breathing propulsion means oxidizer is not stored on board and thus more volume and mass budget for fuel and or payload or other associated systems. For embodiments where the hypersonic airbreathing propulsion engine is used along with rocket based propulsion, the propulsion systems may work individually or together. In the single stage to orbit embodiments, subsonic air breathing along with rocket boost or airbreathing only ascent can transition into either supersonic and hypersonic airbreathing only or combined supersonic and hypersonic air breathing with rocket and a final transition to exo-atmospheric propulsion of which it would utilize rocket based (or other non-airbreathing propulsion systems) as the standalone propulsion system. The benefit of combining multiple forms of propulsion in the supersonic and hypersonic regiments can enable the reduction in liquid and or solid based rocket propulsion propellant storage requirements. This reduces the overall gross lift off weight and can provide higher payload carrying capacity or lower fuel consumption along with other mission and system level beneficial trades.

Some embodiments with hybrid propulsion systems consisting of liquid rocket and airbreathing propulsion systems can share common fuel types to maximize storage efficiency and reduce complexity. For example, an embedded liquid rocket and ramjet configuration can share the same, or different fuels as necessary and what best fits mission requirements.

The ability to integrate or embed airbreathing propulsion systems into the flight vehicle with other propulsive systems enables significant performance increases. Subsystem elements like air intakes and ducting can double as the skeleton or chassis of the vehicle. This chassis is often blended with propellant tankage to maximize structural efficiency. Airbreathing propulsion integration enables precision liftoff and landing for Earth's atmospheric environments, as well as controllability for in atmospheric flight. The wide external geometry of the structure enables more internal volume for modular integration of one or more propulsion subsystems.

The large annular base of the vehicle structure allows for optimal expansion of the liquid rocket engine exhaust due to the altitude compensating nozzle-like effects from the integrated nozzle. The liquid rocket engines provide high thrust and efficiency, while the solid rocket engines offer additional boost capabilities. While the system can support traditional liquid bi-propellant or aerospike engines with deflagration based combustion processes, liquid propulsion systems with more advanced thermodynamic cycles like rotating detonation rocket engines and pulse detonation engines can be integrated into the modular mobility platform.

Rotating detonation rocket engine (RDRE) or rotating detonation engines (RDE) in their airbreathing configuration may be embedded or integrated into the vehicle base section maximizing thrust through a large diameter annular chamber with modular annular chamber gap widths and sizing properties dependent on optimal design configurations and necessary mission, system, and propulsion system requirements. Detonation engines use a fundamentally different thermodynamic cycle compared to deflagration based propulsion systems. Deflagration engines produce useful work through the nearly constant pressure heat addition in the thermodynamic process. As the fuel and oxidizer mixture undergoes reaction under constant pressure, the specific volume increases and allows for flow expansion to produce useful work. The detonative combustion phenomena occurs extremely rapidly and occurs at supersonic velocities, enabling combustion to occur at nearly constant volume producing more useful work extracted from the mixture. RDRE and RDE propulsion systems also provide the benefit of reduced combustion chamber lengths with current research showing reductions of the order 50% when compared to equivalent thrust systems. See, Teasley, T. W., Fedotowsky, T. M., Gradl, P. R., Austin, B. L., and Heister, S. D., "Current State of NASA Continuously Rotating Detonation Cycle Engine Development," AIAA SCITECH 2023 Forum, No. AIAA 2023-1873, National Harbor, MD, Jan. 23-27, 2023, which is incorporated herein by reference.

Detonation engines can be modeled using the thermodynamic Humphrey cycle rather than the Brayton cycle which is used as the foundation for jet and rocket engines operated today. Detonations enable an extremely efficient method of maximizing the stored chemical energy in a fuel and air or fuel or oxidizer mixture. Detonation occurs at microsecond time scales compared to milliseconds required for deflagration to occur. Given the very short time scales, the pressure of the system does not have time to reach equilibrium and thus takes place at a near constant volume process. During the ideal constant volume process that models the behavior of a detonation engine, the heat added goes directly into increasing the temperature and pressure of the gas rather than expanding it and enabling more time for entropy generating processes to take place. The system can achieve higher pressures and temperatures inside the detonation shock wave and results in more kinetic energy and thus more useful work output as measured through the specific impulse (Isp) of a propulsion system.

Embedded rotating detonation rocket engine in a propulsively powered capsule airframe for atmospheric and exo-atmospheric flight. Rotating detonation engines utilize circular annular or non-circular annular chambers to enable continuous operation of the thrust producing processes. The rotating detonation, otherwise also called continuously rotating detonation, enables a self-sustaining process given correct initial conditions upstream of the shock wave are provided. This is achieved through but not limited to correct fuel and oxidizer flow rates, pressures, mixture ratios, chamber areas and sizing and other factors. A self-sustaining wave is formed when the rapid energy release from the combustion is sufficient to propel the wave forward into a fresh unreacted mixture. The ever continuous process is controlled and modulated by adjusting flow rates, mixture ratios and injection manifold pressures to control engine output characteristics and provide controllability. Detonative combustion is a pressure gain combustion process and the rapid pressurization of fuel and oxidizer or air mixture removes the workload from the propellant feed system including turbopump and pressure fed systems. In a standard deflagration engine, the propellant feed system must achieve high pressures to maximize engine performance, in a detonation combustion process, the inherent physics of the shock wave and detonation font rapidly pressurizes the propellant mixtures and thereby reduces the pressure that must achieved by the pressure fed system. Reduced pressurization requirements either from tank storage or turbine and pump driven systems simplifies design, reduces weight and cost, and enables more robust and reliable operation necessary for high reusability of certain embodiments.

As such, some embodiments contain an annular chamber at or near the max diameter or within the max diameter embedded into the heat shield. The distance between the inner diameter and outer diameter chamber walls provides the annular gap width which is an important design parameter and adjusted per requirements. Contrary to a pulse detonation engine where a cyclic process is required to achieve deflagration to detonation within the tube and require valve and mechanical systems, the continuous and self-sustaining nature of the detonation wave(s) traveling around the annular chamber means once the initial detonation wave is initiated, as long as the supply of the fuel and oxidizer or air at required mixture ratios, pressures, and temperature is provided, the system is self-sustained and produces thrust at nearly constant operation. The products of the detonation combustion are expelled at supersonic velocities aligned with the axial direction of the RDRE chamber aligned with the body axial axis. The increased specific impulse through a fundamentally more energy efficient form of combustion coupled with the self-sustaining nature and low volume requirement enables smaller and shorter form factors that can enable superior structural efficiency and reduced volume and sizing requirements thereby providing more payload space and mass as well as increased operational range and the ability to achieve orbit in one stage. Furthermore, increases in the diameter of the annular RDRE chamber provides non-linear increases in thrust due to the ability to provide more mass flow rate into the system. This is yet a further advantage of the smaller form factor of this embodiment with thrust chambers in detonative form producing equal thrust to those of deflagration based combustion and are shorter in their axial length and may be configured to be different annular gap widths.

In additively manufactured embodiments of this system, generatively designed channels are configured and printed around to regeneratively cool the annular chamber walls and also act as the lines in the propellant feed system. The channels connect to critical system elements via fasteners, attachment pieces, bolt on external pipes, screwed on, and other methods or be directly linked via fluid communication ports between the structure and subsystems that are embedded or integrated within the structure. Propellant flow out sections of the pump or propellant tank(s) are configured to connect to the printed propellant feed lines embedded into the structure. This enables servicing of mechanical assemblies such as turbines, shafts, pumps, injector plates and more by detaching and reattaching components to the core structural system. The chamber is also designed to be embedded directly into the side of the structure next to the largest diameter portion of the system measured with the nozzle throat exiting right at the junction where the lower rounded blunt portion of the structure connects with the upper half and thereby producing an altitude compensating nozzle effect while also providing cooling capabilities with fluid for cooling of said chamber walls available entirely around the surface area of the chamber walls in contact with the embedded fuel tank structural formation.

Figure 24A:
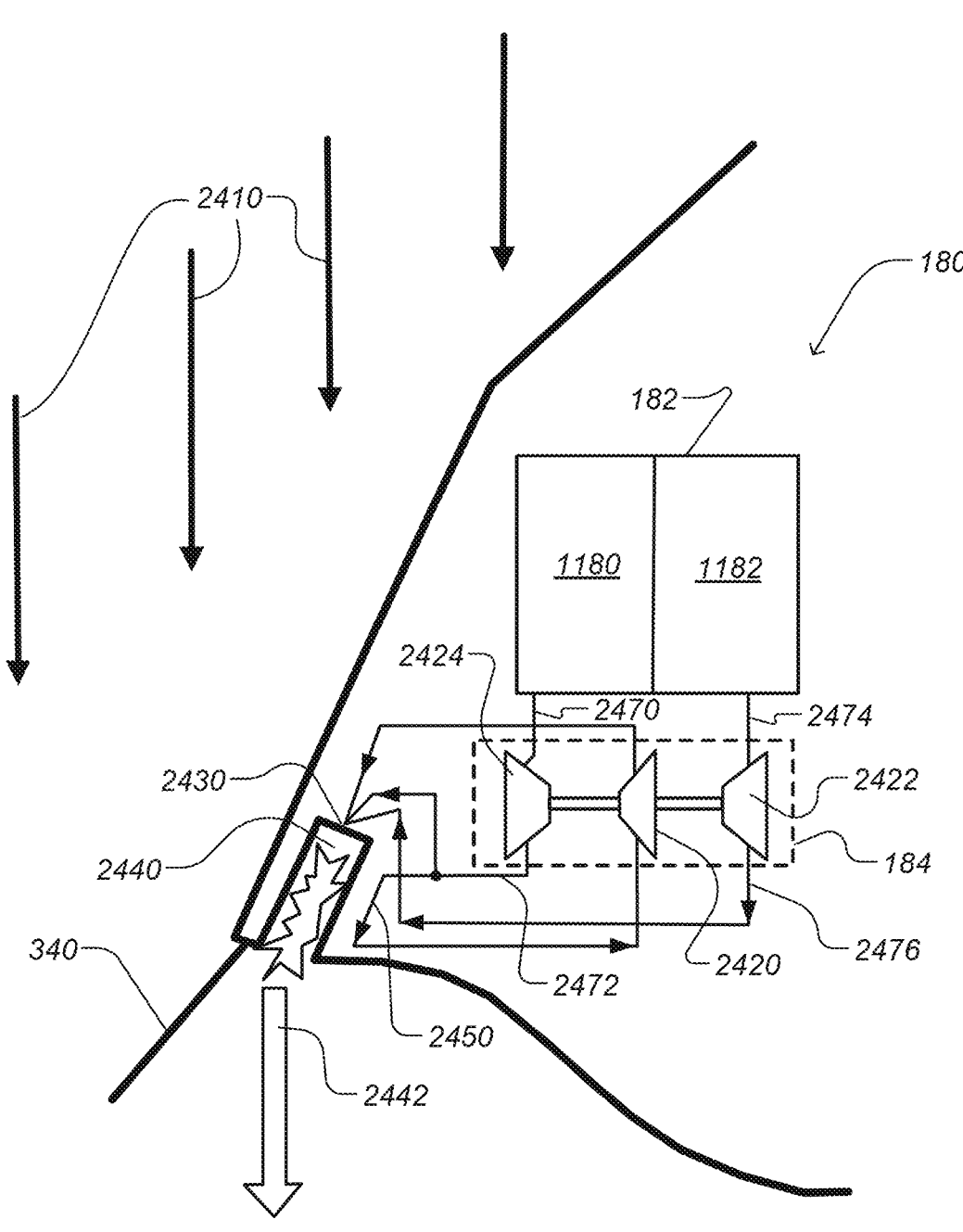
FIGS. 24A and 24B are diagrams illustrating further aspects of rocket propulsion systems used with vehicle platforms according to some embodiments.
Figure 24B:
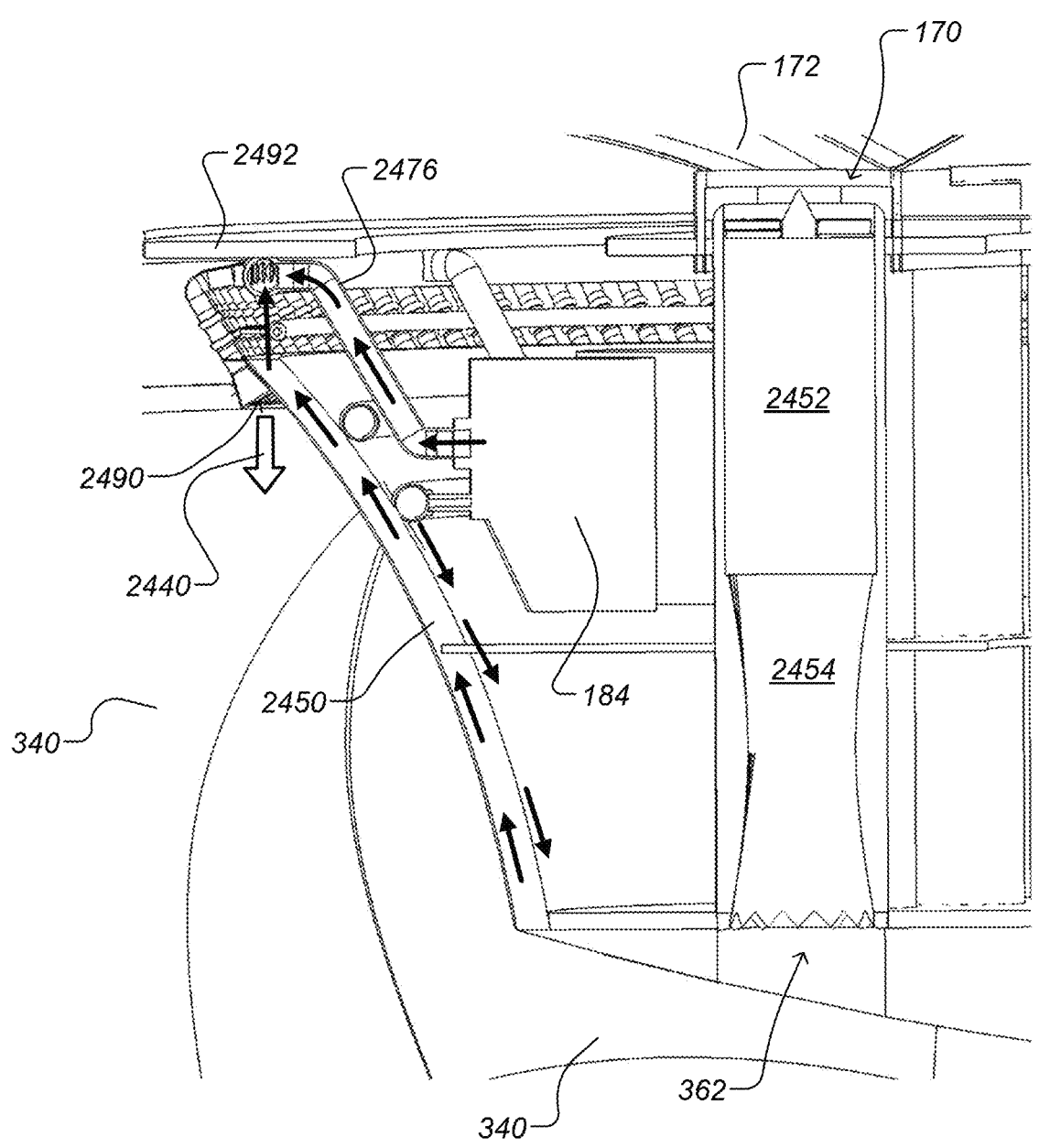

FIGS. 24A and 24B are diagrams illustrating further aspects of rocket propulsion systems used with vehicle platforms according to some embodiments. FIG. 24A is a schematic diagram showing some aspects of an RDRE configuration. The injector plate 2430, or injection manifold, is also additively manufactured or machined using existing manufacturing processes depending on the embodiment and is located on the forward end of the annular chamber 2440 closer to the nose cone than the exhaust exit region where the chamber exists. According to some embodiments, injection plates 2430 are designed using topology optimization and generative design to enable the use of fluidic diodes optimized for RDRE injection schemes. RDREs operate best when there is no backflow of propellant back into the injection manifold or further upstream to the propellant feed lines and regenerative cooling channels. Fluidic diodes prevent backflow when the high pressure detonation wave passes over the injection face with the surface normal vector in the direction of the annular chamber throat. The direction of air flow is shown by arrows 2410

When looking at the vehicle as it would be oriented on the ground with the nose pointing up, the section of the vehicle that unites the lower section to the upper section visually is at the point where the diameter is maximum. Visually, the lower half of the vehicle may contain propulsion systems and associated subsystems, components and elements as well as other assemblies for operation. This 'lower half' roughly corresponds to engine bay 130 shown in FIG. 1. For embodiments that contain a liquid rocket propulsion system or several systems house their turbomachinery within this base volume that is enclosed by the curvature that forms the altitude compensating nozzle (flaps 340 shown in FIG. 24B) that is revolved around the base of the vehicle with a concave curvature. Depending on the embodiment, an integer number of propellant feed systems will exist in this enclosed volume. Module 184 contains gas turbine 2420 that is mechanically coupled via a shaft to oxidizer pump 2422 and fuel pump 2424. Tank system 182 includes tank 1180 for fuel and tank 1182 for oxidizer. Fluid lines 2470 and 2472 use fuel pump 2424 to drive fuel from tank 1180 to injection plate 2430 and also to regenerative cooling channels 2450. Fluid lines 2474 and 2476 drive oxidizer from tank 1182 to injector plate 2430. Cooling channels 2450 are found within the structure of the combustion chamber, nozzle wall, and other components receiving or producing a significant amount of heat flux. Pump 2422 pumps and pressurizes oxidizer to operating pressures and flow rates into the pre-burner as appropriate and or directly into the combustion chamber/injection plate 2430. The lines or fuel feed components may be designed for robustness such that if one pump feed assembly fails, the other assemblies can still provide the necessary pressure and flow rate to feed into the entire thrust chamber. FIG. 24A has been described with respect to RDRE configurations where the annular chamber has two parallel walls that contain the revolving detonation wave as it travels around the diameter at several thousand meters per second depending on the diameter of the engine. The annular chamber 2440 is designed to allow one or more waves to continuously revolve around the annulus and produce a nearly constant form of thrust. The schematic can also be used for deflagration configurations, where the thrust chamber modules 2490 as is shown in FIG. 24B. Instead of a continuous annular chamber, thruster modules or annular segments are provided that make up sections of the overall circumference and are designed for the deflagration mode of combustion. For various embodiments, propellant feed systems can be sized to produce different flow rates, handle different propellant combinations, provide variable mass flow rates and propulsion means.

The addition of an air-breathing propulsion system to the platform increases the efficiency of the total propulsion system in the lower atmosphere, reducing the load of the rocket based engine system, ultimately saving weight while increasing system performance efficiency. Benefits of weight savings and increased efficiency enable more payload mass or enable the platform to have more characteristic energy during launch. Some components of air breathing system 170 are shown in FIG. 24B including side air inlet 172, pressurization and combustion module 2452, nozzle and outlet 2454 and air breathing propulsion exit plane vent 362. Thrust ring bulkhead 2492 is also shown.

The annular chamber modules 2490 in these embodiments reside along the vehicle base where the diameter is largest or close to the largest. The heights of the annular chamber modules 2490 are configured according to design requirements and reside radially away from the body axis. By replacing the annular chamber with chamber modules 2490 in FIG. 24A, that diagram can be seen to apply to the deflagration configurations. The engine system 180 can be operated in the pressure fed or turbopump fed configuration, including open and closed cycles. In some embodiments, the hot gas generated through regenerative cooling of the chamber walls can power a turbine which powers a pump(s) via a shaft and gearing assemblies to feed propellant into the chamber before combusting. The hot gas can either be fed back into the chamber or expelled overboard enabling both open and closed cycle engines. The chamber can be embedded into the structure and the integrated fuel tank structural system would conform around the chamber and associated propellant feed assemblies and subsystems and components and elements. Propellant may be fed at the injection face 2430 which resides closer to the nose cone or it can be fed axially through the chamber walls. The propellant mixture undergoes detonation combustion and expels the hot gas 2442 through the aft end of the chamber, with some embodiments containing constricted throats to produce higher performance. The products of the combustion process then expel past the throat and into the embedded nozzle walls that form the base of the vehicle and provide altitude compensating nozzle-like effects to the vehicle in flight for example using flaps 340. The base of the vehicle which forms the revolved nozzle wall starting at the inner annular chamber diameter is integrated with the blunted radius base which in many embodiments serves as the main reentry heat shield or vehicle base where other critical subsystems reside. The annular aerospike like conic nozzle which is a product of the vehicle structural geometry enables optimal flow expansion to ambient maximizing efficiency and performance.

The annular chamber modules 2490 serve the same purpose as any rocket based thrust chamber. This chamber in state of the art deflagration based rocket engines is typically a cylindrical volume where propellants are injected into, undergo reaction, and flow towards a throat which with the correct conditions will produce a sonic condition at the throat, after which, the reacted gas may now expand and accelerate towards the ambient atmosphere or the contained environment provided via a structural nozzle which acts as a fluidic device to help optimally accelerate and expand this flow to ambient conditions. These sort of thrust or combustion chambers are cylindrical with volume with one centralized area where mass flows. The area is encircled by the thrust/combustion chamber wall. An annular chamber differs by the fact the mass flow area is now a ring rather than a circle or respective thrust/combustion chamber flow axis cross section. The combustion volume is now encircled by a chamber wall on both sides with a continuous or segmented volume revolving around the body outer or near outermost diameter. The chamber walls and associated elements such as the injection face, injection plate, injection ports as well as the cooling channels, fluid communication ports, and structural reinforcement lattice infills found within the volume of the neighboring chamber structural material also serve as a critical skeleton like core to the entire airframe. Given the thrust-ring must withstand the force generated by the main propulsion system, it serves as the core foundation for the entire vehicle, similar to how a trunk of a tree holds the entire system steady with veins and roots transporting nutrients throughout. The annular chamber can be evolved to be either one for deflagration based combustion or detonative based combustion. The chamber dimensions can vary depending on the exact application and design requirements.

Variable system material properties throughout the system may also be induced intelligently through machine learning or advanced physics and data based simulation modeling tools to craft the optimal configuration of material throughout the spatial domain that makes up the critical skeleton base of the vehicle through varying lattice thickness and density to enable material property variation throughout the vehicle.

Figure 25A:
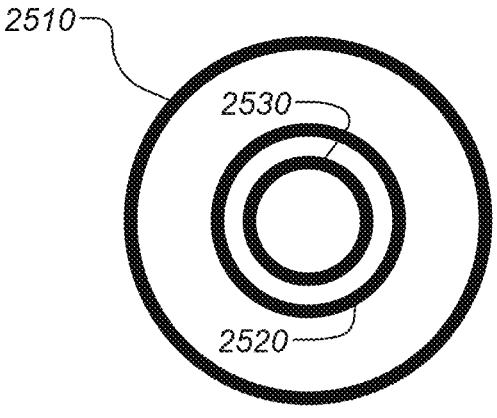
FIGS. 25A and 25B are schematic diagrams illustrating parallelized or distributed thrust capabilities, used with vehicle platforms, according to some embodiments.
Figure 25B:
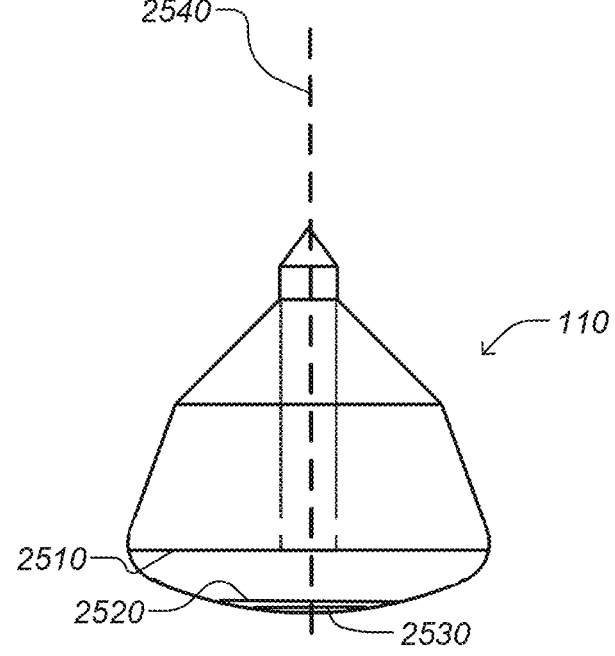

FIGS. 25A and 25B are schematic diagrams illustrating parallelized or distributed thrust capabilities, used with vehicle platforms, according to some embodiments. FIG. 25A is a bottom up view as if the base of the vehicle is directly above. When the rocket engines are engaged flames will appear from below approximately in the location of the black rings which represent three annular chambers: outer annular chamber 2510, middle annular chamber 2520 and innermost annular chamber 2530. The chambers can be radially parallel with respect to each other as shown. The chamber annular gaps can be sized differently, combinations of these annular chambers in the rotating detonation rocket engine embodiment and or the rotating detonation engine (air breathing) variants which can be swapped as necessary depending on the mission design requirements. As an example, the base of the vehicle may contain 3 independent chambers with each dark circle representing the cross sectional area of the exit of the combustion chamber where propellants combust and are expelled out. Given the different diameters of each annular chamber, the total amount of mass flow rate and other critical driving parameters for the engine performance can more easily be selected and provide designers with higher thrust class variance for different thrust requirement applications. Examples may be parallelizing thrust with all engines firing giving maximum thrust but at increased fuel expenditure, or the vehicle can switch to its innermost chamber for low thrust commands and distribute and efficiently allocate propulsion requirements on independent or coupled chamber operation. This gives a similar effect as a hybrid automobile where an electric power plant can work alone or in conjunction with the internal combustion power plant or they can work in unison or the internal combustion system by itself. The annular chamber(s) extrude into the vehicle structure and have a depth that forms the volume where propellants are injected and are allowed to combust. The depth of these chambers will depend on specific design requirements and constraints. Furthermore, the depth of the chamber volume housed within the structure may be on the order of inches to several feet. This internal cavity that forms the combustion chamber allows the efficient combustion and expulsion of products without requiring a large nozzle or assemblies as needed for deflagration based liquid or gas rocket engines.

Highly modular propulsion system requirement generation capability. In conventional rocket based propulsion systems, the variability in requirements that must be adhered to must be selected and constrained and gives designers less room to implement capabilities that can cover broad operational domains and performance ranges. As such, the ability to integrate parallelized thrust generating chambers in conjunction with other power units for air breathing based thrust generation, the acreage of the base of the vehicle can be maximally used to produce large ranges of thrust, from hundreds of newtons to tens of millions of newtons. Furthermore, the usage of additive manufacturing in the construction process of some embodiments enables the system to be designed with varying lattice structure beam and node thicknesses to produce varying localized component density enabling chamber walls to conform to different chamber operating condition requirements.

For example, the innermost engine may be designed to handle lower pressure and temperatures than the outermost diameter chamber walls. Now, the aerospace engineer or automated algorithm may instruct the material to be distributed such that the localized material properties of that chamber are conformed to exactly the operating conditions of the specific chamber annulus. The same material can still be printed throughout the rest of the vehicle taking advantage of the ability to morph or blend lattice patterns providing completely different material properties locally and globally in the vehicle airframe. This allows for precision optimization and crafting of highly specific performance characteristics without having to reconstruct entire assembly and manufacturing facilities built around making specific parts or structural members of overall systems. The vehicle is specifically designed to enable vast design spaces for the engineer without having to be constrained to the missile based airframe used in WWII.

Embedded pump feed systems and fluid communication: Embodiments of the additive manufactured variants are designed with embedded veins for propellant to enable active cooling of critical structural Thrust vectoring: In embodiments that use rotating detonation rocket engines or rotating detonation engines, the annulus can be segmented into integer number of individual injection plates that create sections that enable the control of fuel and oxidizer flow rates and pressures to produce changes in detonation wave speed, number of detonation waves, and the strength of the detonation waves and thereby the thrust of the engine segment. Through creating thrust gradients across the entire annulus, a thrust vector can be achieved. The responsiveness of this thrust vector is significantly faster than mechanically or hydraulically or electrically actuated gimbals or nozzles or guide vanes because the response time of the thrust differential is only a function of the response time of the injectors and upstream valve systems and pumps and or propellant feedlines. Research has shown promising results for thrust vectoring without any mechanical gimbals or movable nozzles. Smith, R. D. and Stanley, S., "Experimental Investigation of Continuous Detonation Rocket Engines for In-Space Propulsion," 52nd AIAA/SAE/ASEE Joint Propulsion Conference, American Institute of Aeronautics and Astronautics, Salt Lake City, bUT, 2016, No. AIAA 2016-4582 https://doi.org/10.2514/6.2016-4582, which is incorporated by reference herein.

According to some embodiments, the vehicle has a relatively large diameter which enables large thrust differentials from one side of the annulus to the other as measured radially across. With a higher number of individual segmented chamber sections, more granular control can be achieved. Due to the high diameter of the annular chamber relative to the body height, large moments about the center of gravity can be achieved leading to thrust vector angles that can be very significant relative to mechanical systems that are limited by the physical range of motion gimbals can provide, typically no more than 20 degrees. Vectors can be angled more than 45 degrees relative to the body axis 2440 shown in side view FIG. 25B Due to the modular nature of the propulsion system in preferred embodiments, the liquid rocket system can be composed of modules that are each independently throttled. The throttleable nature of these modules allows for the vehicle to have controllability in pitch and yaw axes. The propulsion systems are carefully calibrated and controlled to ensure optimal performance and fuel efficiency throughout the flight domain.

Mechanical mechanisms: According to some embodiments, mechanical mechanisms can be integrated into the vehicle to support various flight and subsystem operations that will be encountered by the vehicle.

For the propulsion subsystems, these mechanisms support various functions during flight and vehicle operations. Examples of these features may include: doors, hatches, locks, sealing devices, shealthes, covering plates, control surfaces, gimbals, thrust vector controls, and other supportive hardware.

Doors/Sealing/Control Surfaces

Doors and sealing mechanisms will be included in certain embodiments to support and protect propulsion mechanisms during flight operation. Additional subsystems may be protected or supported by such mechanical mechanisms during operations.

Doors to protect the vehicle propulsion system and internal elements can be included along the annular base of the vehicle and will remain open during ascent. The doors can act as a variable nozzle controlling expansion of engine exhaust their respective positions and as aerodynamic control surfaces for the vehicle during ascent flight.

The engine doors can close upon completion of the ascent. The doors close by means of actuation like but not limited to electric or hydraulic and remain closed when not performing maneuvers that require primary engine activation. The doors act as protection mechanisms for the main engines during aerodynamic descent and/or reentry if required for extreme thermal and pressure conditions present in the hypersonic flight environment.

Control surfaces can be stored internally within the vehicle, fused and folded into the structure, or be included externally to the structural chassis on certain embodiments. Control surface integration may be included to improve flight stability, control, and or to aerodynamic performance of the system.

Solid rocket booster reload capabilities. The SRB reload mechanism can enable rapid reloading of the SRB rocket engines for embodiments which require these specific propulsive systems. The motor is housed within the structure, with the ability to insert, mix, manufacture, or print solid propellent grains, cores, or fuel elements into the system or a casing. A SRB casing can be loaded into place using a securing mechanism or retainer (not shown) to secure them in place. The rocket motor casings can be reusable and may be refueled with solid rocket propellant fuel after each use. This feature allows for easy to handle, rapid reloading, and provides significant thrust capabilities as needed per the flight mission requirement. SRB casings can be reloaded similar to how a shotgun shell functions for quick reloading of motors enabling rapid reuse and high cadence flight capability.

Landing support. The landing gear of the vehicle is deployed prior to landing, using varying mechanisms depending on the embodiment. This may include but is not limited to: electrical, hydraulic, electro-hydraulic, loading springs, or other mechanisms. Some embodiments may not need landing gear and can be supported by infrastructure to catch or capture the mobility platform. Other embodiments may use inflatable surfaces or other recovery systems in addition to propulsive deceleration to dampen forces experienced by the structure upon landing and or support for water landing.

Recovery systems can be integrated to embodiments that act as a failsafe to support landing in case of engine failure or in instances where no atmosphere is present where the vehicle is landing. Integration of descent systems which support the propulsive landing capabilities can include parachutes, inflatables, propulsive thrusters, or mechanisms supporting autorotation to slow the vehicle down for safe landing in the given environment.

Internal dynamic and/or externally deployable systems to support mission capabilities and vehicle enhancement. Embodiments can include but are not limited to springs, clamps, actuators, servos, rods, flywheels, hatches, latches, air and vacuum tight sealing mechanisms, control surfaces, shutters, dynamic optical devices and or inertial systems, as well as other mechanisms that mechanically actuate, move, translate, rotate, vibrate, spin, shift or perform necessary movements for their respective components as necessary to support mission and flight operations. This includes the engine doors, the landing gears/legs, starter motors, ignitors, SRB securing and ejection systems, and others (not shown). Furthermore, a hinge, clasp, clamshell, and or rotatable system can be implemented in certain embodiments of the system to allow for opening and closing of the top of the vehicle for easy accessibility into the payload fairing and for access to internal systems for easy maintenance.

Other dynamic systems may be activated by fluid movement, material phases changes, and or thermal processes to support necessary movements, operations, and functionalities of the system. Heat exchangers, heat pumps, heat pipes, phase change materials, and air ducting can be integrated into the structural skeleton which have redundancy to promote internal dynamic system actuation during vehicle use.

Other mechanisms which improve flight performance, mission versatility, and/or enhance system capabilities. Such mechanisms can be stored internally for deployment during flight or on orbit, and are concealed internally within the main outer mold line of the structural chassis which are not present in drawings. For atmospheric flight, systems may include deployable, foldable wings which may or may not be actuable, fins, canards, flaps, and or control surfaces to promote efficient use of aerodynamic and or external forces which enable various augmentations and or enhancements to flight performance. Deployable systems on orbit may include solar arrays, communication, radar, and or GPS antennas, solar sails, refueling interface modules, and or instrumentation booms promoting various mission needs and system versatility.

Payload interface, fairings, adaptations for support. This feature varies depending on the embodiment as dictated by mission requirements which govern system architecture design of the platform. Depending on the type of payload (satellite(s), spacecraft, weapons, cargo, scientific instrumentation, communication architecture, sensing and imaging tools, airframe test fixtures for real flight data acquisition, as well as others) and their respective mass and volume, the payload interface is made to be modular and easily interchangeable depending on what is being carried on board. The varying interfaces (not shown) are provided with the vehicle and are integrated into the payload bay within the vehicle's structure as well for the optional exterior attachment (not shown).

Nose cone fairings can enable more internal volume for payloads while vastly improving ascent flight aerodynamics. Other payloads like waveriders, spaceplanes, or upper stage attachments, testbeds, and test fixtures can be integrated to the nose of certain mobility platform embodiments for deployment, testing, and system development.

Supports can be necessary for load management, vibrational and acoustic dampening, thermal management, and other requirements for payloads may be attached or directly integrated to the structural design. These supports can be added for specific use cases when needed.

Some embodiments can be integrated with weapons platform payloads (e.g. Focused Electromagnetic Pulse/Directed Energy; High Powered Microwave; Laser (Pulsed and Continuous Wave)). The system can act as a launch platform and communication hub to enable swarm technology deployment, detection, tracking, deterrence, and mitigation.

Thermal Protection. Thermal protection system (TPS) can be attached or integrated directly with structural chassis as needed, providing protection from violating heat load requirements experienced during flight. Certain missions or use cases may require no TPS while other vehicle flight profiles encounter vast thermal environments that require varying levels of protection. Examples of TPS integrated into the vehicle can include ablative materials, high temperature ceramics, woven fabrics, layered composites, metallic tiles, regenerative or actively cooled heat shields, transpiration cooling, and working fluid following through capillary membranes embedded in the structure may be implemented independently or in tandem. Other practices for thermal protection or reducing thermal gradients across internal or external surfaces may include using insulative materials, extreme heat resistant materials, and or advanced structural designs like honeycomb paneling, metamaterial design integration with zero thermal expansion coefficient, large surface area internal lattice substructures, or other topology optimized features to limit thermal environment loads.

The appropriate TPS is selected for the mobility platform based on trade-offs between weight and cost while maintaining the ability to meet mission requirements for heat rate and load experienced for the given trajectory or flight profile. The TPS is then applied, integrated, embedded, or conjoined to the necessary vehicle surfaces, joints, and interfaces. The degree of protection needed around the structural surface and integral subsystems depends on the vehicle use case, as certain mission profiles will dictate the flight environment. Some embodiments will experience significant aerothermodynamic loads while some missions may require minor to no TPS integration.

For some embodiments, internal capillaries designed within additive manufactured structural skeleton-shells of this vehicle may flow through the walls of the vehicle on ascent to assist with cooling the intense thermal environment present in high velocity flow fields. Furthermore, internal capillaries and fluid passageways can enable cooling of propulsion system components like injector face place, thrust chambers, nozzles, throats, turbines, and gas generator. Multi-component walls within the structural chassis can enable thermal insulation, protection, and or management of critical system elements and components. Such practices can enable efficient cryogenic fluid storage and fluid communication for optimal thermal design efficiencies. Other embodiments may incorporate thermal protection systems for mitigation of radiation heat loads via redirection, reflection, and or insulation. Magnetohydrodynamic systems can be used to in conjunction to other thermal mitigation techniques to manipulate the ionized gas around the body to reduce the overall heat rate and total heat load that the vehicle airframe needs to handle during high velocity flight such as atmospheric reentry with velocities above 7000 meters per second. Future and current radiation protection systems may be embedded within the gaps of the material infills or designed to be a material property of a localized meta-material cell that composes the structure that needs to mitigate the radiation heat rates experienced during velocities over 10,000 meters per second.

To assist with heat load distribution over the vehicle during reentry, differential corner radii can be included on the engine doors (base of the vehicle as seen in ascent configuration and windward facing when in descent) of the vehicle, located at maximum diameter of the airframe. When combined with a horizontal center of gravity offset, it ensures that the desired flight characteristics can be achieved during aerodynamic descent and/or reentry.

Embedded smart flight data collection system: Certain embodiments can contain embedded AI accelerator chips on board of the vehicle to provide low power consumption and high fidelity computational capabilities for data collection. Capabilities can include image recognition, adaptive flight controls, autonomous flight, real time CFD (Computational Fluid Dynamics), and other computationally intensive tasks. Embodiments which may support onboard compute resources for data collection and sensory fusion to drive autonomous flight development may leverage internal AI accelerator chips, GPUs, CPUs, computer vision, machine learning models, and or high performance compute packaging that can utilize the high power produced by turbines, engines, pre-burner driven turbines, etc. The vehicle may also come with high throughput communication systems to be able to talk to ground stations and utilize ground based high performance computing to assist in data processing and decision making as needed. The smart flight data collection system is designed to gather data as its payload. The data gathered can be processed real time with future computer chips capable of processing large amounts of data at lower power requirements. An embodiment of this system is a real time computational fluid dynamics flight vehicle. The vehicle is housed with critical sensors at key locations around the vehicle and can provide rapid estimates on the exact flow field and thereby non-dimensional stability and control derivatives based on the exact data processed by the sensors and computed on in assistance with prior developed machine learning models that are constantly refining themselves real time in flight. This enables rapid design to flight lifecycles as entire aero databases do not have to be generated and discretized across a potential flight regime. Instead, a vehicle can have a built in model that can reasonably predict its flow field at any given time and flight condition. This data is then instantly fed to the GNC system to adapt to its surroundings and flight conditions to execute optimized control decisions. Real time CFD can be carried out to control fuel supply to the propulsion systems.

Avionics: The electronics supporting technology operation is known as the avionics system, acting as the brain of the system for most all embodiments. The avionics may include onboard electronic components and interfaces, like sensors, cameras, inertial measurement units, gyroscopes, accelerometers, magnetometers, data processors, optical devices, batteries, computers, wiring harnesses, GPS, communication systems, satellite communication systems, data link systems, monitoring and diagnostic systems, condition monitoring systems, engine monitoring systems, radar systems, weather data links, power management systems, power generation systems, and or systems that enable control of the vehicle including its systems that handle navigation, guidance, positioning, and control to ensure it reaches the desired orbit or flight trajectories. On board functional activities may include power management, power distribution, data collection, data handling, communications, computer vision, vision processing, optical sensing, object detection, image sharpening, pattern recognition, segmentation, sampling, reinforcement learning, telemetry, control of mechanical mechanisms and or dynamic systems, monitoring performance of other subsystems or the vehicle, and other electronic based operations are handled by the avionics subsystem, according to some embodiments. Avionics systems can support full autonomous flight and redundancy can be incorporated into the design to ensure operational accuracy.

These necessary features are included based on current technology availability and will scale as more powerful, prolific technology becomes available for vehicle system integration. This may include batteries, generators, processors, AI accelerator chips, GPUs, CPUs, and or other necessary electronic and computing components.

Further details of use and implantation will now be provided, according to some embodiments. For certain mission applications, some embodiments are better than others. Every application is different, and therefore a different mission might need a different system architecture with various changes that may include one or multiple of the following: a different single or hybrid propulsion system, different wall shape(s), different wall sizing(s), different number of internal materials or components which alter the systematic blending and integration of structural components, aspect ratio of system, external mold line change, and nose cone attachments. System components, subsystems, and or complete system architectures can be assembled independently with a variety of manufacturing methods and technologies, and all embodiments are not required to have efficient, blended structures. While this improves efficiency and will be included for many embodiments, it is not required. Embodiments may include space travel for human passengers. This can serve to expand space tourism or travel to, between locations in orbit such as commercial space stations, working stations, and more. Such embodiments include a dedicated human pod where travelers can observe the surroundings safely. These include viewports or purposefully built windows or digital screens that display actual footage of the vehicle's external field of view. Humans can be safely seated in this pod that can be attached as a nose cone fairing or a large volume within the internal payload bay that can actuate to the stowed or unstowed positions. The stowed cylindrical payload section can slide in and out of the vehicle internal cavity enabling safe transport during ascent or descent and reentry and slide out of the vehicle to enable passengers full 360 degree view of the earth or other orbital surroundings.

Tactically Responsive Launch: The vehicle can be used for tactically responsive launch missions. The low infrastructure requirement paired with specific propulsion systems including SRB and airbreathing can be combined to have an on demand ability to transport assets such as: payloads, cargo, supplies, munitions, food rations, or even weapons systems to be delivered and extracted from an area with its VTOL and high velocity flight operational capabilities. Certain embodiments of the platform can be on orbit over specific areas of interest or dynamically change orbits to tactically respond to different scenarios.

Space Domain Awareness: Given the modular nature of the payload compartment on board of the vehicle, necessary sensor, telemetry and state estimation systems, communication, or imaging hardware may be installed on board of this vehicle. The vehicle can be used as a satellite and or reconnaissance vehicle. The remote sensing and data handling capabilities are integrated into the vehicle itself, creating a mobile space domain awareness device for the intelligence and military.

Rapid Point to Point Transport: A payload can be fitted on board the vehicle, such as supplies, cargo, human transport, or other important payloads that require rapid delivery to anywhere on earth. The vehicle can ascend using air breathing propulsion from any flat surface such as but not limited to: airports, helicopter pads, aircraft carriers, cargo ships, naval vessels, fields, cement pads, parking lots, roads, etc. The vehicle can then ascend to a specified altitude before transitioning to rocket based propulsion. The vehicle can follow a ballistic trajectory and reach an apogee defined by the mission before aerodynamically descending in a controlled manner. Controlled descent can occur using pitch maneuvers in conjunction with leveraging the external geometry of the airframe with other control surfaces and retropropulsion to land down range at the specified destination to deliver its cargo or payload on board. The vehicle can then follow the same operation to go to the next point or return to the initial point. For more intensive, longer duration missions, it may be necessary to refuel the system before the next flight.

Flight environment test bed: According to some embodiments, the vehicle can serve as a test bed to offer data collection on real flight environments, critical for hypersonic system development. This high enthalpy flow regime might not be completely replicated by ground testing due to intricate complexities, and scientific models are still in development to this day. The vehicle can launch on its own accord or be placed on orbit. It can serve to test new materials, improve current mathematical models, verify heat shield design, and enable critical insights to systems design for operation in hypersonic flight environments.

Downmass capability: Some vehicle embodiments are capable of returning assets from space or other planetary or celestial objects back to earth or other planets with an atmosphere. The vehicle geometry is optimized for reentry conditions given its low ballistic coefficient and large radius of the leading face of the vehicle during reentry. The large radius reduces the convective heat transfer rate during hypersonic velocities or orbital reentry velocities (>7000 m/s). The large radius forces the bow shock layer to exist further away from the body, reducing the overall temperature gradients between the skin of the vehicle outer mold line and the high temperature shock wave. The internal payload inside the core of the vehicle used for ascent may also be used to house assets during atmospheric reentry, descent and landing.

The payload or asset being recovered or delivered to a planet will be housed within the vehicle inside the internal payload compartment. The vehicle then uses a combination of ground station commands, data transmitted from satellites, and or the onboard computer and navigation system to determine reentry parameters. Some embodiments could be autonomous or may adaptively learn how to react to various reentry scenarios based on flight data archives or other predictive learning architecture. The vehicle then descends through the atmosphere handling the high heat rates and heat loads via its thermal protection system on the windward facing side of the blunt body vehicle.

Orbital logistic support: When the vehicle is on orbit it can be designed to support orbital logistics for different space assets. The vehicle could be designed to support capabilities such as cargo return of space created products like manufactured items or pharmaceuticals, refueling of space-based systems or spacecraft, and provide full lifetime support for space stations.

Orbital launch and return: The payload can include but is not limited to satellites, OTV's, spacecraft, raw materials, resources; fuel is prepared at the launch site. The vehicle then uses a combination of its propulsion systems to ascend through the atmosphere and transitions to rocket based or other space capable forms of propulsion to finalize its journey to its correct orbit. The vehicle can additionally act to recover legacy assets for repair or provide deorbit services.

Orbital debris mitigation: Further implementations may be fitted with a combination of either on board sensors or data transmitted from third party satellites or debris detection systems. It then uses the onboard navigation systems in conjunction with the on board propulsion system to move towards an object of interest. Depending on the embodiment and integrated payload, orbital debris and space junk can be mitigated through techniques like vaporization or collection. For the purpose of capturing and containment, the vehicle can use fundamentally the same architecture while employing impact resistance payload volume structuring. The vehicle can then use its integrated propulsion to remain mobile and maneuverable within orbit. The system can perform reentry to extract this debris and material. It may also expel collected material with force (e.g. loaded spring, electromagnets, gas pulse, etc.) to send the debris into a reentry trajectory to burn up in the atmosphere. This implementation may also include broken or out-of-fuel satellites and other orbital assets for Earth reservicing.

Lunar or inter planetary exploration support: Such embodiments can be scaled to support lunar or planetary exploration. This vehicle system can deliver cargo goods directly to the lunar surface, lunar orbits, or support payloads capable of landing or orbiting other celestial bodies. The spacecraft may be designed to enable mining missions to bodies like asteroids and comets through transport of mining supportive system architecture to and between major orbital shipping lines as well as deliver mined cargo back to Earth via atmospheric hypersonic reentry followed by air-breathing descent and landing.

Spacecraft Carrier: Akin to the function of Naval aircraft carriers, the embodiments disclosed in this patent specification can enable transportation of orbital assets efficiently from Earth to orbit and rendezvous with assets requiring repair and transport to earth or other parking orbits. The embodiment may also be used as a rapid response spacecraft carrier providing mobility of a large squadron of intelligence, imaging, sensory, communications and other satellite functions to one location rapidly. The system can be equipped to house various configurations depending on strategic armament of various satellite units as the embodiments carrying payload.

Drone Carrier: Alike to Naval aircraft carriers, this flight vehicle architecture may be configured for atmospheric transport and deployment of large groups of airborne or ground based drone systems. This enables autonomous transport of relatively large payloads in comparison with helicopter-like drone systems given the embodiment's high thrust to weight ratios and high velocities due to turbine or jet powered propulsion enables rapid transport of large drone networks. The vehicle may also be equipped with a central communications relay hub that can enable humans to operate the system as needed further from threats.

Dynamic embedded and rapid response satellite drone satellite platform: Some embodiments act to enable reusable dynamic satellite operations capable of changing attitude, altitude, velocity, trajectories, and maneuvering between orbits. Structural subsystems of the vehicle can be integrated with payload to support satellite-like operations. When fuel levels are depleted and can no longer sustain sufficient dynamic operation, the system is capable of deorbit to be recovered and reused. Currently used satellites are launched by a separate launch vehicle, these are two separate entities. The satellite is transported and deposited into an orbit by a different vehicle system. In embodiments described in this patent specification, a rapid response satellite drone can be provided. Attitude control system, typically thrusters or other forms of propulsions, or inertial based control systems, can enable an omnidirectional line of sight in low earth orbit.

Embodiments that leverage additive manufacturing capabilities or other advanced manufacturing capabilities enable the design of the lattice to be optimal for specific vibrational frequencies produced by the propulsion system.

Current satellites may contain very sensitive components such as cameras, sensors, communication systems and other vibrationally sensitive elements that can have their performance or lifespan adversely impacted by vibrational frequencies and oscillations. In dynamic embedded satellites described in this patent specification, the satellite is its own launch vehicle and the launch vehicle is a satellite. These drones can get themselves to orbit in a single stage configuration or be boosted by another vehicle such as an enlarged version of one of the embodiments. Vehicles can be built in advance as copies of themselves and utilize air breathing with solid rocket propulsion and sometimes liquid or gas propellants to be easily storable and responsive at any moment to mobilize and achieve necessary orbit or trajectories. The same architecture can be used and slotted in with satellite systems that serve different functions in an operational spectrum. For example, there can be weather imaging systems that can rapidly respond and deploy to a custom orbit, or they can be Earth ground imaging satellites to assist in on demand high resolution imaging of a particular area within a short period of time from request. The vehicle can then be designed to utilize meta-material structures and lattice infills as required by constraints of sensory systems that are specifically sized to dampen specific frequencies that are harmful to the assets on board of the vehicle. Across all kinds of satellite functions, these structures can serve to meet specific requirements without recreating the design at the system of systems level. Satellite size can range from 60 ft diameter and length can vary by aspect ratio and use cases, for example. If used in conjunction with a boost platform, it can enable reduced form factors and faster delivery.

Variations: Detailed descriptions of some variations will now be provided, according to some embodiments.

The vehicle can be adapted for various implementations of mission profiles, which inherently change payload capacities, vehicle components, and structural configurations. Alternative materials, propulsion systems, and avionics can be incorporated based on specific design criteria.

Some embodiments provide an innovative launch vehicle design that overcomes limitations of existing solutions by providing full mission lifecycle support. Combining modular architecture, advanced propulsion systems, lightweight materials, and embedded subsystems into the structure allows improved cost-effectiveness, high reusability, and operational efficiency with increased payload volume and mass capacity for aerospace applications. Some embodiments can be a "Cargo Ship for Space," enabling reliable rapid movement of massive quantities of varying payloads in one continuous flight operation without refueling or staging events. As cargo ships operate on Earth moving as one piece from one port to the next, these embodiments serve to create a unified operation between ascent and descent with payload carrying capabilities in one singular main structural body.

For the case of lunar missions, once landed upon the surface, the vehicle could remain to act as a mission control or command center for exploration activities, offering powering and communication capabilities to surface assets. It could serve to support resource utilization and capture of raw materials on celestial bodies, and return to Earth with such assets. In the regolith of the lunar surface, Helium 3 is an abundant clean renewable energy source which could be captured and returned to Earth.

This scalable design for a launch vehicle consists of the similar blunt body geometry for its structure with an integrated thermal protection and propulsion system. The main body is constructed using lightweight and high-strength materials, ensuring structural integrity while minimizing weight. The modular design allows for flexible configuration and customization based on specific mission requirements.

The payload bay and supportive features vary depending on embodiment. For a given payload (satellite, weapons, cargo, instrumentation, imaging tools, and others) and their respective mass and volume, the supportive payload interfacing is designed to be modular and easily interchangeable depending on what is being carried on board. Different payloads can be prioritized by different modular attachments to the system. Such embodiments can support both unmanned and manned missions.

The launch vehicle's avionics system integrates cutting-edge navigation, guidance, and control systems, enabling precise trajectory planning, accurate positioning, and real-time monitoring. The avionics system incorporates advanced sensors, data processing units, and communication interfaces to ensure seamless integration with ground control and tracking stations as well as self-guided autonomous flight.

The thermal protection system and reentry trajectory profile of the vehicle can be varied based on the total heat loads and heat rates of the given flight environment and or mission design specifications. Other means to limit or reduce heat load concentration or thermal gradients on vehicle surfaces can be implemented as mitigation strategies if mission requirements permit, such as spinning the vehicle during flight.

Dynamic response embedded satellite vehicle platforms will utilize the existing vehicle system and embed satellite hardware (e.g. remote sensing, imaging, communications and other satellite instrumentation systems) directly into the structure and available payload volume. This is different from delivering and having payload removed from the payload bay. The vehicle will act as the satellite and its own mobility platform together.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

The following documents provide background information and/or more detail regarding subject matter of this patent specification, and are hereby incorporated by reference herein:

1. U.S. Pat. No. 7,784,267, issued Aug. 31, 2010.
2. US Publication No. 20230211900, published Jul. 6, 2023.
3. US Publication No. 20200049103, published Feb. 13, 2023.
4. PCT Publication No. 2021112934, published Jun. 10, 2021.
5. PCT Publication No. 2022251763, published Dec. 1, 2022.
6. Great Britain Publication No. 2610014, published Feb. 23, 2023.
7. F. B. Lary, Final Report Advanced Cryogenic Rocket Engine Program, Aerospike Nozzle Concept Volume I, January 1968, pages 1-432.
8. F. B. Lary, Final Report Advanced Cryogenic Rocket Engine Program, Aerospike Nozzle Concept Volume II, Technical Report AFRPL-TR-67-280, January 1968, pages 1-568.
9. J. Campbell, Jr., NASA Aerospike Thrust Chamber Program Final Report, NASA Lewis Research Center, April 1977, pages 1-15.
10. C. E. Tharratt, Chrysler Corporation Space Division, Project Serv, A Space Shuttle Feasibility Study, Nov. 19, 1969, pages 1-200.
11. Richard D. Smith, Aerospace Research Center, Experimental Investigation of Continuous Detonation Rocket Engines for In-Space Propulsion, Jul. 22, 2016, pages 1-4.
12. Thomas W. Teasley, Aerospace Research Center, Current State of NASA Continuously Rotating Detonation Cycle Engine Development, Jan. 19, 2023, pages 1-3.
13. The Linear Aerospike Engine, May 14, 1998, pages 1-5.
14. C. E. Tharratt, Project Serv Final Review: Phase A Space Shuttle Study, Chrysler Corporation Space Division, Jul. 1, 1971, pages 1-254.

What it claimed is:

1. A geometry optimized low aspect ratio vertical takeoff and landing vehicle (VTOL) system with structurally integrated propulsion comprising both rocket and airbreathing propulsion systems and fuel tanks having internal lattice structures formed of groups of interconnected multiplicities of fuel cells that line and are integrated with a vehicle skin to form a structural skeleton strengthened with said lattice structures comprising:

a skin and fuel tanks lining an inside of said skin and integrated therewith to form a unitary structural skeleton that has a rounded outer surface and an aspect ratio of height to maximum width no greater than 5.3:1;

wherein the fuel tanks comprise internal lattice structures formed of one or more groups of multiplicities of interconnected cells lining and integrated with an inside of said skin over a sufficient area thereof to enhance structural strength of said structural skeleton and to reduce fuel slosh compared with tanks lacking such lattice structures;

a rocket propulsion system that has aft-facing exhaust nozzles at a periphery of an aft portion of said structural skeleton and is coupled with one or more of said fuel tanks for supply of rocket fuel; and an airbreathing propulsion system that has aft facing exhaust nozzles radially inwardly spaced from said rocket propulsion system exhaust nozzles and is coupled with one of more said fuel tanks for supply of fuel for airbreathing propulsion;

wherein said rocket and airbreathing propulsion systems are configured to operate selectively to provide sufficient propulsion for ascent, descent, and landing of said VTOL system.

2. The VTOL system of claim 1, in which the rocket propulsion system exhaust nozzles are arranged in a circle and comprise more than 10 nozzles.

3. The VTOL system of claim 1, in which the airbreathing propulsion system nozzles are arranged in a circle and comprise more than 10 nozzles.

4. The VTOL system of claim 1, in which said airbreathing propulsion system includes at least one of (i) forward facing air intakes at a forward portion of the structural skeleton and (ii) side facing air intakes at positions intermediate the forward and aft portions of the structural skeleton.

5. The VTOL system of claim 4, including both said forward facing air intakes and said side facing air intakes.

6. The VTOL system of claim 4, in which said side facing air intakes are provided with actuable doors selectively closing said side facing air intakes.

7. The VTOL system of claim 1, in which the rocket propulsion system and the airbreathing propulsion system are configured to operate concurrently at selected times.

8. The VTOL system of claim 1, in which the rocket propulsion system and the airbreathing propulsion system are configured such that only one operates at selected times.

9. The VTOL system of claim 1, in which said interconnected cells in at least some of the fuel tanks comprise gyroid-like compartments.

10. The VTOL system of claim 1, in which said fuel tanks comprise a tank with interconnected cells for rocket fuel and a tank with interconnected cells for an oxidizer for the rocket fuel that are not in fluid flow communication with each other.

11. The VTOL system of claim 10, in which said fuel tanks comprise a tank with interconnected cells for an airbreathing propulsion system that are not in fluid flow communication with the tanks for rocket fuel and oxidizer.

12. The VTOL system of claim 1, in which the rocket propulsion system comprises a rotating detonation rocket engine configured with a continuous rounded detonation chamber.

13. The VTOL system of claim 1, in which the air breathing propulsion system comprises a rotating detonation engine configured with a continuous rounded detonation chamber.

14. The VTOL system of claim 1, in which said tanks include thermal insulating material coupled with said interconnected cells to maintain desired temperatures profiles of fuel in the cells.

15. The VTOL system of claim 14, in which said thermal insulating material includes phase-changing material that changes between solid and non-solid phases to help maintain said desired temperature profiles.

16. The VTOL system of claim 1, in which said internal lattice structure includes one or more hollowed portions the contents of which are configured to selectively control heat transfer between fluids stored in the tanks.

17. The VTOL system of claim 16, in which said one or more hollowed portions of the internal lattice structure include further beam lattice structures.

18. The VTOL system of claim 1, including fuel conduits connecting said tanks with said propulsion systems, which fuel lines are embedded in said structural skeleton.

19. The VTOL system of claim 1, in which said propulsion systems are configured to provide said VTOL system with endo-atmospheric as well as exo-atmospheric mobility.

20. A self-contained vertical takeoff and landing vehicle (VTOL) system comprising:

a skin and fuel tanks lining an inside of said skin and integrated therewith to form a unitary structural skeleton that has a rounded outer surface;

wherein the fuel tanks comprise internal lattice structures formed of one or more groups of multiplicities of interconnected cell lining and integrated with an inside of said skin over a sufficient area thereof to enhance structural strength of said structural skeleton and to reduce fuel slosh compared with tanks lacking such lattice structures;

a rocket propulsion system that has aft-facing exhaust nozzles at a periphery of an aft portion of said structural skeleton and is coupled with one or more of said fuel tanks for supply of rocket fuel; and an airbreathing propulsion system that has aft facing exhaust nozzles radially inwardly spaced from said rocket propulsion system exhaust nozzles and is coupled with one of more said fuel tanks for supply of fuel for airbreathing propulsion;

wherein said rocket and airbreathing propulsion systems are configured to operate selectively to provide sufficient propulsion for ascent, descent, and landing of said VTOL system.

21. The self-contained VTOL of claim 20, in which the rocket propulsion system and the airbreathing propulsion system are configured to operate concurrently at selected times.

22. The self-contained VTOL of claim 20, in which the rocket propulsion system and the airbreathing propulsion system are configured such that only one operates at selected times.

23. The self-contained VTOL system of claim 20, in which said airbreathing propulsion system includes forward facing air intakes at a forward portion of the structural skeleton.

24. The self-contained VTOL system of claim 20, in which the rocket propulsion system comprises a rotating detonation rocket engine configured with a continuous rounded detonation chamber.

25. The VTOL system of claim 20, in which said propulsion systems are configured to provide said VTOL system with endo-atmospheric as well as exo-atmospheric mobility.

26. A self-contained vertical takeoff and landing vehicle (VTOL) system comprising:

a skin and fuel tanks lining an inside of said skin and integrated therewith to form a unitary structural skeleton that has a rounded outer surface and an aspect ratio of height to maximum width no greater than 5.3:1;

wherein the fuel tanks comprise internal lattice structures formed of one or more groups of multiplicities of interconnected cells lining and integrated with an inside of said skin over a sufficient area thereof to enhance structural strength of said structural skeleton and to reduce fuel slosh compared with tanks lacking such lattice structures; and a propulsion system that has at least 10 aft-facing exhaust nozzles arranged in a ring at an aft portion of said structural skeleton and is coupled with one or more of said fuel tanks for supply of fuel;

wherein said propulsion systems is configured to operate selectively to provide sufficient propulsion for ascent, descent, and landing of said VTOL system.

27. The VTOL system of claim 26, in which said tanks include thermal insulating material coupled with said interconnected cells to maintain desired temperatures profiles of fuel in the cells.

28. The VTOL system of claim 26, in which the rocket propulsion system comprises a rotating detonation rocket engine.

29. A process of forming a vertical takeoff and landing (VTOL) vehicle comprising:

forming a structural skeleton that has a rounded outer surface and an aspect ratio of height to maximum width no greater than 5.3:1 by lining an inside of a skin with fuel tanks integrated therewith;

wherein said lining the skin with fuel tanks comprises forming the fuel tanks with internal lattice structures of one or more groups of multiplicities of interconnected cells lining and integrated with the inside of said skin over a sufficient area thereof to enhance structural strength of said structural skeleton and to reduce fuel slosh compared with tanks lacking such lattice structures;

securing to said structural skeleton a rocket propulsion system that has aft-facing exhaust nozzles at a periphery of an aft portion of said structural skeleton and is coupled with one or more of said fuel tanks for supply of rocket fuel;

further securing to said structural skeleton an airbreathing propulsion system that has aft facing exhaust nozzles radially inwardly spaced from said rocket propulsion system exhaust nozzles and is coupled with one of more said fuel tanks for supply of fuel for airbreathing propulsion; and configuring said rocket and airbreathing propulsion systems to operate selectively to provide sufficient propulsion for ascent, descent, and landing of said VTOL vehicle.

30. The process of forming a vertical takeoff and landing (VTOL) vehicle of claim 29, wherein said forming the fuel tanks uses one or more additive manufacturing processes.

* * * * *